April 23, 1935. O. U. ZERK 1,998,746
LUBRICATING SYSTEM
Filed June 12, 1929 22 Sheets-Sheet 2
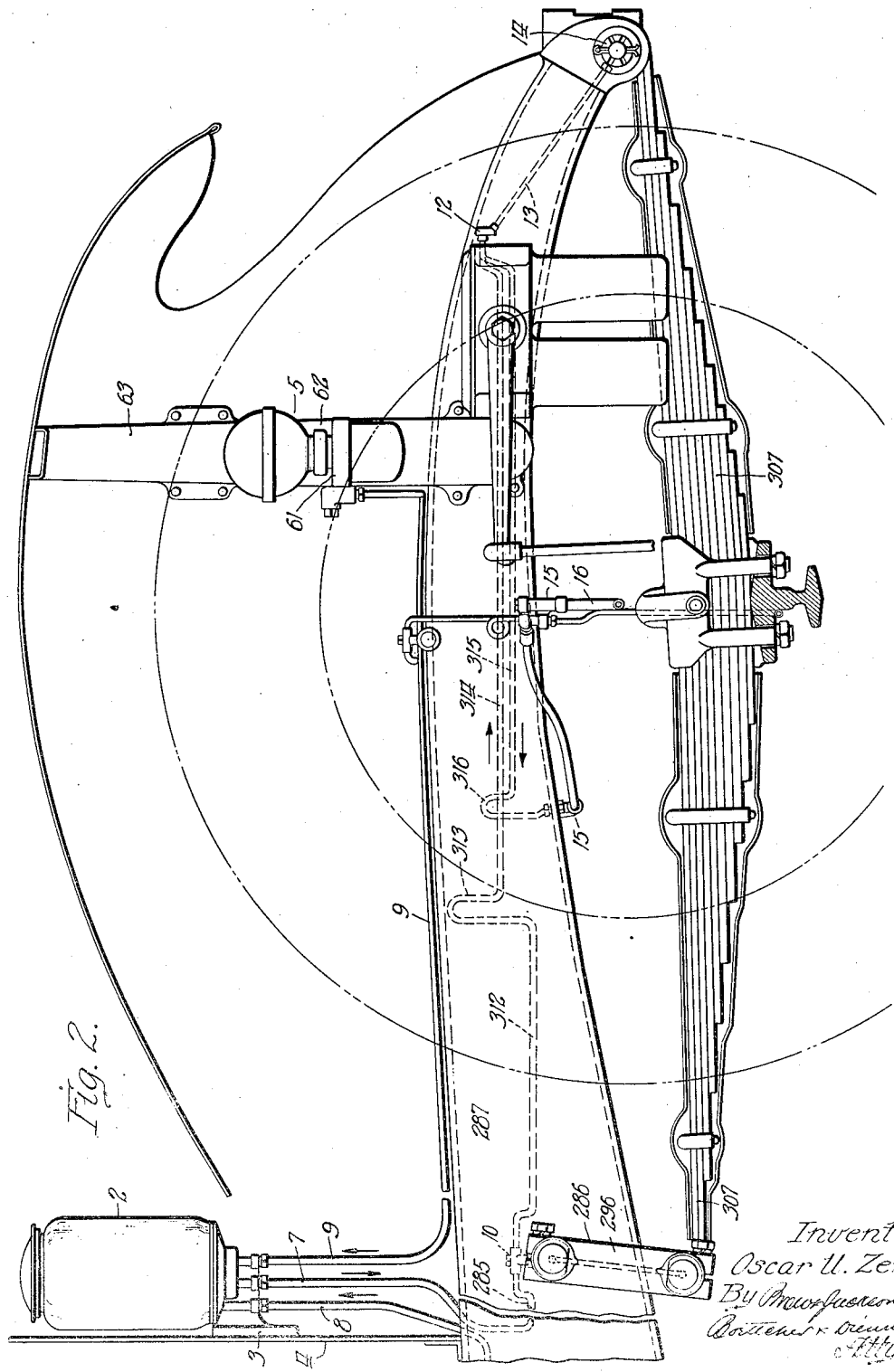

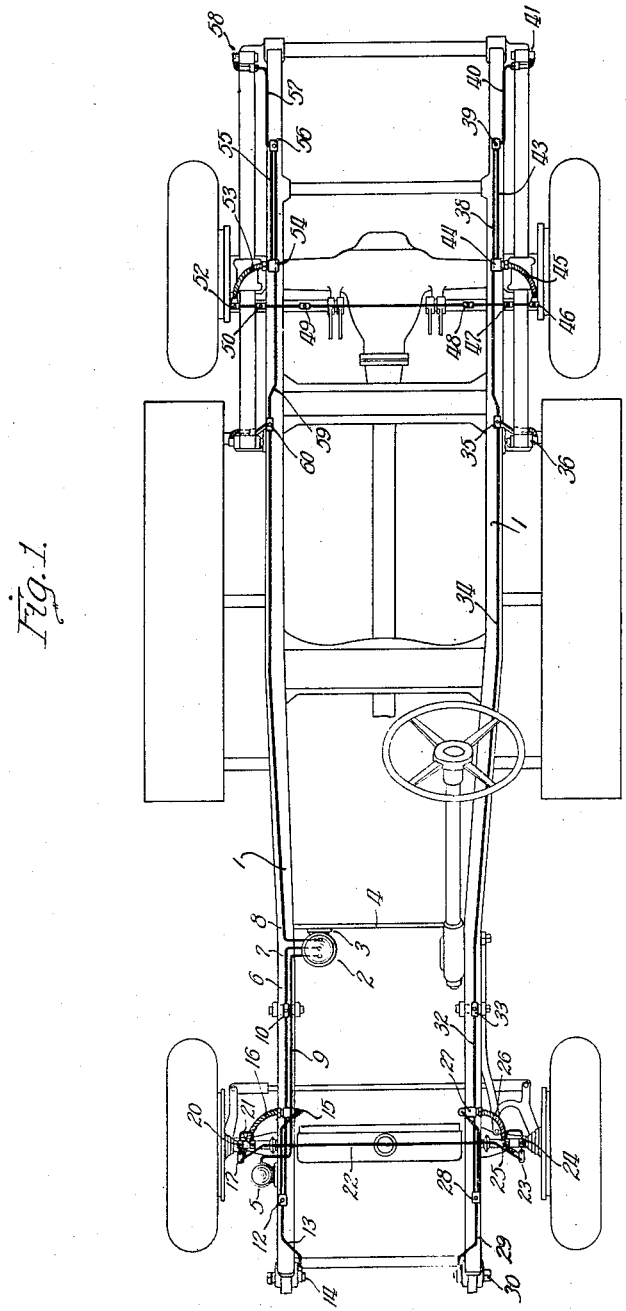

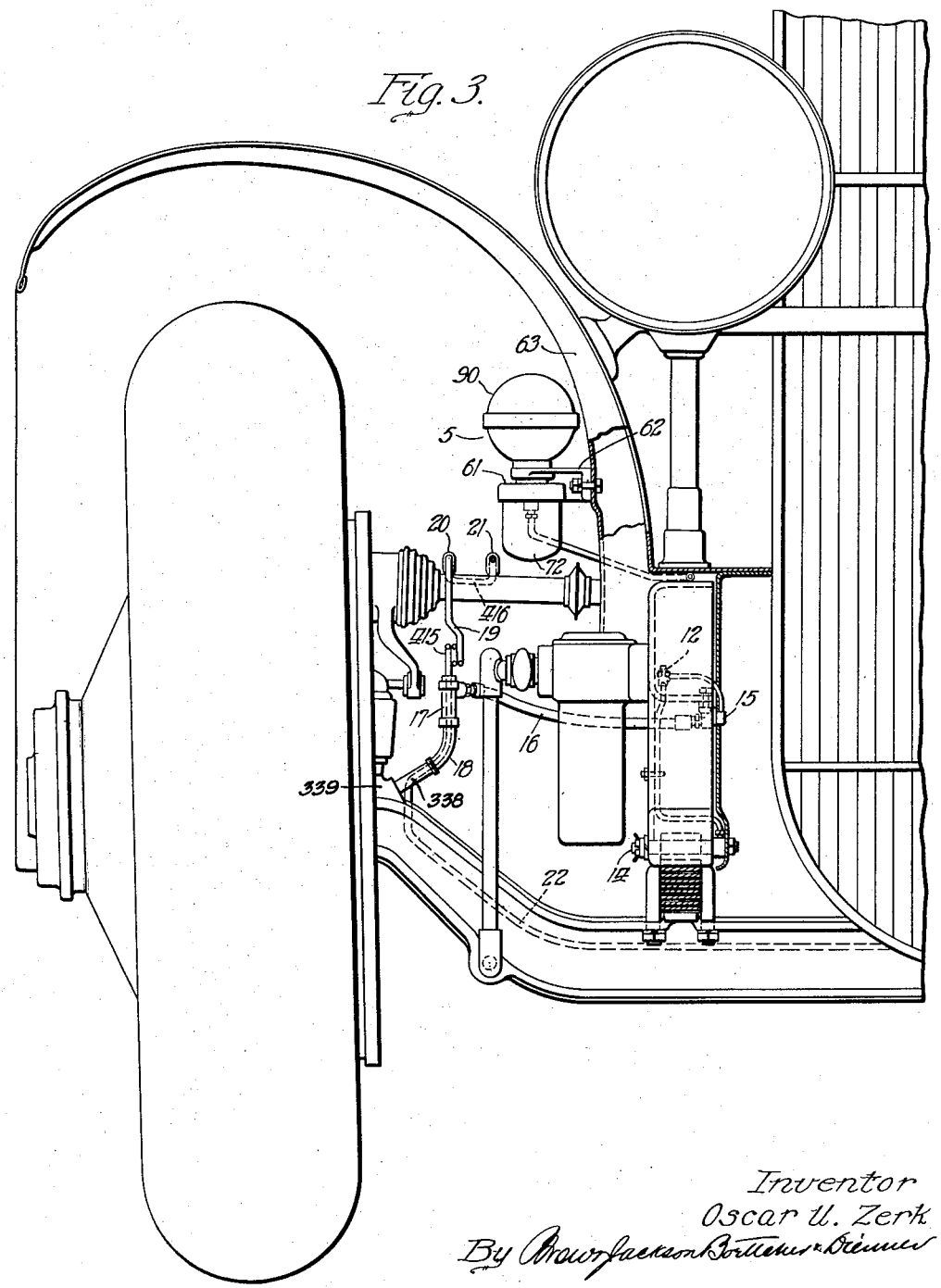

April 23, 1935.   O. U. ZERK   1,998,746
LUBRICATING SYSTEM
Filed June 12, 1929   22 Sheets-Sheet 4
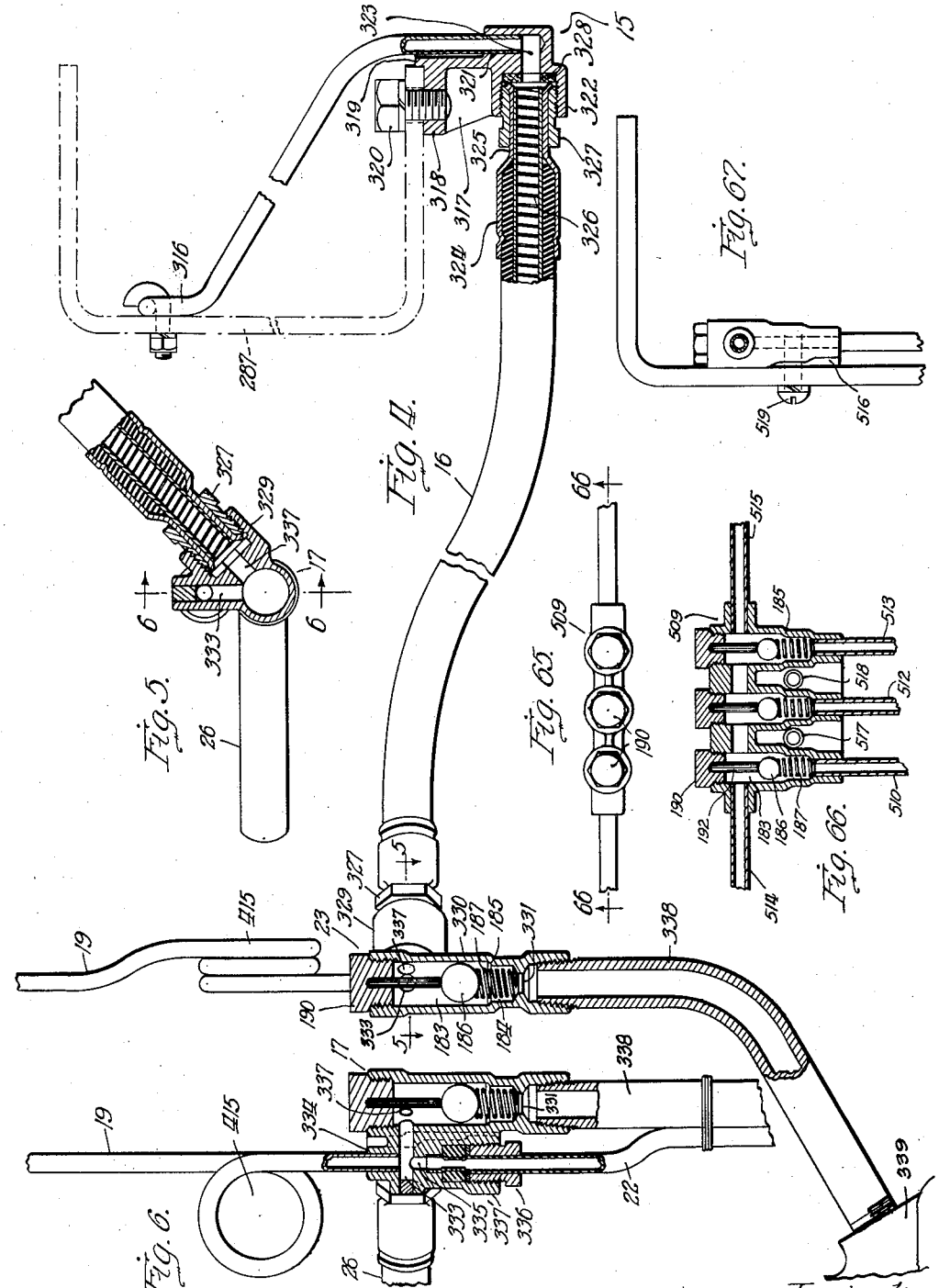

April 23, 1935.     O. U. ZERK     1,998,746
LUBRICATING SYSTEM
Filed June 12, 1929     22 Sheets-Sheet 5
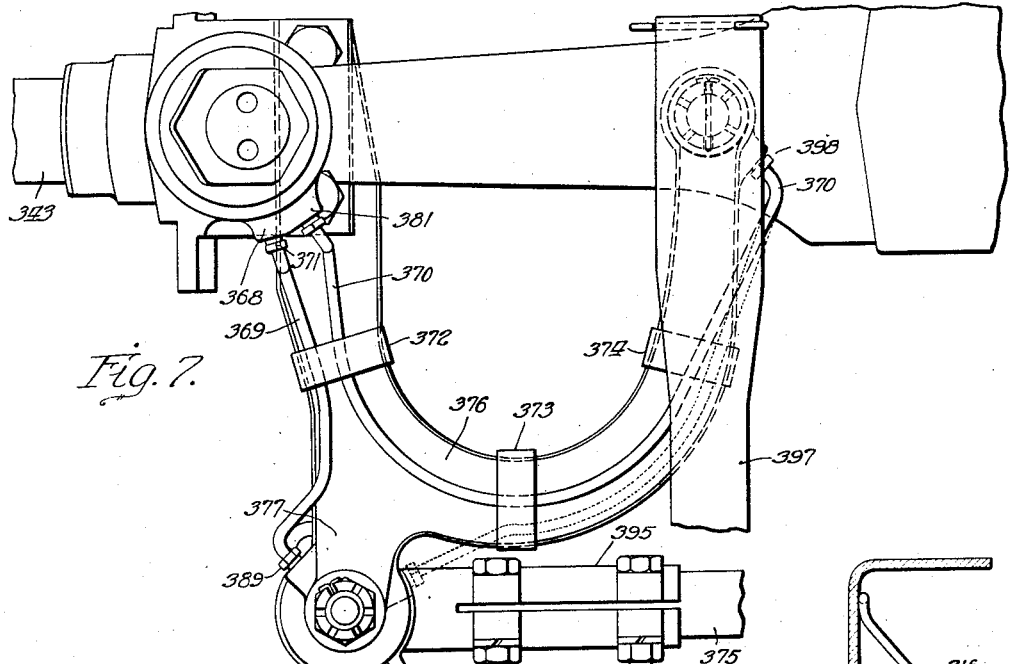
Fig. 7.
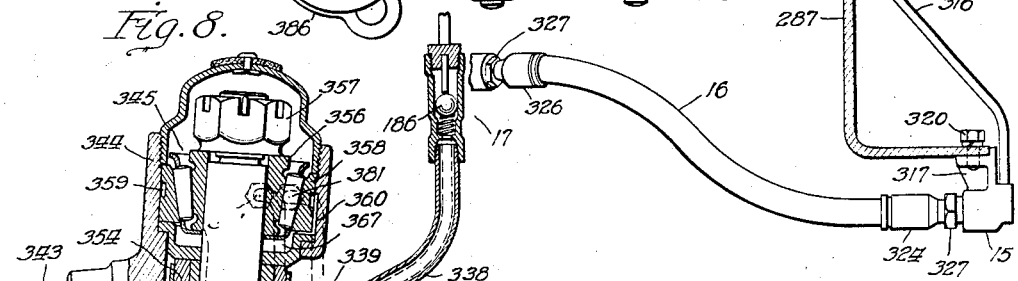
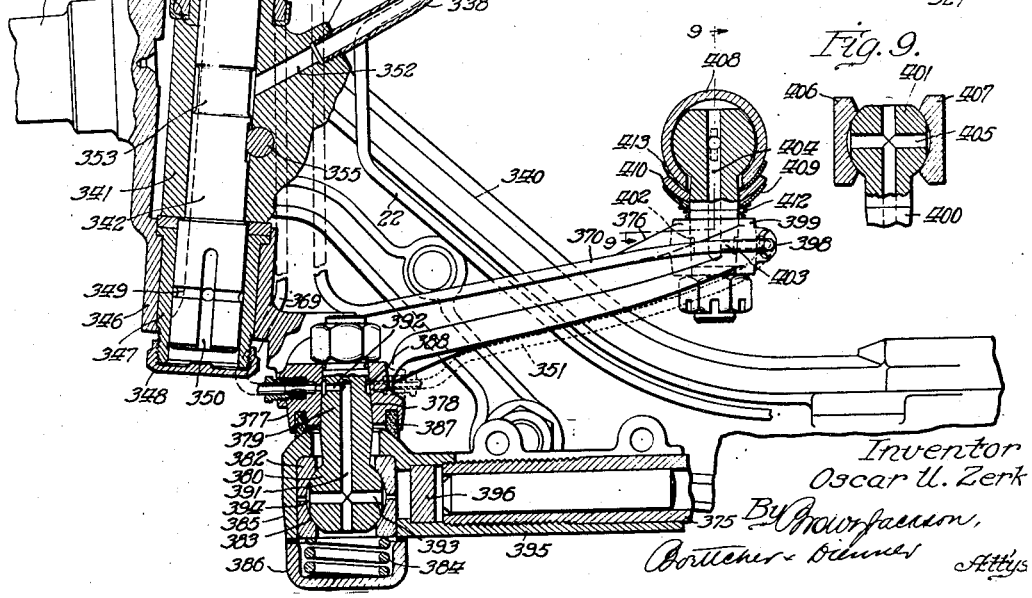
Fig. 8.
Fig. 9.
Inventor
Oscar U. Zerk

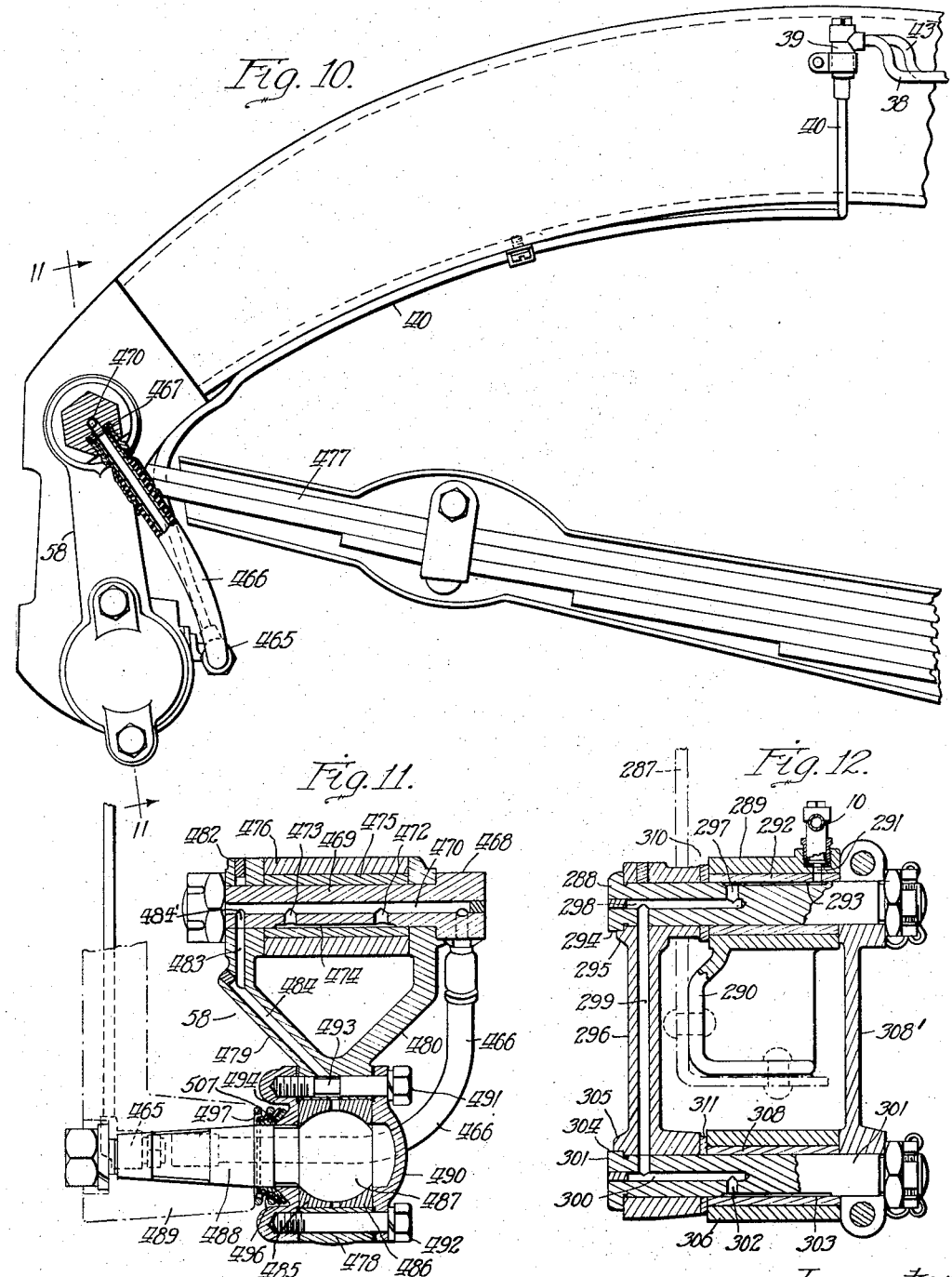

April 23, 1935.  O. U. ZERK  1,998,746
LUBRICATING SYSTEM
Filed June 12, 1929    22 Sheets-Sheet 7

Inventor
Oscar U. Zerk
By Brown Jackson Boettcher & Dienner
Attys.

April 23, 1935.   O. U. ZERK   1,998,746
LUBRICATING SYSTEM
Filed June 12, 1929   22 Sheets-Sheet 10

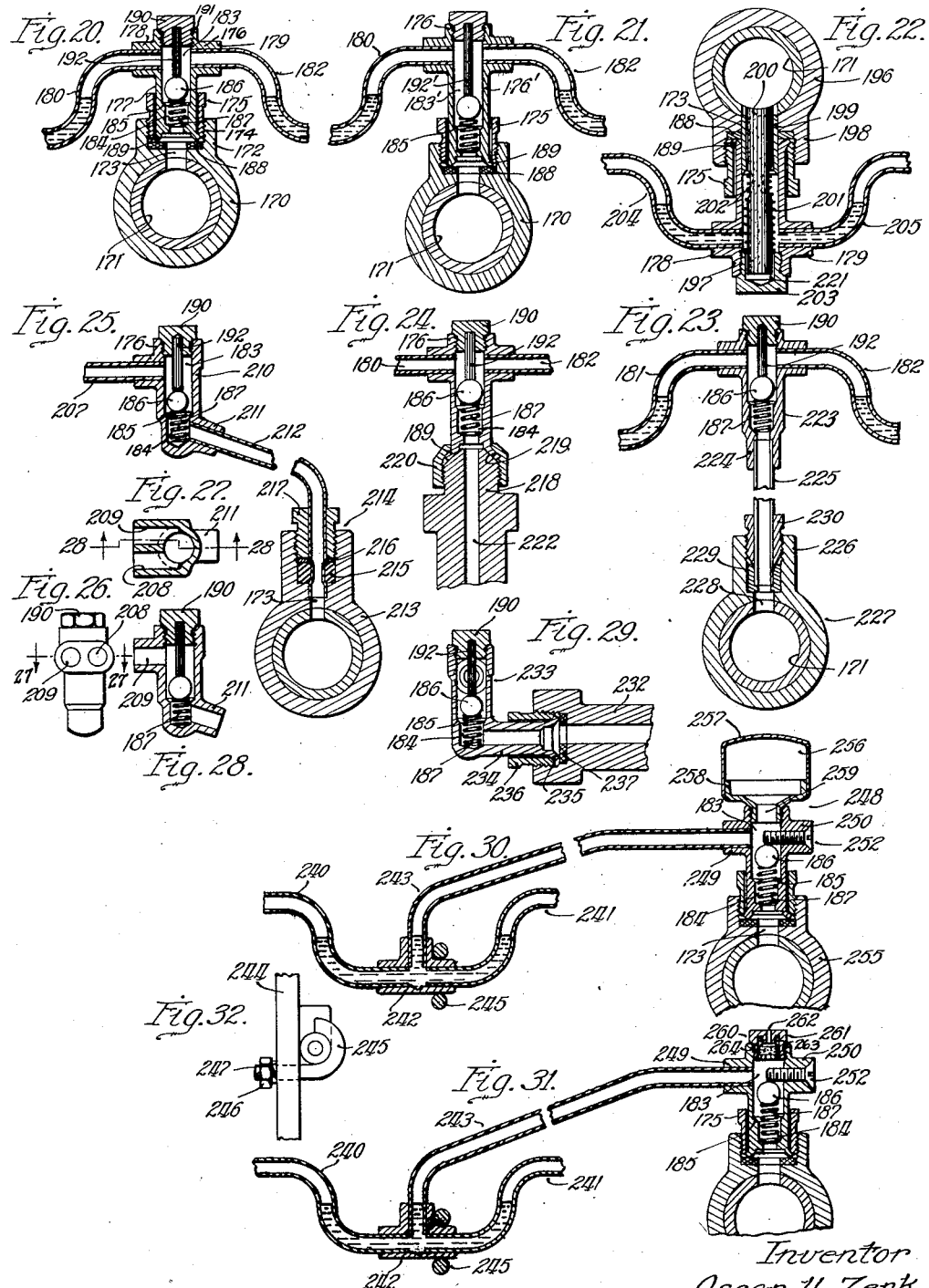

April 23, 1935. O. U. ZERK 1,998,746
LUBRICATING SYSTEM
Filed June 12, 1929 22 Sheets-Sheet 12
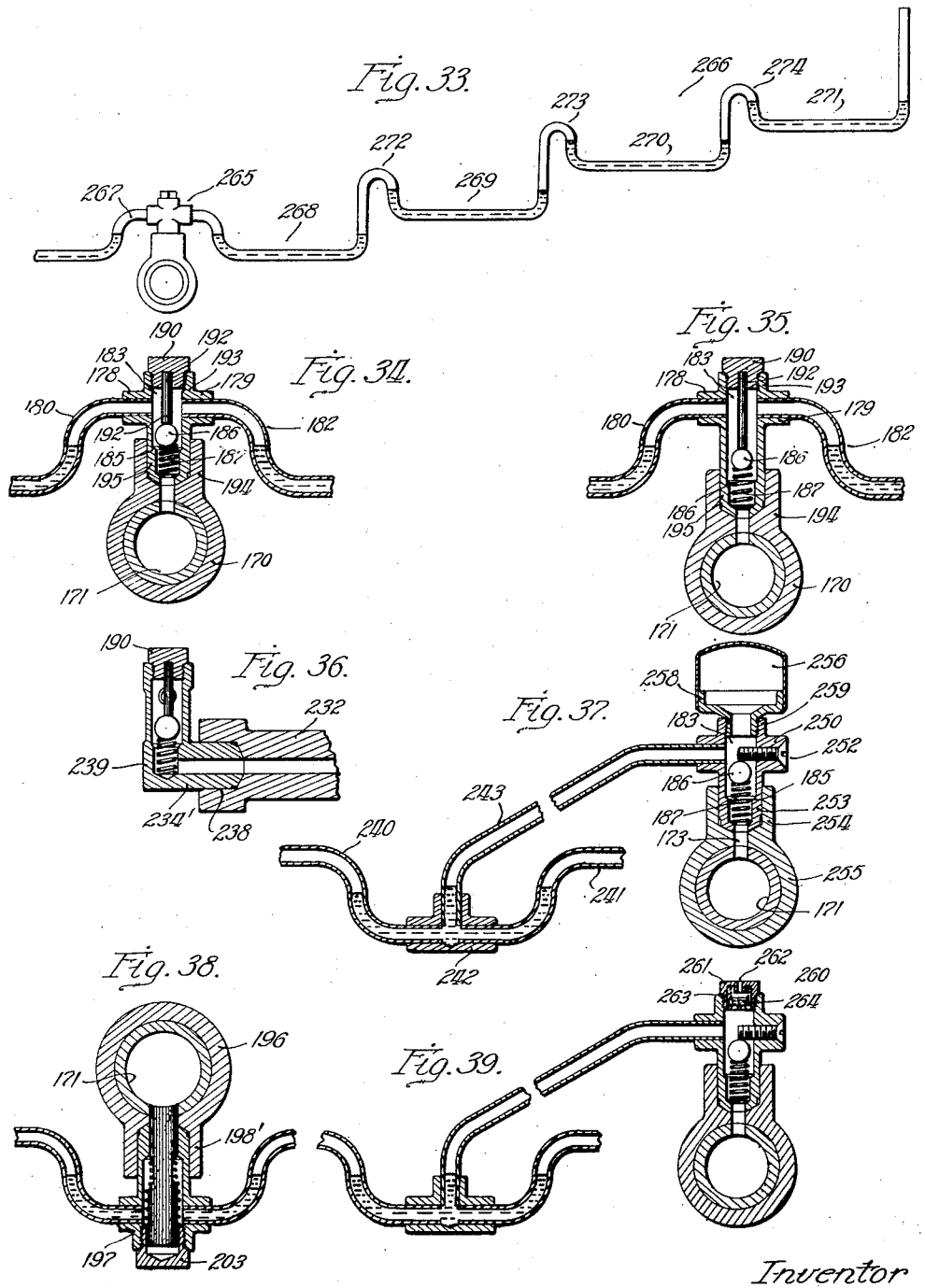
Inventor
Oscar U. Zerk

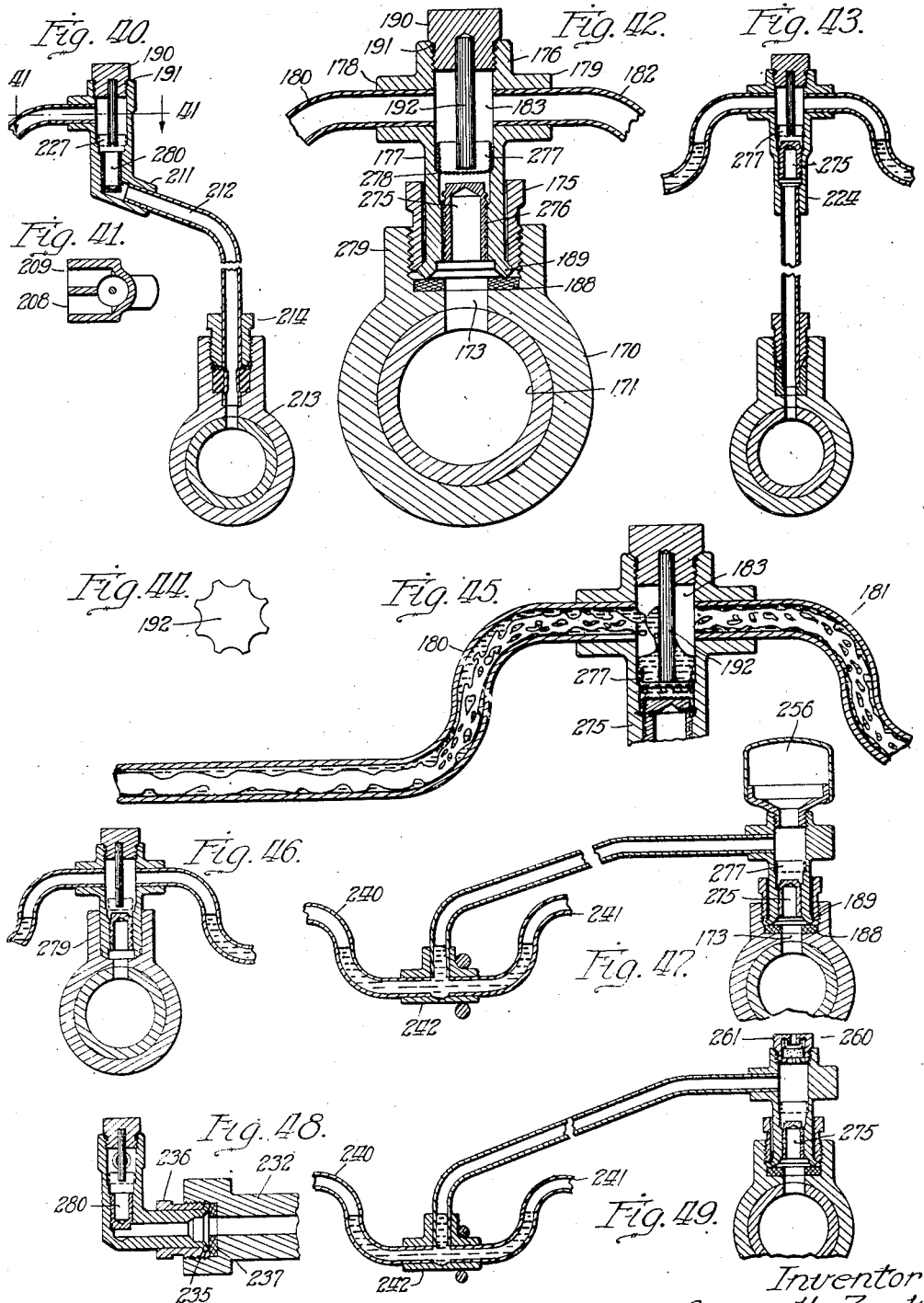

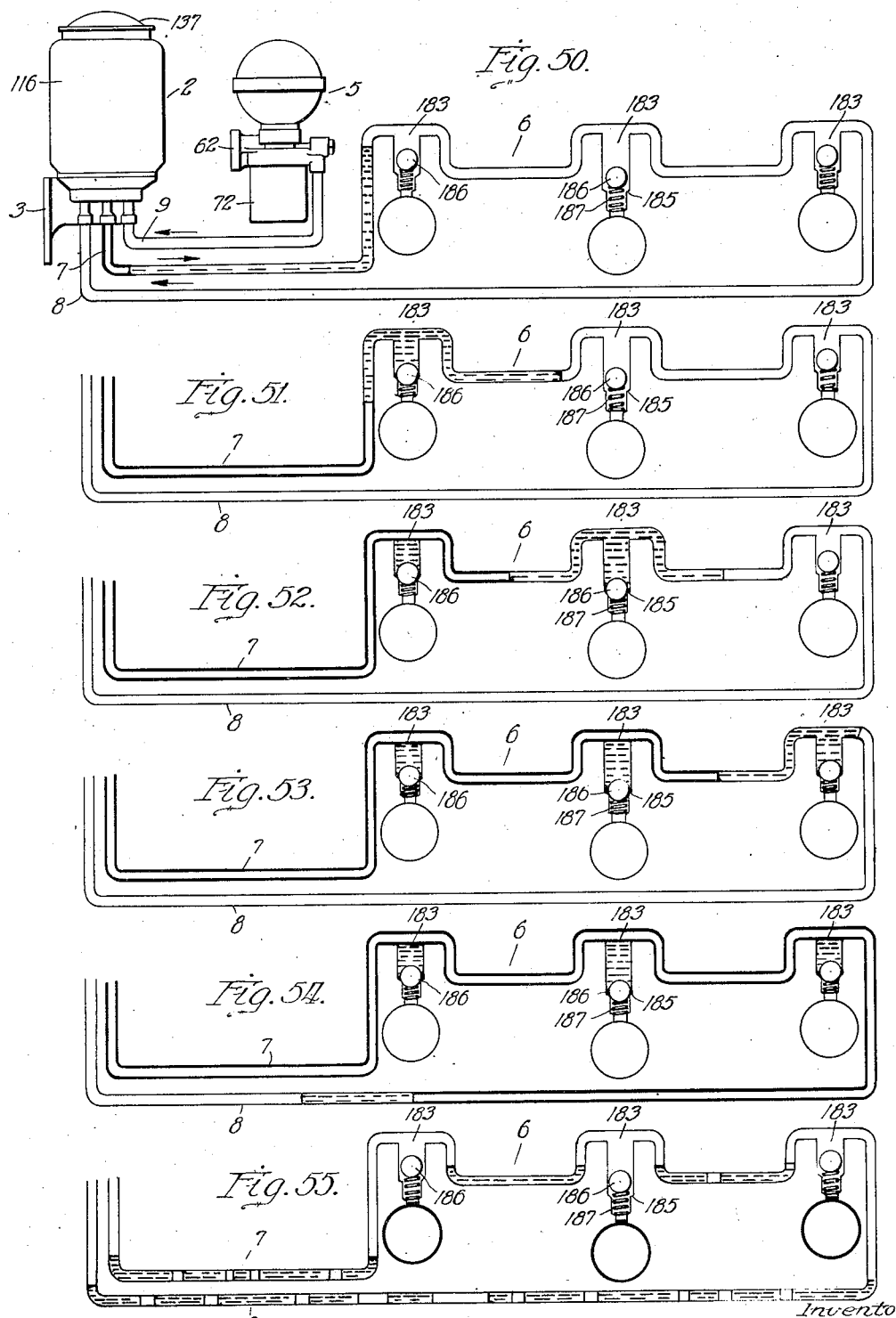

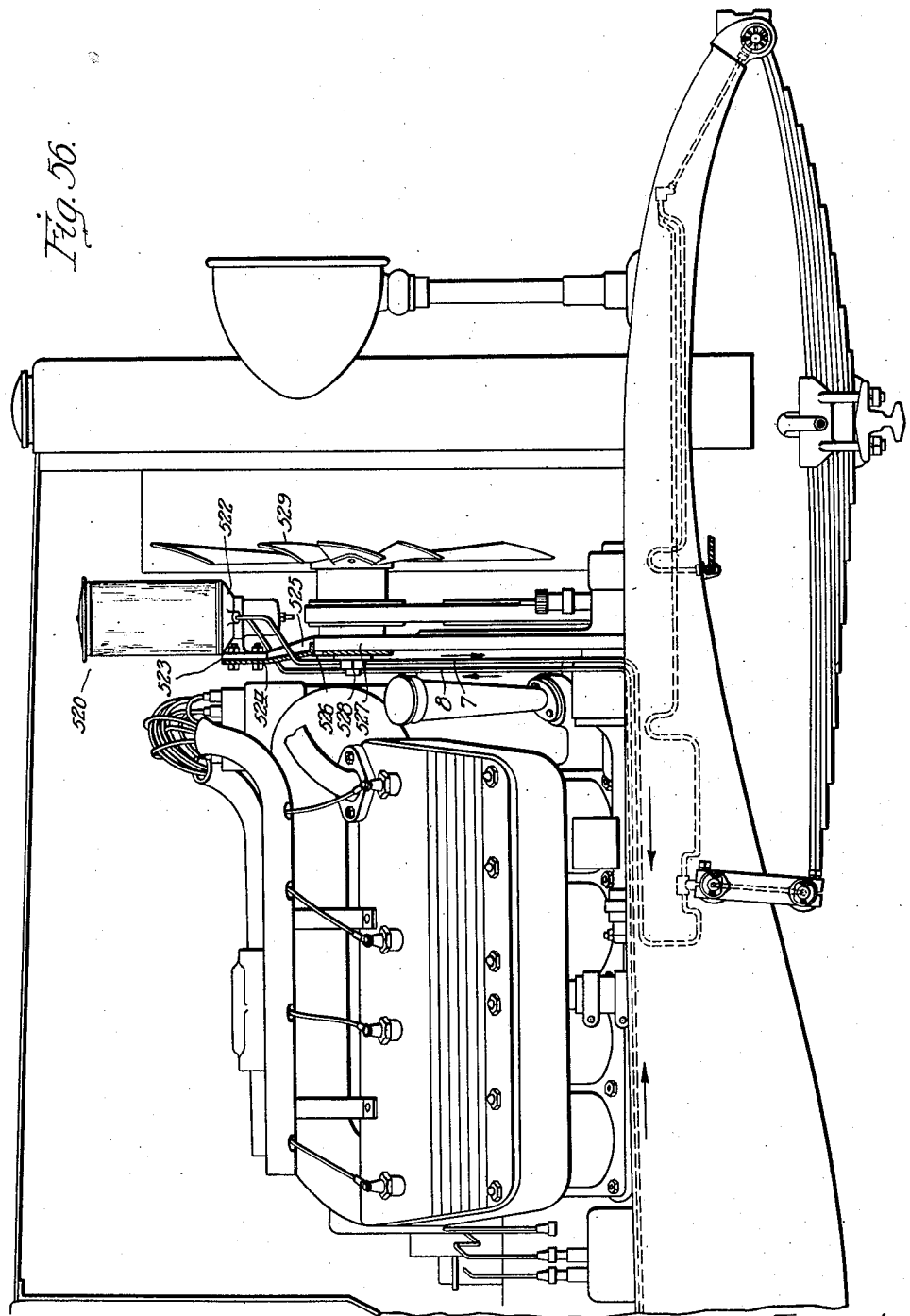

April 23, 1935.   O. U. ZERK   1,998,746
LUBRICATING SYSTEM
Filed June 12, 1929    22 Sheets-Sheet 16
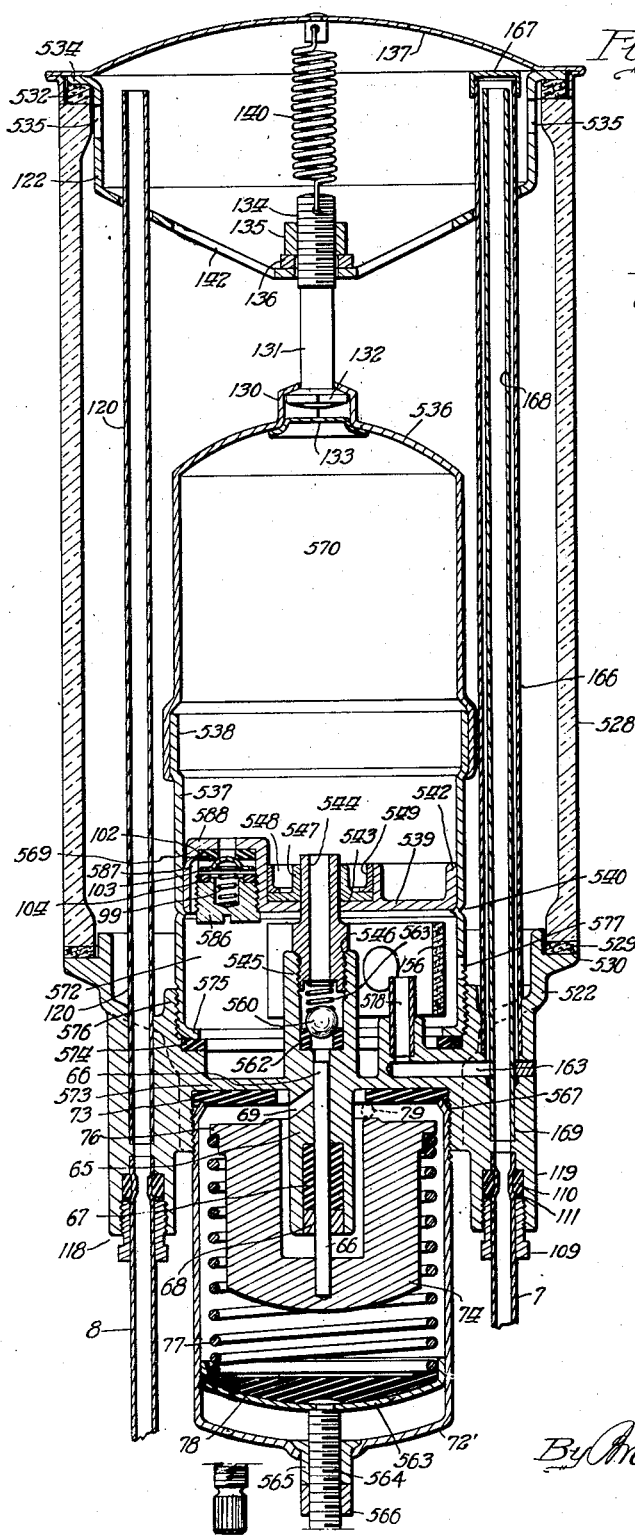
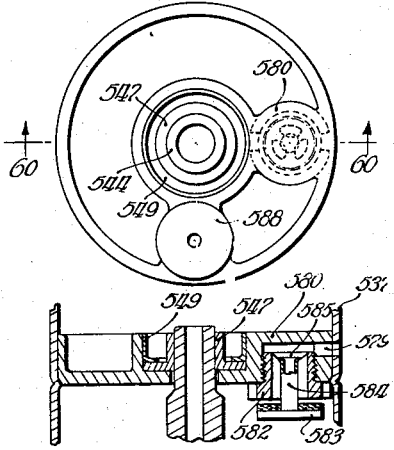
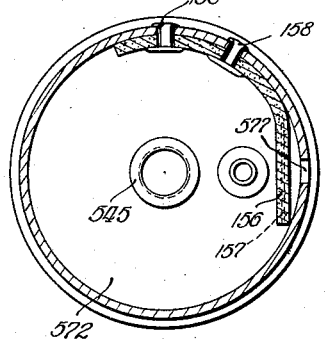
Inventor
Oscar U. Zerk
By Brown Jackson Boettcher Dienner
Attys.

April 23, 1935.  O. U. ZERK  1,998,746
LUBRICATING SYSTEM
Filed June 12, 1929  22 Sheets-Sheet 17

Inventor
Oscar U. Zerk
By Brown Jackson Boettcher & Diemer
Attys.

April 23, 1935.  O. U. ZERK  1,998,746
LUBRICATING SYSTEM
Filed June 12, 1929  22 Sheets-Sheet 18

Inventor
Oscar U. Zerk
By Brown Jackson Boucher Dennes
Atty.

April 23, 1935.  O. U. ZERK  1,998,746
LUBRICATING SYSTEM
Filed June 12, 1929  22 Sheets-Sheet 19
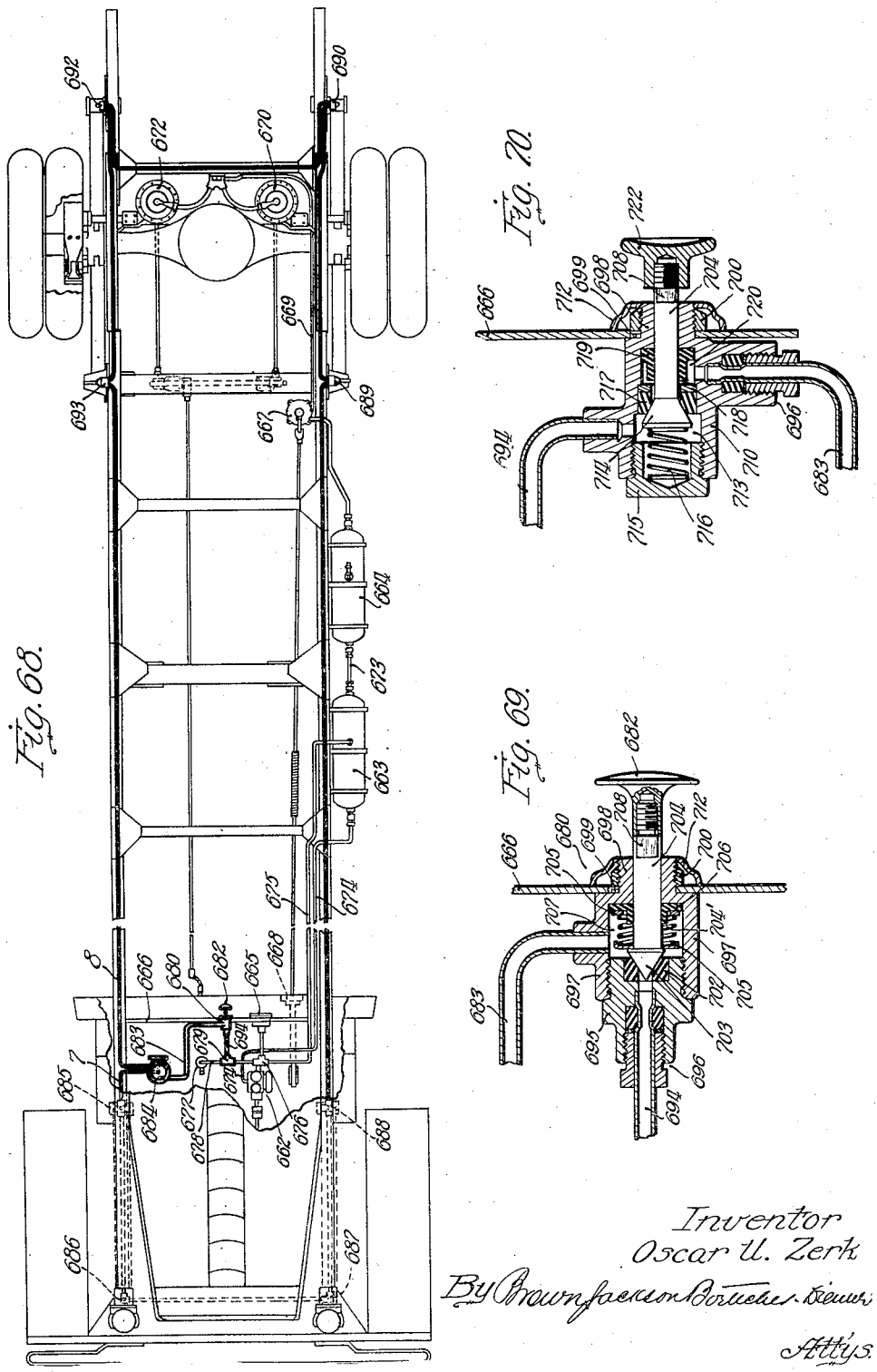
Inventor
Oscar U. Zerk April 23, 1935.  O. U. ZERK  1,998,746
LUBRICATING SYSTEM
Filed June 12, 1929  22 Sheets—Sheet 20
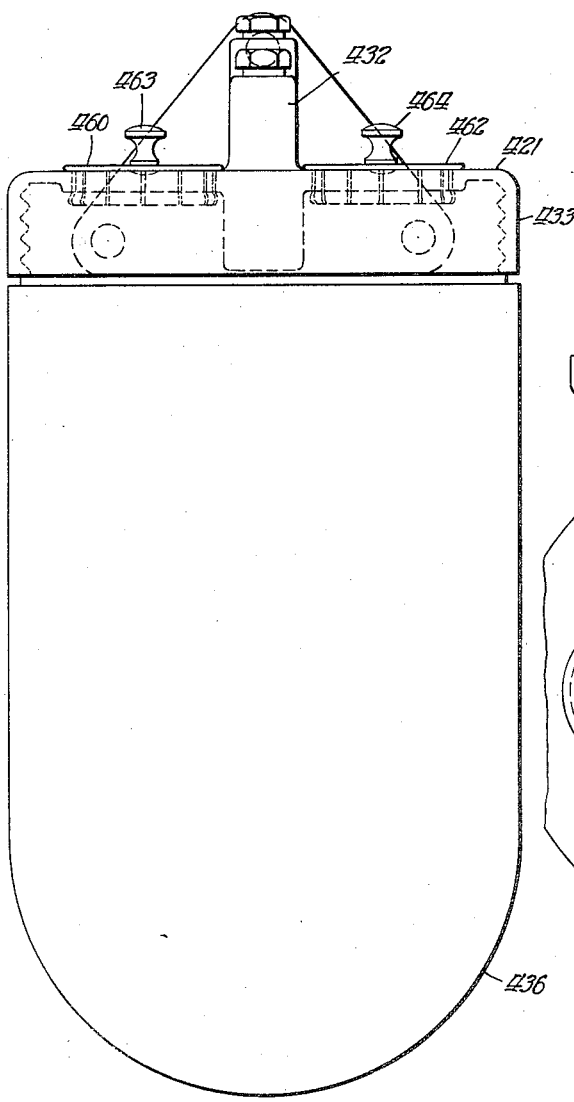
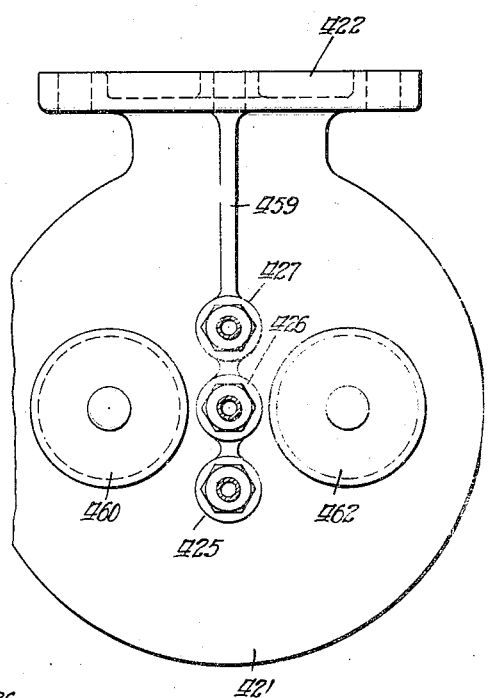
Inventor
Oscar U. Zerk
By Brown Jackson Boettcher & Dienner
Att'ys.

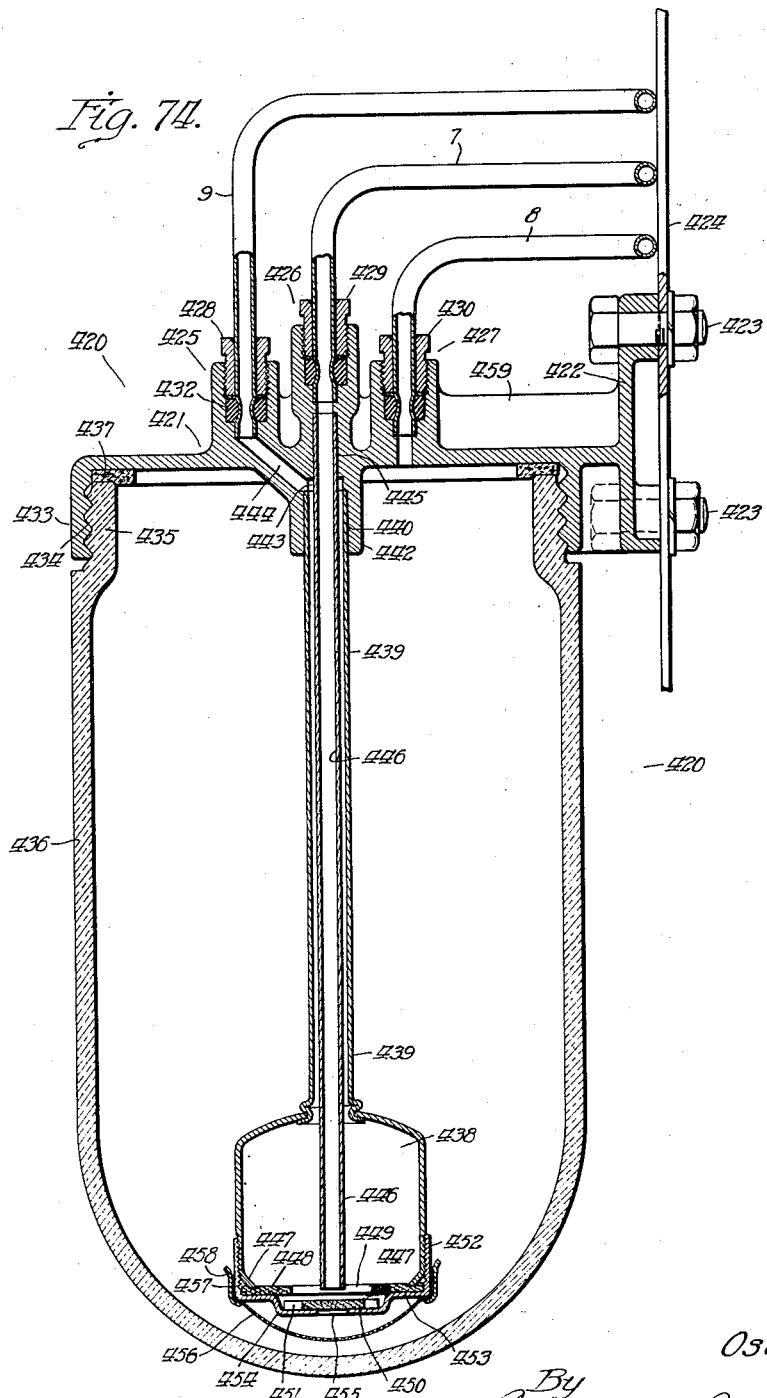

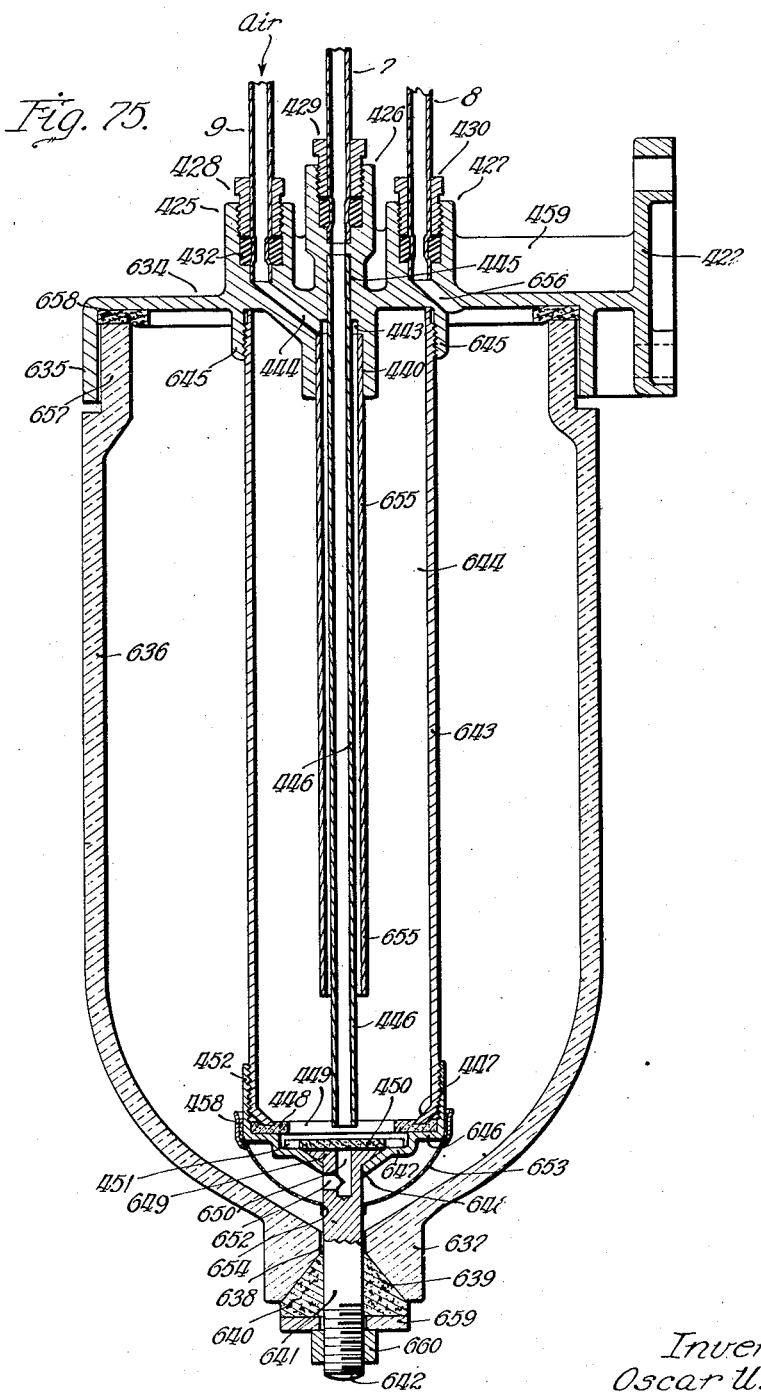

Patented Apr. 23, 1935

1,998,746

UNITED STATES PATENT OFFICE 1,998,746

LUBRICATING SYSTEM

Oscar U. Zerk, Chicago, Ill., assignor, by mesne assignments, to Stewart-Warner Corporation, Chicago, Ill., a corporation of Virginia Application June 12, 1929, Serial No. 370,245

31 Claims. (Cl. 184—7)

My invention relates to centralized lubrication. The system and method of lubrication of my invention is adaptable equally well to automotive work, more particularly to the lubrication of the chassis of vehicles such as automobiles, tractors, gun carriages, war tanks, locomotives, airplanes, etc., or to industrial lubrication, that is to the lubrication of stationary machines such as stamping presses, printing presses, textile machinery, shafting and all the numerous types of machines and machine tools of modern industry.

Prior methods of centralized lubrication employ an oil pump attached to an oil reservoir, a pipe line system leading from the pump to the bearings and metering units interposed between the pipe line and the various bearings. Of these metering units three types are employed, namely, pressure reservoir type, measuring valve type and resistance unit type.

In all three types of units the accurate metering of the oil depends upon the correct action of the metering units. In the pressure reservoir type and measuring valve type of unit this action depends upon the by-passing qualities and the accuracy of the unit. This accuracy is of paramount importance in the resistance units where variations of .0001 of an inch to .001 of an inch results in a variation in quantity emitted of the order of about ten to one (10 to 1) among the units of the system where equal emission is expected. In certain types of resistance units the difference between the outside diameter of the resistance unit plug and the inside diameter of the resistance unit body is only .0005 of an inch and accuracies of less than .0002 of an inch cannot be expected in quantity production.

Another important factor which enters into the matter of securing proper metering of oil with resistance units is the danger of deranging the entire process of lubrication when a lubricant of lower viscosity (thinner oil) is forced into the pipe line system after it was previously filled with a lubricant of higher viscosity (thicker oil). As soon as the thin oil has passed through a resistance unit nearest to the oil pump, all the thin oil with which the oil reservoir is now charged will escape through this one resistance unit or several of the proximate resistance units as the oil will choose the path of least resistance and, consequently, no lubricant whatsoever will pass throughout the entire system through the remaining resistance units.

This will be apparent when it is understood that the resistance of a resistance unit filled with heavy oil is often more than one hundred times as great as the resistance of a unit filled with thin oil, depending upon the viscosity of the oils. Once a pipe line is thus filled with oils of different viscosities and the break in lubrication has occurred, either the thin oil must be drained out of the reservoir and replaced with the previous grade of heavier oil or in case it is necessary to continue to use a thinner grade of oil because heavier oil cannot be obtained, the entire pipe line system and all resistance units must be freed of the heavy oil and this means that these parts must be disassembled, cleaned and again assembled. This is a difficult and expensive operation and it leaves the pipe line full of air thereby introducing further serious consequences which will be explained later.

A similar inequality in the distribution of oil takes place where resistance units of equal resistance are situated under different temperature conditions. An example of this is in automobile chassis systems, particularly when running in the wintertime where some of the bearings are situated under the hood near the hot engine and others outside as, for example, the king bolts, tie rod bolts, or shackle bolts that are exposed to outside temperatures. Likewise, in industrial lubrication some bearings may be situated near the cold floor and others near the warm ceiling.

In certain kinds of machinery some bearings are exposed to ordinary room temperatures and others are exposed to heat.

Another difficulty involved in connection with resistance units is the clogging of the minute passageway of the resistance units (.0005" in plain plug resistance units and .015" in coil plug resistance units) by impurities in the oil. If felt is used in advance of the resistance unit for filtering purposes a thick jelly-like deposit of impurities, usually called slime, will develop on top of the felt, and the tendency of the pressure of the lubricant is to force it into the felt with the result that the small felt plug which is of approximately only one-quarter of an inch outside diameter will either become thoroughly clogged and prevent any further passage of oil or it will become partly clogged with the result that the desired metering of oil will be disturbed.

The above explains some of the reasons why the present types of centralized lubricating systems employing resistance units and depending for their performance upon the use of a resistance medium as the sole metering means seemingly work well in the beginning but soon develop difficulties whereby certain bearings receive no lubricant while others are flooded or they receive an entirely different amount of lubricant—more or less—as anticipated.

Another hindrance to the proper operation of centralized lubricating systems using measuring valves or resistance units and which destroys the desired distribution of oil, is the presence of air in the pipe lines and metering units.

No centralized lubricating system of these types can be made to work properly unless and until all the air has been driven out of the entire pipe line system and out of all measuring valves or resistance units, and care has been taken to prevent the entry of any air into the system from an empty pump, or otherwise. Numerous attempts have been made to develop means for preventing air from entering the pipe line system from the pump.

However, the pump is not the only place from which air may enter the pipe line system. If after all the air has been driven out during the priming of the system and air again enters from any cause whatsoever, the true metering of oil will be interrupted.

Air can enter the pipe line system in either of two ways:

1. Air may enter in restricted amounts due to a faulty pump valve or due to the small air bubbles entrained with the oil. Such entrained air becomes disentrained when the oil is allowed to stand and it accumulates in the form of air bubbles in the pipe line system. Also, air may have accumulated at high spots or adhered to the inside of the pipe lines so that it could not be dislodged during the priming operation.

2. Air may enter the system due to atmospheric pressure, forcing the same through an opening in the pipe line system as, for example, in a cracked pipe line, no matter how fine the crack may be, or through a cracked or faulty pipe coupling screw, a faulty seat in the pipe coupling body into which the pipe plug is screwed, or when a single one of the hundred or more pipe couplings plugs employed in the system is not screwed down completely.

In case air should enter the pipe line system the following consequences result:

1. All true metering is at once destroyed. Metering units which should give equal amounts of oil now emit various amounts ranging from none at all to ten or one hundred times as much as normal.

2. In case metering units are employed utilizing spherical spring pressed check valves and there are two openings where atmospheric pressure can enter the pipe line system, most of the oil in the system will leak out through the lower break permitting air to be drawn into the system through the upper break.

Centralized systems using ball check valves often siphon out or drain out even where no break in the pipe line system occurs due to the inaccuracy of the balls or their seatings. The most accurate balls on the market, usually called "A" grade balls, have a variation from .0001 to .0002 of an inch in diameter. This variation is sufficient to permit atmospheric pressure to enter the pipe line system.

Where the metering units employ flexible check valves such, for instance, as valves made of Empire cloth and which operate only when no additional spring pressure is employed, all of these check valves, which are springless and weightless, will immediately open and the entire contents of oil in the pipe line system run out through the bearings and be supplanted by air if even the minutest crack in the pipe line or imperfection of pipe couplings occurs. Such entry of air also occurs due to imperfect manufacture or assembling of any of the parts.

The present invention provides a novel lubricating system and method of lubrication particularly applicable to centralized systems and which is characterized by freedom from most of the limitations of known systems.

The main object of this invention is to provide a system and method of metering oil in centralized lubrication which is substantially unaffected by and independent of such minutiae as small quantities of air and particles of dust that may enter the system. It is unaffected by and independent of variations in accuracy in quantity production of metering units, of small cracks in pipe lines and pipe coupling screws. It is not dependent upon perfect mechanical construction and assembly and upon a perfect memory or rigid observance of rules by the operator, or the adherence to the use of oil of the same viscosity at all times and no other.

Another important object of my invention is to make a centralized system of lubrication which is foolproof. Instead of attempting to prevent air from entering the pipe line system, I inject air into the system with the oil or behind the same, utilizing the air as a propelling medium for the oil.

Another important object of my invention is to provide a trap basin type of metering unit in place of the usual metering valve or resistance unit. The trap basin type of metering unit is filled during the time that oil and air are forced through the pipe line system. From the trap basin the oil can run to the bearing by gravity or capillary attraction after the pressure in the pipe line system has ceased thereby providing intermittent lubrication. Where continuous lubrication is desired a slightly different form of trap basin unit is employed.

Another object of the invention is to eliminate the use of the felt plug of the prior art with its attendant difficulties.

Another important object of my invention is to prevent oil which may remain in the pipe line system, as by adhering to the walls of the pipe, from running out of the system, draining out or siphoning out through the trap basin type of metering unit by disposing the pipe line system in such a manner that air and not oil remains above my metering units and all immediately communicating parts after the pressure has been released. This object is attained by draining the oil adhering to the walls of the pipe lines away from the trap basin so as to limit the oil metered to each unit to the volume of the trap cup.

Another object of my invention is to render the true metering qualities of my metering unit unaffected by variations in accuracy even though relatively large. I attain this object by employing a volume unit of measurement rather than a time unit of measurement or other unit of measurement.

Another object of my invention is to provide a system in which by-passing and unreliable metering is prevented by closing the metering unit during the period that pressure is applied thereby preventing oil from running into the bearing during the period of applied pressure. This form of my invention provides intermittent distribution of oil to the trap basin and intermittent lubrication. Another object of my invention is to provide a system which will secure continuous lubrication with intermittent distribution.

Another object of my invention is to provide a trap basin type of metering unit from which oil can run into the bearing after the pressure has ceased, no matter whether the bearing is below, above, or on the side of the metering unit.

Another object of my invention is to prevent the draining of oil from an oil line situated at a higher level through a metering unit situated at a lower level without the use of any check valves even though the difference in levels be relatively great.

Another object of my invention is to force through the pipe line system a predetermined amount of oil larger than the total amount that all the metering units can hold and return the excess of oil to the oil reservoir thereby rendering the size of pump and oil reservoir independent of the number of bearings to be lubricated so long as the same is large enough.

Another object of my invention is to prevent the inclusion or trapping of air in the trap basin unit during the filling operation. I cause the air in the trap basin unit to rise quickly and be conveyed away with the traveling charge of oil and air preferably by making the inside diameter of the measuring chamber larger than the inside diameter of the pipe line system, and by interposing means in the path of the fluid traveling in the pipe line to catch oil from the pipe line and let it run down into the measuring chamber, therefore forcing the air upwards. This interposed means acts, in case of an atomized mixture of oil and air, to cause precipitation of the atomized oil and the deposit of the desired amount of oil into the measuring chamber.

Another object of my invention is to provide means to foster a turbulence of oil and air to produce a condition similar to a spray which will always convey the oil forward through a long pipe line of small inside diameter irrespective of the viscosity and the surface tension of the oil.

Another object of my invention is to employ the horizontal oil columns lying in advance of and below each of the metering units for filling such units during the time that the main oil column in the pipe line system is driven forward.

Another object of my invention is to provide a system which will be able to employ heavy or thin oils alternately without endangering the true metering qualities of my trap basin type of metering units.

Another object of my invention is to provide a system which is capable of using kerosene or gasoline, or the like, throughout the entire extent of the same for the purpose of washing out all of the bearings.

Another object of my invention is to make the metering action of the system independent of the temperatures around the various metering units.

Another object of my invention is to provide a system which will work equally well at all times whether or not atmospheric pressure enters the pipe line system.

Another object of my invention is to provide progressive distribution of lubricant to all of the metering units, that is to say, oil is progressively distributed through the respective units one after the other in place of the usual system of simultaneously conveying oil through the pipe line system and driving the same into the bearings.

Another object of my invention is to reduce the danger of leakage and to reduce the cost of the system by eliminating all pipe coupling screws on the metering units by soldering the pipe lines to all of the T's and metering units.

Another object of my invention is to reduce the high cost of installing a centralized lubricating system by preforming and assembling the entire pipe line system including all T's, metering units and connections into a few assemblies which can easily be packed and shipped and then quickly be attached to the chassis of an automobile, or other machine, after soldering all pipe lines to all metering units either by pressing each metering unit into its corresponding bearing or by connecting it to its bearing by a single screw without turning the metering unit.

Another object of my invention is to supply a body of compressed air at a predetermined pressure upon a predetermined amount of lubricant to force the lubricant with the air through the pipe line system to the metering units.

Another object of my invention is to accumulate, or otherwise provide, a working charge of compressed air sufficiently in excess of theoretical requirements as to positively fill all trap basin metering units with oil irrespective of their distance from the oil reservoir.

Another object of my invention is to provide a system which will not be put out of order when the oil reservoir becomes empty.

Another object of my invention is to employ a central oil measuring chamber communicating with the lower part of the oil reservoir and having a predetermined capacity as great as or greater than the total capacity of all the metering units. The oil can run by gravity from the central oil reservoir into the central measuring chamber through an inlet valve, which is normally open and closed only by air pressure, or which is automatically opened or closed by preponderance of pressure upon opposite sides thereof.

Other objects of my invention will become apparent from the following specification and claims.

Now in order to acquaint those skilled in the art with the manner of constructing and operating a device embodying my invention, I shall describe in connection with the accompanying drawings a specific embodiment of the invention.

In the drawings:

Figure 1 is a diagrammatic top plan view of an automobile chassis with an automatic lubricating system of my invention shown as applied thereto;

Figure 2 is a side elevational view of the front part of an automobile chassis with parts cut away showing the application of parts of my lubricating system applied thereto;

Figure 3 is a front elevational view with parts broken away of a part of an automobile chassis showing a part of my lubricating system applied thereto;

Figure 4 is a view partly in section and partly in front elevation of a connection from the pipe line system to the front axle and connected parts;

Figure 5 is a fragmentary section taken on the line 5—5 of Figure 4;

Figure 6 is a fragmentary section taken on the line 6—6 of Figure 5;

Figure 7 is a fragmentary plan view of the front axle king pin and associated parts;

Figure 8 is a front elevational view partly in section;

Figure 9 is a fragmentary section taken on the line 9—9 of Figure 8;

Figure 10 is a side elevational view partly in section showing the rear end of the frame and spring and the manner of lubricating the connection between the spring and frame;

Figure 11 is a section taken on the line 11—11 of Figure 10;

Figure 12 is a similar section taken through the shackle at the rear end of the front spring;

Figure 20 is a longitudinal section through the pipe line and trap basin unit shown as connected to a bearing;

Figure 21 is a similar section of a unit with a larger trap basin;

Figure 22 shows the application of my trap basin unit to the bottom of a bearing and employing a wick;

Figure 23 is a similar section through a unit having a pipe from the trap basin to the bearing;

Figure 24 is a similar section through a trap basin unit having a cone connection to a member containing an oil duct;

Figure 25 is a similar section through a unit angularly disposed in the pipe line system and connected at an angle to a pipe leading to a bearing;

Figure 26 is a front view of the body employed in the unit of Figure 25;

Figure 27 is a horizontal cross section taken on the line 27—27 of Figure 26;

Figure 28 is a vertical section taken on the line 28—28 of Figure 27;

Figure 29 is a similar section of an angle unit;

Figure 30 is a section through the pipe line and connections to a unit disposed at a level above the pipe line;

Figure 31 is a similar view of a modified form of the same;

Figure 32 is an end view of the T connection and manner of mounting the same, the T connection being shown in Figures 30 and 31;

Figure 33 is a side elevational view, partly diagrammatic, of the manner of trapping the pipe which extends at an incline;

Figure 34 is a longitudinal section through the pipe line and unit of a form of unit connected to the bearing socket by a drive piston;

Figure 35 shows a modified form of the same employing a larger trap basin;

Figure 36 shows an angularly disposed trap basin unit which is mounted in place by a drive fit;

Figure 37 shows a longitudinal section to the connected pipe line and a unit disposed above the pipe line, the unit being connected to its bearing socket by a drive fit;

Figure 38 is a similar section having the bearing disposed above the pipe line and fed by a wick in the trap basin, the unit being secured in the bearing socket by a drive fit;

Figure 39 is a view similar to Figure 37 showing a modified form of trap basin unit disposed above the pipe line system and secured to the bearing socket by a drive fit;

Figure 40 is a sectional view of a unit like that shown in Figure 25 employing, however, a resistance unit and screen in the lower end of the trap basin;

Figure 41 is a cross sectional view taken on the line 41—41 of Figure 40;

Figure 42 is a longitudinal section through the pipe line and trap basin unit showing the use of a screen and resistance plug;

Figure 43 is a longitudinal section to the pipe line and trap basin unit connected through a pipe to a remote bearing and employing a screen and resistance plug in the outlets of the trap basin;

Figure 44 is an end view on an enlarged scale of the pin which is secured to the plug in the upper end of the trap basin unit of my invention;

Figure 45 shows the manner in which the pin assists in precipitating the oil into the bottom of the trap basin unit so as to permit the air to rise and be discharged out of the same;

Figure 46 is a modification of the structure shown in Figure 42 where the unit is attached by a drive fit;

Figure 47 is a view like that shown in Figure 30, showing the resistance cup and screen employed in the outlet of the trap basin;

Figure 48 is a sectional view of an L shaped fitting utilizing a resistance plug in the outlet of the trap basin;

Figure 49 is a view like Figure 31 showing the use of the screen and resistance plug in the outlet of the trap basin;

Figures 50, 51, 52, 53, 54 and 55 are diagrammatic side elevational views of the system of my invention showing the operation of driving oil through the pipe line system and filling the trap basins and the discharge of the trap basins into the bearings;

Figure 50 shows the charge of oil being driven along the pipe line system;

Figure 51 shows the oil passing over the first trap basin unit;

Figure 52 shows the first trap basin unit filled and the body of oil filling the second trap basin unit;

Figure 53 shows the oil passing on and filling the third trap basin;

Figure 54 shows all of the trap basin units filled and the remainder of the body of oil passing back into the reservoir;

Figure 55 shows the return discharge operation complete, the draining of the film of oil on the inside of the pipe into the trap portions of the pipe line system and the opening of the trap basins and discharge of oil into the bearings;

Figure 56 is a side elevational view of the front parts of an automobile with parts cut away, showing the combined compressor and discharge units mounted in the front part of the frame with connections for distributing the oil to various bearings;

Figure 57 is a vertical longitudinal section through the combination units including the oil reservoir, compressed air reservoir, the pneumatic displacement pump and the air compressor;

Figure 58 is a horizontal cross section through the pneumatic displacement chamber showing the inlet valve;

Figure 59 is a top plan view of the plate between the air reservoir and the pneumatic displacement chamber;

Figure 60 is a section taken on the line 60—60 of Figure 59;

Figure 65 is a top plan view of a multiple trap basin unit of my invention;

Figure 66 is a vertical section taken on the line 66—66 of Figure 65;

Figure 67 is an end view of the unit shown in Figure 65;

Figure 68 is a top plan view of a vehicle chassis having a pneumatic air braking system and employing in conjunction therewith the lubricating system of my invention;

Figure 69 is a longitudinal section through one form of valve of my invention to be employed in connection with the system shown in Figure 68;

Figure 70 is a similar sectional view of another form of valve to be used in connection with the system shown in Figure 68;

Figure 72 is a front view of an oil supply reservoir and displacement pump in which the oil reservoir is of the depending type;

Figure 73 is a top plan view of the same;

Figure 74 is a vertical section of the same; and

Figure 75 is a vertical section of a similar unit in which the depending oil reservoir is supported by central rods.

Figure 13:
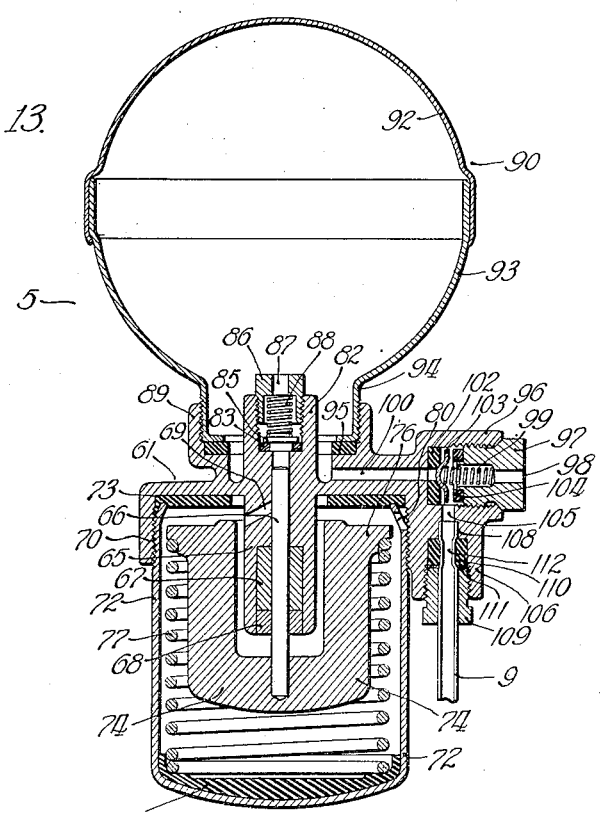
Figure 13 is a vertical longitudinal section through the automatic air pump and reservoir taken on the line 13—13 of Figure 14.

I disclose herein four typical systems all embodying my invention, but I do not intend to limit the invention to these forms;—

A. An automatic inertia operated type air pump with air pressure reservoir, a separate preferably transparent oil reservoir unit with oil measuring chamber for lubricating the entire chassis at one time, a new type of quickly attachable pipe line unit system and my trap basin type of metering unit.

B. A combination automatic inertia operated air pump with air pressure reservoir built into the oil reservoir unit including a pneumatic pump having an oil measuring chamber for lubricating the entire chassis at one time, a new type of quickly attachable pipe line unit system and my trap basin type of metering unit.

C. A manually operated air pump, a separate preferably transparent oil reservoir unit with built in air pressure reservoir and oil measuring chamber for lubricating the entire chassis at one time, a new type of quick attachable pipe line unit system and my trap basin type of metering units.

D. A separate source of air pressure, an oil reservoir unit containing a pneumatic displacement pump having a combined oil measuring chamber and air pressure reservoir for performing one lubricating operation for the entire chassis with a new type of quickly attachable pipe line unit system, my trap basin type of metering unit, and a manual control valve for governing the admission of a charge of air to the pneumatic displacement pump.

In each form I force compressed air into a displacement chamber of a pneumatic pump element, which chamber is also a measuring chamber. This measuring chamber is filled from the central oil reservoir with a predetermined amount of lubricant, which amount is greater than the combined capacities of all the metering units and serves at each operation to lubricate all the chassis bearings. The oil from this displacement chamber flows under air pressure through the pipe line and progressively fills one metering unit after another. The air is not cut off when the displacement chamber is emptied but is permitted to follow and propel the oil in a moving column so as to drive all the surplus oil from the pipe line and return the surplus to the oil reservoir.

The outlets from the metering unit are sufficiently restricted during the pressure period, that is, during the time that the air is driving the oil under pressure through the pipe line system and successively filling the trap basins that all of the trap basins will remain filled with oil at the end of the forcing operation. Where intermittent lubrication is desired the outlets to the bearings may be closed during the pressure period and opened again after the pressure in the pipe line system has been substantially reduced to atmospheric pressure. The oil then will run into the bearings by gravity. Where continuous lubrication is desired the restrictions in the outlets of the trap basins practically stop the flow of oil to the bearings during the relatively short pressure period and the continued flow of the oil in the pipe line system during the pressure period will keep the trap basins filled with oil during the pressure period.

After the pressure is released by the discharge of the surplus oil back to the oil reservoir the oil may then run through the restrictions into the bearings by gravity.

I may employ any suitable means which will perform the function of preventing excessive outflow during the pressure period, and this means may act either to cut off the outlets completely or partially by the application of pressure, or it may be merely a fixed restriction which will limit the rate of oil outflow to a predetermined value.

Referring first to Figure 1, three main parts of the system are shown upon the chassis 1. These parts are respectively the oil reservoir unit 2 which is mounted by means of a suitable bracket 3 upon the dashboard or bulkhead 4 of the chassis frame. The second element is the automatic air pump and air pressure reservoir unit 5 which is mounted upon the front end of the frame or some connected part as shown in Figure 1. The third part is a distributing or pipe line system 6 which comprises a closed loop of piping having the outgoing end 7 and the return end 8.

An air pipe 9 extends between the compressor and reservoir units and the oil reservoir unit 2 to provide the charge of air for each working operation.

The outgoing pipe line system extends successively to trap basin units for various bearings on the chassis and from the last trap basin unit in the series, the return pipe 8 leads back to the oil reservoir unit 2 as will be described more in detail. Referring particularly to Figure 1, the first units which are termed the trap basin units to which oil is delivered is the unit 10 which conducts oil to the shackle for the rear end of the right front spring.

The next trap basin unit 12 is located on the front horn of the frame and it has an outlet which is connected by the pipe 13 to the front spring bolt 14.

From the trap basin unit 12 the pipe line extends back to a fitting 15 on the frame. From the fitting 15 a flexible connection 16 extends over to a special trap basin unit 17, the outlet of which shown at 18 extends to the right front steering knuckle. The unit 17 has a top outlet through a pipe 19 to a trap basin unit 20 and from thence to another trap basin unit 21 for lubricating the front wheel brake operating mechanism. The pipe line system then continues through a pipe 22 disposed on the back of the front axle to the left side of the chassis. Here the pipe 22 is connected to a trap basin unit 23 which is similar to the trap basin unit 17 having a top connection leading to the trap basin units 24 and 25. The pipe line system then continues through the flexible connection 26 to the special fitting 27 on the frame which is like the fitting 15. From here the pipe line system continues to the trap basin unit 28 having its outlet extending through pipe 29 to the left front spring bolt 30. From the trap basin unit 28 the pipe line continues as pipe 32 to the trap basin unit 33 for lubricating the shackle at the rear of the left front spring. From the unit 33 the pipe line system extends as the pipe 34 to the trap basin unit 35 for lubricating the spring bolt 36 at the front end of the left rear spring. The details of this connection are shown in Figure 12 and will be explained later. The pipe line system then extends on as pipe 38 to the trap basin unit 39 which has its outlet connected by pipe 40 to the rear shackle 41, the details of which are shown in Figure 11 and will be more fully explained later.

From the trap basin unit 39 the pipe line system extends as pipe 43 to the special fitting 44 which leads through the flexible connection 45 to the trap basin unit 46 for lubricating the rear wheel brake mechanism.

From this point the pipe line system extends crosswise to a trap basin unit 47 for lubricating the spring or shock absorber connections. From thence, the pipe line system extends to the unit 48 for lubricating the brake operating mechanism on the left side. From thence, the pipe line system extends to the trap basin unit 49 for lubricating the brake operating mechanism on the right side, thence to the unit 50 for lubricating the rear spring or shock absorber connection, thence to the unit 52 for lubricating the rear wheel brake mechanism. From the unit 52 the pipe line system extends in the form of the flexible hose 53 to the connection 54. From this point the pipe line system extends in the form of pipe 55 to the trap basin unit 56, the outlet of which is connected through pipe 57 to the rear shackle connection 58 of the right rear spring. From the unit 56 the pipe line system extends forward through the pipe 59 to the unit 60, the outlet of which leads to the front shackle of the right rear spring. From the unit 60, the pipe line system returns as return pipe 8 to the oil supply reservoir 2.

The above general description of the manner in which a system embodying my invention may be laid into the chassis of an automobile is intended to be explanatory and not limiting.

That is to say there are many other connections which may be made, some of which will be described more in detail and some of which will be apparent to those skilled in the art. The automatic inertia operated air pump 5 is preferably but not necessarily situated at the front of the automobile. In Figures 2 and 3 are shown a construction in which this unit is mounted as by means of the bracket 62 to the center brackets 63 on the inside of the right front center.

Here it is in a highly accessible position, yet is out of the way and substantially free of dust raised by the automobile. The maximum velocity of vibration is on the axles and the air compressor unit 5 might be mounted on either axle. Whenever the air pump unit is connected in an exposed place it is important to attach the same in a position where the relative swinging motion of frame and axle does not interfere with the pump and its connections. By mounting the unit 5 upon the chassis frame, sufficient amplitude and velocity of oscillation is secured to provide satisfactory operation and at the same time the connections to the oil reservoir are greatly simplified.

TYPE A

*General description of my automatic lubricating system*

While any kind of automatic air pump may be employed in connection with my invention, I have shown in the present system an inertia type of air pump since it may be operated without additional driving connection.

While the inertia operated air pump may be mounted on the dashboard of the automobile, I prefer to connect it at a point where it will receive ample movement, that is, a part which will have maximum amplitude of oscillation and maximum velocity of motion so as to secure the required inertia effect. The pump may be mounted on the axles or on the front or rear ends of the frame or other parts connected to the same. Preferably the pump is mounted on the inside of one of the front centers.

The automatic system with separate automatic air pump reservoir is shown in Figures 1 to 55, inclusive.

I shall now describe in detail the automatic air pump with its connected air pressure reservoir.

*The automatic air pump with air pressure reservoir*

Figure 14:
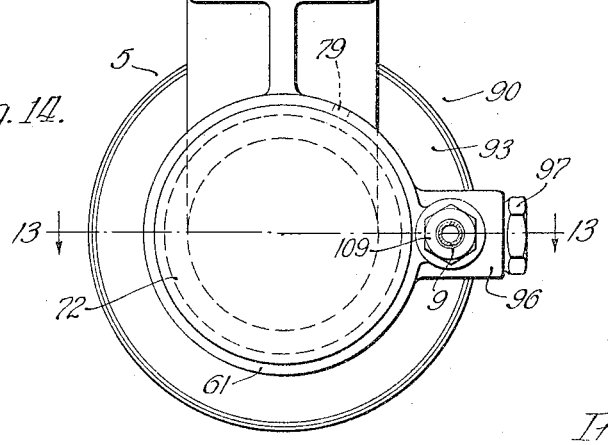
Figure 14 is a bottom plan view of the same.

Referring more particularly to Figures 13 and 14, the air compressor unit 5 comprises a frame member 61 having an integral bracket 62 adapted to be connected to a suitable support which is shown in Figures 3 and 4 as the front fender bracket 63. Any suitable form of bracket 62 may be employed which is desired to mount the units in the preferred position.

This frame member 61 has a vertical cylinder 65 provided with a bore in which there is seated the plunger piston 66. The lower end of the cylinder member 65 is counterbored and a body of solid or semi-solid lubricating material 67 such as graphite or the like is placed in the counterbore and the end of the counterbore is closed as by means of a plug 68 which may be threaded in or pressed in or otherwise suitably secured.

This plug 68 forms a guide for the lower end of the plunger piston 66.

An inlet passageway 69 terminating in an overrunning port into the bore of the cylinder extends through the cylinder wall below the main body of the frame 61.

The lower part of the frame has a threaded socket 70 into which is threaded the upper end of a cup 72, the edges of the cup bearing against a washer or disc 73 which is preferably of a rubber composition, this disc or washer having the dual function of gripping the upper end of the cup to form a tight joint, also to assist in preventing loosening of the cup 72 and the inner margin of the same forming a bumper and silencer for the inertia weight 74. This inertia weight has a hollow recess adapted to embrace loosely the cylinder 65 and to be secured as by means of a press fit or the like to the lower end of the plunger 66. The inertia weight 74 has an outwardly extending flange 76 forming a seat for the upper end of the compression spring 77. The main body is reduced in diameter so as to clear the coils of the spring 77 as the weight plays up and down. The ends of the spring 77 are formed substantially at right angles to the central axis of the spring so that the weight is supported in a position to put a minimum of side strain upon the plunger 66.

The lower end of the spring 77 rests upon the margins of a bumper pad 78 which is preferably formed of an elastic material such as a rubber composition. This bumper has a dual function, namely, it quiets the operation of the device, it serves to increase the rebound effect by assisting the spring 77 and the margins of the bumper 78 are turned up about the lower end of the spring 77 so as to space the spring away from the walls of the stamped cup 72.

The spring is thereby kept out of contact with the cup and out of contact with the weight so that the weight 74 oscillates freely at all times being guided only upon the plunger 66.

The upper end of the cup is turned in slightly so as to provide a narrow channel between the margin of the cup and the screw socket. An air inlet passageway indicated at dotted lines at 79 in Figure 14 extends through the side walls of the socket adjacent the bracket portion 62 and permits air to enter in the channel between the margin of the cup and the socket in which it is threaded. An opening 80 in the margin of the cup provides communication between the annular channel and the interior of the cup to the air inlet passageway 69 in the wall of the cylinder 65.

At the upper end of the cylinder which projects above the main frame 61, a discharge check valve housing 82 is formed preferably integral with the frame and cylinder. The bore of the cylinder extends directly into the housing. The housing 82 is counterbored and a resilient valve seat member 83 is seated at the bottom of the counterbore to form a valve seat for the disc valve 85 which disc valve is the discharge valve for the compressor. The upper end of the housing 82 is closed by a screw threaded plug 86 which has a central bore 87 therethrough and a counterbore for receiving the exhaust valve spring 88.

A threaded socket member 89 surrounds the housing 82 and is preferably formed integral with the frame member 61. An air tank or reservoir of substantially spherical shape indicated at 90 is formed of two sheet metal parts 92 and 93. These parts are spun and soldered together. The lower part 93 has a threaded neck 94 with the end thereof clamped in to engage a gasket 95 to form a tight joint between the air reservoir 90 and the frame 61. The frame member 61 has a laterally extending part forming a valve housing 96. The valve housing 96 has a plug 97 threaded in the outer end thereof. This plug has an atmospheric passageway 98 leading to the interior of the housing 96. The passageway 98 is counterbored to receive the outer end of the compression spring 99. The housing 96 communicates with a passageway 100 leading to the interior of the air reservoir 90. The outer end of the passageway 100 terminates in a port surrounded by an elastic or semi-elastic valve seat 102 preferably formed of a rubber composition. This valve seat is adapted to be engaged by the disc valve 103 which has a central projection cooperating with the port in the valve seat to close off the passageway.

The central projection on the valve member 103 is of relatively small diameter so that a relatively high pressure in the passageway 100 will be required to unseat the valve against the tension of the spring 99.

Back of the valve 103 is provided a semi-elastic or elastic seat member 104 surrounding the counterbore in which the spring 99 is seated.

This seat 104 is adapted to be engaged by the marginal part of the valve member 103 and to be held there against by pressure of compressed air in the housing 96 after the valve is once opened. The seat member 104 is held in place in any suitable manner on the plug 97, as for example by providing a reduced neck which extends part way inside of the seat member 104.

A lateral outlet passageway 105 leads through a threaded socket member 106 which is formed preferably integral with the frame member 61. A small pipe 9 which is preferably made of copper is seated at its inner end in a seat 108 to provide a fairly close fit. The socket member 106 is counterbored beyond this and exerted to receive the compression plug or nut 109 which embraces the pipe 9. In a recess under the plug I dispose a ring-like packing member 110 formed of rubber or similar elastic material which may be compressed and deformed by screwing the nut 109. Between the end of the nut 109 and the face of the rubber ring 110, I dispose a thin metal washer to reduce the friction between the rubber ring and the nut 109. This washer is indicated at 111.

Now by turning up the nut 109 to deform the rubber ring 110, it will be caused to expand radially inwardly upon the walls of the pipe 9 and if the pressure of the nut 109 is high enough, the rubber or like material will tend to shrink the copper tube as has been indicated in somewhat exaggerated form at 112. It is not necessary for the rubber ring actually to shrink or partially collapse the wall of the tube in order to obtain a firm grip upon the same.

This form of connection forms a new type coupling which may easily produce a fluid-tight joint. A joint so produced has no tendency to rattle lose because of the elastic character of the sealing ring.

The operation of the automatic inertia pump is as follows: As the automobile passes over irregularities in the road, the axles will be oscillated more violently than the chassis frame or other parts connected with the frame. It has been found that the chassis frame has a longer period of oscillation and the extreme ends of the frame have the greatest amplitude of oscillation. The relative great amplitude of oscillation together with a relatively longer period gives the pump of my invention more time to make the stroke. This is desirable to insure complete strokes of the pump.

The inertia weight may be balanced on the spring 77 in substantially a mid-position as shown in Figure 13, then when the frame is moved upwardly by an inequality in the road, the frame member 61 of the unit 5 is carried up and a weight 74 tends to remain and hence is relatively carried down. The rebound of the main automobile springs may be great enough to carry the weight 74 into engagement with the rebound member 78 thereby materially increasing the power of the compression stroke which follows. When the plunger 70 is drawn down below the inlet port 69, air will fill the cylinder and immediately upon downward movement of the frame and upward rebound of the weight 74 from the rebound member 78, the plunger 70 will be thrown towards the upper end of the stroke, driving air past the discharge check valve 85 and into the air reservoir 90.

The resiliency of the rubber disc 78 affords greater resistance to movement than does the spring 77. A secondary spring could be employed but rubber is preferable on account of its sound deadening qualities. The rebound member 78 should not be too soft nor too thick. It should not be too resilient otherwise the rebound would be excessive when the car is going over a rough road. Upon upward throw of the inertia weight and the piston 66, air will be driven ahead of the piston and this affords a resistance tending to check the motion of the weights and the bore but if the resistance of the compressed air discharging into the reservoir 90 is not sufficient to check the motion of the weight 74, the weight may engage the elastic disc 73.

The differential valve 103 is preferably adjusted to open at a relatively high pressure and close at a relatively low pressure. For example, I may make the relation of the inlet area to the area of the valve resting against its back seat 104 of the order of one to fifteen. The valve may be set to open at any desired pressure, but I prefer to have it open at approximately 30 pounds per square inch in the reservoir 90 and again to close at approximately two pounds pressure, such pressure as remains in the pipe 9 and connected parts being thereupon exhausted to atmosphere through the atmospheric passageway 98.

If desired, the atmospheric passageway 98 may be dispensed with and the change in area to which air pressure is applied upon opening the valve may be relied upon for securing a reduction in pressure in the air reservoir 90 and the application of a charge of compressed air to the hydraulic displacement pump hereinafter to be described.

The amount of air which is required for the operation of the operated device, in this case the pneumatic displacement pump governs the selection of the proper size of reservoir 90. Also depending upon the pressure which is carried in the reservoir 90, its size may be suitably proportioned. In the system which I have shown the reservoir may be of approximately 3 inches diameter and will contain 13⅓ cubic inches at zero gauge pressure and at 30 pounds gauge pressure, it will contain 40 cubic inches of free air, 3 atmospheric fillings. This air will be supplied to the pneumatic displacement pump and will be sufficient to perform one lubricating operation for standard types of automobiles. In case of automobile trucks or industrial lubrication, larger or smaller air pressure reservoirs can be used in connection with air pumps of the same or different cylinder displacement, all within the skill of the art.

Oil reservoir unit

The oil reservoir unit may be constructed as a bottom supported unit or as a top supported unit. The bottom supported unit is shown in one form in Figures 15 to 19 and in another form in Figure 75 and the top supported unit is shown in Figures 72 to 74.

The bottom supported oil reservoir unit is shown generally in Figures 1 and 2 and shown in detail in Figures 15 to 19, inclusive. It comprises a frame member 115 forming a base for the transparent cylinder 116 which is preferably made of glass. The frame member 115 has an integral bracket member 3 by which the unit 2 is mounted. The frame member 115 has three pipe connection sockets 117, 118, and 119.

The air inlet pipe 9 is connected to the socket 117, the oil discharge pipe leading to the trap basin unit is connected to the socket 119 and a return pipe 8 from the pipe line system is connected to the socket 118. These pipes are connected by the compression type of coupling heretofore described in connection with Figure 13.

Figure 15:
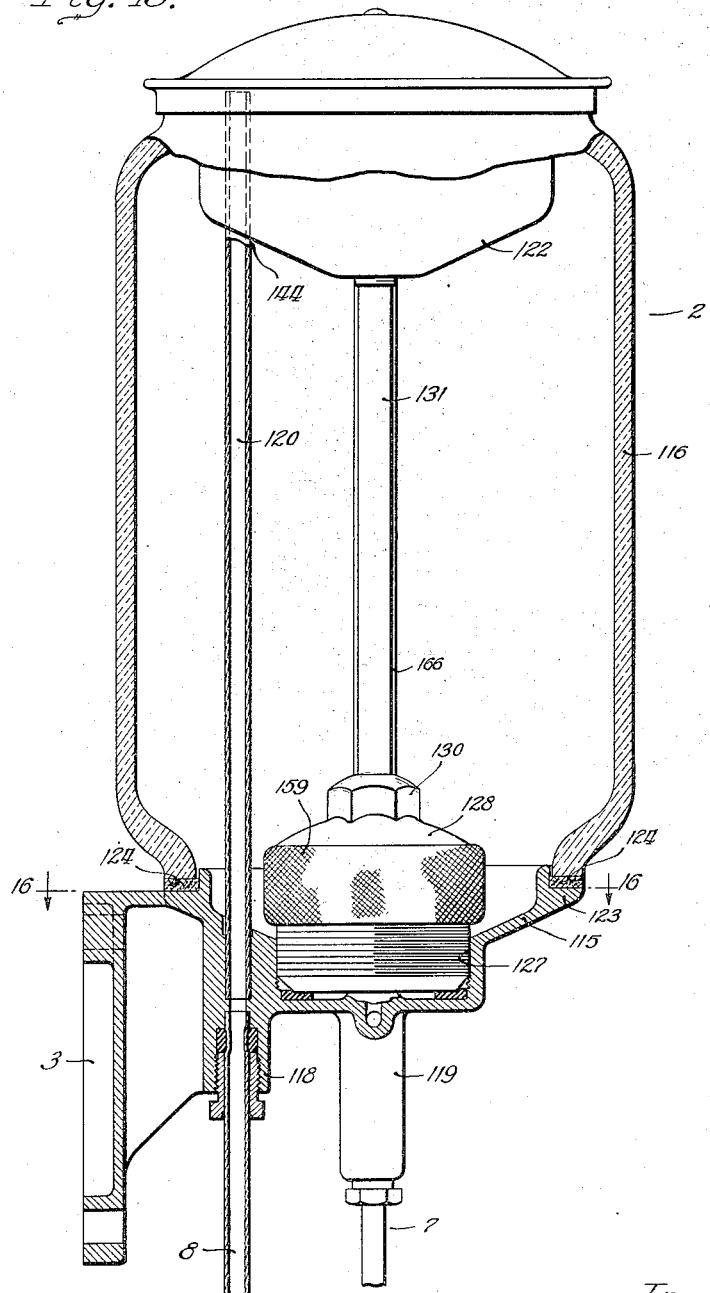
Figure 15 is a side elevational view partly in section showing the oil reservoir and air displacement pump.
Figure 16:
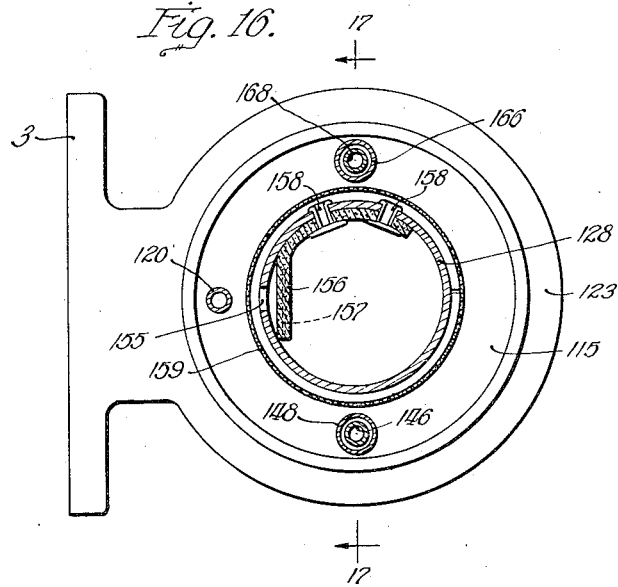
Figure 16 is a horizontal cross section taken on the line 16—16 of Figure 15.
Figure 19:
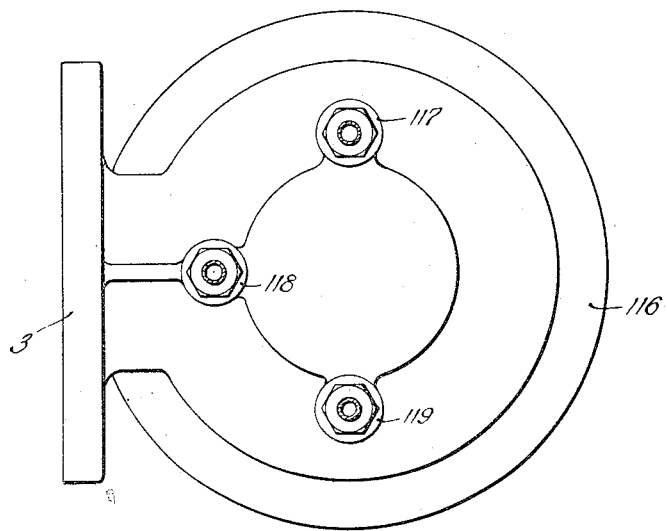
Figure 19 is a bottom plan view of the unit shown in Figure 17.

Since they are all alike further description need not be given. The return pipe 8 is coupled into the frame member 115 and said frame member has a standpipe 120 driven through a socket formed in the frame member 115 and communicating with said pipe 8. The upper end of the standpipe 120 extends up to a level with the top of the glass sleeve 116 within the sheet metal bracket or attaching cup 122 as shown in Figure 15.

The upper end of the pipe 120 may be restricted although it is not essential that it be so.

The glass cylinder 116 is seated upon a bracket 123 formed on the frame member 115, this annular bracket having a cork or other gasket 124 compressed between the lower contracted end of the glass cylinder 116 and said bracket for maintaining a tight joint. At the upper end of the cylinder 116, the sheet metal spider or attaching cup 122 has a flange 125 which extends over the contracted end of the sleeve 116 and rests upon a cork or other gasket 126 which is interposed between the flange of the cup and the end of the cylinder 116. I use the two resilient cork gaskets at both ends of the glass cylinder 116 to equalize the pressure and prevent breakage of the glass. The central part of the frame member 115 is provided with a depression or socket of circular formation, the inner periphery of which is threaded as shown at 127.

Into this threaded socket the sheet metal displacement chamber 128 is threaded. The lower margin of the chamber 128 bears against a gasket 129 for making a fluid-tight joint. The margin of the chamber 128 is preferably turned in to secure a bearing centrally of the gasket 129 to assist in making a satisfactory fluid-tight joint. The chamber 128 is preferably formed of drawn sheet metal and it has at the upper end thereof a drawn hollow boss 130, the upper end of which is perforated and the shank of the tie rod or bolt 131 is passed through the perforation.

The bolt or tie rod 131 has a head member 132 at its lower end which is preferably of hexagon or other polygonal conformation to conform to the shape of the hollow boss 130 and to be relatively non-rotatable with respect thereto. A plate 133 is soldered to the top of the chamber closing off the hollow boss 130 so as to provide a fluid-tight joint at this point to seal the dome of the chamber 128.

The upper end of the rod 131 extends through the bottom of the sheet metal brackets or cup member 122 and the upper end of the rod has a rolled thread 134 which is engaged by a nut 135 bearing against the bracket or cup 122 to draw the bolt or rod 131 in tension for mounting the glass sleeve 116 to provide an oil supply reservoir. A washer 136 is placed under the nut 135 to ease a drawing up of this bolt.

A convex sheet metal cover 137 having an outwardly extending flange 138 and a depending flange 139 bracing the margin of the flange 125 and the upper end of the glass sleeve 116 gives the oil supply reservoir a finished appearance and closes the oil supply reservoir against the entrance of foreign matter.

The cover member 137 is held in place by a tension spring 140 which is hooked through a hole in the upper end of the rod 131 at one end and through a pin secured in the central part of the cover 137 in the other. The cover 137 may be easily displaced by stretching the spring 140 so as to provide access to the cup or bracket 122 for filling the reservoir with suitable lubricant which preferably is a fairly heavy machine oil.

The cup for bracket 122 is provided with a number of openings such as 142 so that oil may be dumped into the cup 122 and will run down into the reservoir 116.

This cup 122 is provided with three openings 143, 144, and 145. The opening 144 is occupied by the standpipe 120 of the return pipe 8. The opening 143 is occupied by the trap of the air inlet pipe 9 and the opening 145 is occupied by the trap of the oil outlet pipe 7. The air inlet pipe 9 communicates with a tube 146 which is set in a socket 147 in the base member 115. Above the socket 147 is a counterbore which communicates with the inside of a tube 148 likewise set in a concentric socket above the socket 147.

The outer tube 148 is provided with a cap 150 soldered upon the upper end thereof. The inner tube 146 extends up to a point adjacent the cap 150. The inner tube at its upper end may be provided with three or more lips or prongs stuck out for centering the inner tube with respect to the outer tube.

The counterbore at the lower end of the outer tube 148 communicates with the cross passageway 152 which in turn communicates with a vertical passageway 153. The vertical passageway 153 communicates with the short standpipe tube 154 which is set in a socket in the bottom of the frame member 115 and within the displacement chamber 128. The standpipe tube 154 extends up into the dome of the chamber 128. An inlet passageway 155 is formed as an opening through the side walls of the chamber 128, this inlet opening being controlled by an automatic check valve 156 which is preferably formed of a piece of leather with pins or wires 157 extending endwise along the upper and lower edges.

These wires are formed of spring stock and tend to hold the valve in normally open position, the valve being however closed by the application of air pressure to the chamber. The body of the piece of leather between the spring pins is quite flexible and tends to be driven against the valve port 155 by an increase of internal pressure in the chamber 128. The rear of the valve member 156 is fastened by a pair of tubular rivets 158, 158 which extend through and are spun over the outside of the chamber 128. The inlet opening 155 is guarded by a screen 159 which is spaced away from the walls of the chamber 128 by a pair of wire rings 160, 160 above and below the opening 155. The screen is cylindrical and it has its upper and lower margins extending into contact with the rings 160 and the margin of the screen and the rings are soldered to the cylindrical walls of the chamber 128. Thereby a screen of relatively large area is provided and inside of the screen there is an annular passageway leading to the opening 155.

Any foreign material which is screened out of the oil tends to drop below the screen 159, space being allowed below said screen to prevent clogging of the same by foreign matter.

The discharge passageway of the chamber comprises an opening 162 extending down into communication with a transversely drilled passageway 163, the outer end of which is plugged at 164. This passageway 163 communicates with a counterbore 165, communicating with the interior of an external concentric pipe 166 which is set into a socket formed in the metal above the counterbore 165. The upper end of the outer tube 166 is capped by a sheet metal cap 167 which is pressed upon the end of the pipe and soldered.

An inner pipe 168 extends from a point slightly below the cap 167 down into a bore 169 formed in the body of the frame member 115 in line with the air and lubricant outlet pipe 7.

The upper end of the pipe 168 is provided with prongs or lips, preferably three in number, for centering the inner pipe with respect to the outer pipe 166.

Now it can be seen that the unit 2 comprises an oil reservoir with a pneumatic displacement pump consisting of the chamber 128 having the automatic inlet check valve 156, the trap discharge outlet 162 and the trap inlet pipe 154 communicating therewith.

Figure 17:
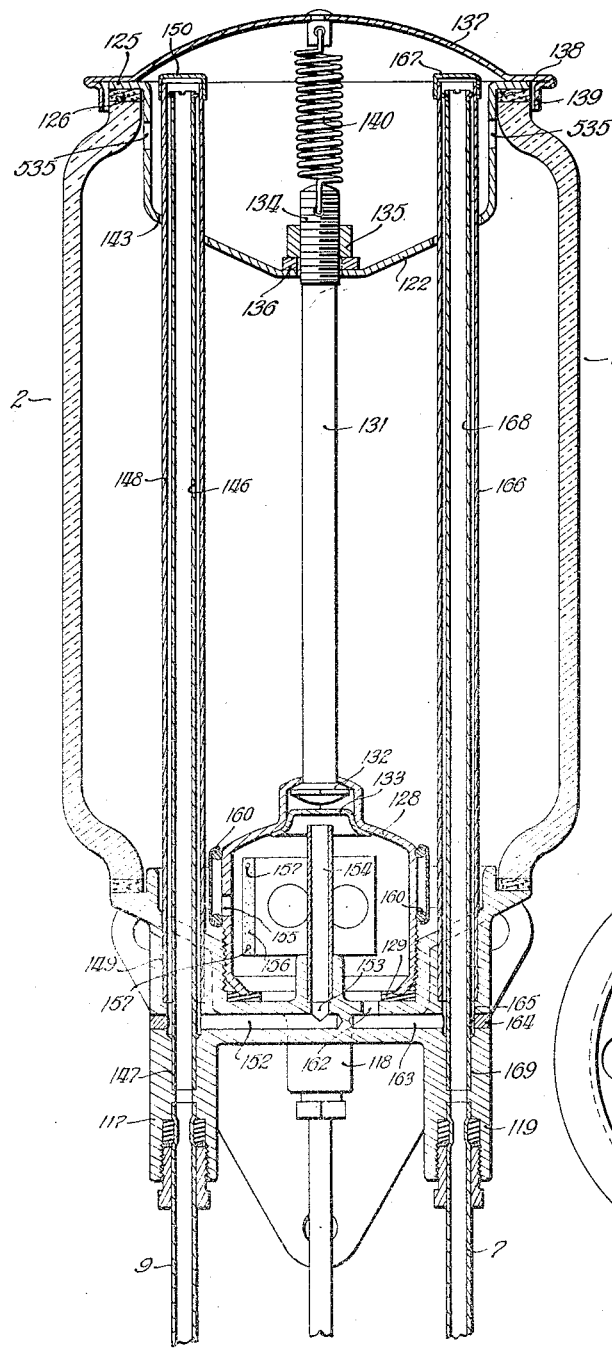
Figure 17 is a vertical longitudinal section taken on the line 17—17 of Figure 16, with the position of the inlet valve altered for the sake of clearness.
Figure 18:
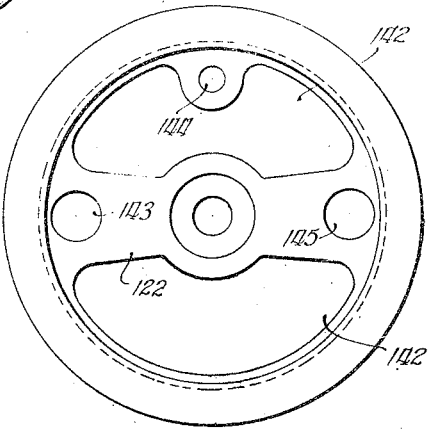
Figure 18 is a top plan view of the spider for fastening the glass reservoir in place.

When the differential pressure valve 103 opens to permit a charge of compressed air to move from the chamber 90 through the inlet pipe 9, a discharge of liquid in the chamber 128 and in the connected traps will occur, assuming that the reservoir 116 is substantially filled with oil and the parts are in the position shown in Figure 17.

Immediately thereupon the oil will flow in through the inlet passageway 155, past the check valve 156 and will fill the chamber 128 with liquid, the same running over the top of the standpipe tube 154 into the transverse passageway 152 and into the space between the two pipes 146 and 148 to the level at which the oil stands in the reservoir 116.

At the same time oil will flow down through the opening 162 cross passageway 163 and into the space between the two concentric tubes 166 and 168. It will rise in this space to the level at which oil stands in the reservoir 116.

The height of the standpipe 154, so long as the same is above the inlet valve opening 155, will control the quantity of oil which is contained within the chamber 128. This may be varied to suit the design. As soon as the compressed air is admitted to the pipe 9 by operation of the differential pressure release valve 103 air passes up through the pipe 9 to the pipe 146 into the space between the pipes 146 and 148 driving the oil ahead of it in the pipe 148 into the chamber 128 causing the check valve 156 to close the inlet opening 155 and applying pressure of the air to the oil in the displacement chamber 128.

Thereupon oil begins to flow out through the opening 162 in the bottom cross passage 163, the space between the pipes 166 and 168 then down through the pipe 168 and out through the oil outlet pipe 7. The oil will be driven completely out of the chamber 128 and compressed air will follow the oil until such time as the air pressure in the chamber 128 and connected parts drop to a point where the differential valve will close its admission port and permit the remaining pressure in the pipe 9 and the connected parts of the system to exhaust to atmosphere through the opening 98. In lieu thereof the inlet check valve 156 may, when the pressure drops to a predetermined low value, be opened by the spring pins 157 to permit any remaining pressure of air in the chamber 128 and connected parts to escape.

The construction of the above described inlet check valve is novel, the steel wires in the top and bottom edges always insuring that the valves will open by causing it to assume the straight position instead of maintaining the curved position adhering to the inner walls of the chamber 128. I do not intend to be limited to the use of this specific form of check valve and in fact may locate the check valve elsewhere as will be apparent in a construction later to be described.

In Figures 72 to 74, inclusive, I have shown a top supported oil reservoir unit 420 which may be substituted for the unit 2. It has a main frame 421 with an integral bracket or foot portion 422 by which the unit may be attached to the dashboard or bulk head of the body, as indicated by the bolts 423 and plate 424 in Figure 74.

The frame 421 has three threaded sockets 425, 426 and 427 to receive the hollow compression screws 428, 429 and 430 for connecting the pipes 9, 7 and 8, respectively, through the elastic compression rings 432. These coupling units are of the type described in connection with Figure 13. The frame 421 has an annular flange 433 which has a coarse thread 434 on its inner periphery, and this coarse thread is adapted to be engaged by the male thread formed on the upper margin 435 of the glass reservoir 436. The glass reservoir 436 has a rounded bottom which is completely closed in this form, the weight of the reservoir and its liquid contents being supported on the threaded margin 435. The upper edge of the glass reservoir 436 engages a ring or gasket 437 which may be made of any suitable material, such as cork or the like, to provide a fluid tight joint between the frame and the oil reservoir 436.

The pneumatic displacement chamber 438 which serves also as a measuring chamber for discharging a predetermined charge of lubricant for each lubricant distributing operation is disposed in the lower end of the glass oil reservoir 436. This chamber is preferably formed of a sheet metal cup the dome of which is connected to a pipe 439. This pipe is pressed into a seat 440 formed in a depending nipple or boss 442 formed integral with the frame.

The lower end of the pipe 439 extends through the upper wall of the chamber 439 and is firmly secured thereto mechanically and is soldered to make a fluid tight joint.

The upper end of the pipe 439 rests against a ledge at the bottom of the socket 440, a reduced bore 443 disposed above the ledge communicating with the pipe 9 through passageway 444 which is formed by diagonal drilling.

The body or frame 421 above the end of the seat 440 is provided with another seat 445 into which the upper end of the discharge pipe 446 is pressed and firmly seated to form a tight joint. The discharge pipe communicates with the pipe 7, as is plainly seen in Figure 74, through a passageway formed in the frame or body 421. The lower end of the discharge pipe 446 extends to a point a slight distance above the bottom of the chamber 438. The lower margin of the inverted cup which forms the chamber 438 is flanged inwardly, as indicated at 447, to engage a gasket or flexible plate 448.

This gasket or plate is preferably made of leather or oil-proof rubber or the like, and it has an opening 449 at the center. The margin of the gasket 448 above the opening 449 extends inwardly over the margin of the inlet check valve 450 which inlet check valve 450 is preferably a circular disc of leather, or the like, with notches cut in the margin as indicated at 451 to provide passageways for oil about the body of the valve 450.

The lower cylindrical periphery of the chamber 438 is screw threaded to receive a screw threaded cap 452.

This cap is preferably formed of a sheet metal stamping or drawing with a flat annular shoulder against which the outer margin of the gasket or ring 448 is pressed by the inwardly turned flange 447 of the chamber member 438. The central part of the cap member 452 is depressed as indicated at 454 and has a central aperture at 455. This depression 454 forms in conjunction with the margins of the ring 448 a housing or cage for the inlet check valve 450. The opening 455 forms an inlet port which is controlled by the disc valve 450 for automatically admitting liquid into the chamber 438 due to its submergence in the liquid in the oil reservoir 436. That is to say, assume that the pipe 9 which is connected to the compressed air reservoir through the differential pressure valve is open to atmosphere, the differential pressure valve being closed and atmospheric pressure prevailing in the pipe 9, oil will lift the valve 450, flow around the edges of the same to the notches 451, pass through the opening 449, fill the chamber 438 and pipes 439 and 446 to the level of liquid in the reservoir 436.

I provide a screen 456 about the inlet opening 455, this screen being formed with a convex body portion and cylindrical margins 457 which are clamped to the cap 452 by a ring 458 which is pressed over the corner of the cap 452 to hold the screen 456 in place.

The lower margin of the ring 457 is flanged in slightly so as to form a stop and to facilitate pressing of this clamping ring in place. The upper margin of the clamping ring 458 is flared out to facilitate the aforesaid operation.

The function of the oil reservoir 420 with its cooperating air displacement pump is substantially the same as the unit 2 heretofore described. Since the pipes 439 and 446 extend directly upward they provide in themselves means for trapping the oil in the reservoir 436, that is, they prevent outflow.

The foot or bracket portion 422 is connected to the body 421 by a web 459 which also joins the connecting sockets 425, 426 and 427 for the pipes 9, 7 and 8, respectively.

The oil supply reservoir 436 may be filled from either side of this central web, openings through the top being provided on each side, these openings being closed by cover plates 460 and 462 having depending spring fingers in the shape of flanges as shown in dotted lines in Figure 72. Handles 463 and 464 for removing and replacing the cover plates 460 and 462 are provided.

An alternative form of bottom supported oil reservoir is shown in Figure 75, particularly for use in connection with the manually controlled or operated air supply system, hereafter to be described in detail. As will be apparent from the detailed description of Figure 75 hereafter, a bottom supported oil supply reservoir of the type shown in Figure 75 may be employed in connection with the automatic system.

*The trap basin type of metering units*

The metering unit of my invention has been conceived with a number of objects in mind namely;

1. To secure perfect metering without depending upon extreme accuracy of construction and independently of air in the pipe line system or of grit in the lubricant or different grades of lubricants and the like.

2. To reduce the cost of the usual combination of pipe lines T's and metering units.

3. To reduce the cost of tapping the female threads in the drop forgings and other tough parts of an automobile chassis by abandoning the expensive taper threads.

I use two forms of metering units of similar construction; one type is fastened to the bearings by screw threads and the other is fastened by a drive fit into the bearings.

Both types may be of the same general contour and body shape such as T or 1 or Z or L depending upon whether the pipe line system passes through the metering units or returns in the same direction from which it came.

Figure 20 shows a typical form of trap basin metering units of my invention. The bearing 170 has an anti-friction bushing 171. The bearing has a boss 172 which is drilled to provide the passageway 173 extending through the bushing 171 and in communication with the spindle or other parts in the bearing 171. The boss 172 is counterbored for a short distance and provided with cylindrical threads as indicated at 174.

The counterbore or recess is provided with straight threads along the inner periphery for receiving the sleeve 175 which is provided at its lower end with a threaded cylindrical portion and with a polygonal upper portion for engagement by a wrench or the like.

The body 176 of the metering unit in this case is of a generally T-shape or cross shaped formation comprising the cylindrical body portion 177 with drilled bosses 178 and 179 into which are inserted and soldered tubes 180 and 182 for conveying lubricant to and from the unit.

The body portion 176 comprises two chambers namely an upper chamber 183 and a lower chamber 184 separated by a valve seat 185 controlled by the ball check valve 186.

The ball check valve is normally held from a seat by a compression spring 187. The compression spring 187 is relatively weak.

The lower end of the body 176 has an outlet below the springs communicating with the passageway 173. The lowermost part of the body 176 comprises a flange which is flared outwardly preferably as by spinning and this flange is engaged by the lower end of the threaded sleeve 175 and forced into engagement with a gasket or washer 188 seated in the bottom of the recess. The body of the unit is preferably made out of brass forging. The lower flange member 189 is forced by the lower end of the threaded sleeve 175 into fluid tight engagement with the bearing through the resilient washer which is preferably made of leather, oil proof rubber or other suitable materials.

The chambers 183 and 184 are formed preferably by drillings of different diameters and the outlet likewise formed by drilling. The upper end of the body 176 which would otherwise be opened is closed by the threaded plug 190, this plug having a hex or other polygonal head by which it may be engaged by suitable wrench or the like. It is inserted on straight threads into the top of the fitting and closes the top of the chamber 183 with the cone shaped portion 191 of the plug 190. From the plug 190 a pin preferably shaped in cross section as shown in Figure 44 extends down into the chamber 183. This pin is driven in a hole formed in the bottom of plug 190 and serves to perform a number of functions.

The pin is preferably fluted as shown in end elevation in Figure 44 for the purpose of better catching the oil which is driven through the pipe line system into the chamber 183 as will be described later.

The pin 192 assists in conducting the oil to the bottom of the chamber 183 so that the air will be more readily freed from the trap basin.

The pin 192 tends to catch and precipitate oil which may be in an atomized state in the air flowing through the pipe line system. The pin also forms a stop for a ball and check valve 186 to limit its upward motion and to prevent the ball from rattling under the vibration of the vehicle or the like.

In Figure 21 I have shown a similar unit in which the chamber 183' is larger than the chamber 183 in the unit shown in Figure 20. This is done by merely lengthening the body 176 as indicated at 176' the other parts remaining the same. The pin 192 as at 192' is lengthened with the increased length in the body 176. It can be seen therefore that the capacity of the trap basin that is the chamber 183' which is the space below the inlet and outlet pipes 180 and 182 and the valve seat 185 may be varied to control the capacity of the unit so that it may receive and introduce into the bearing a greater or less quantity of lubricant in accordance with predetermined design.

It will be observed that the incoming pipe or tube 180 extends from the lower level and is bent upwardly to the socket 178 and likewise the delivery for the discharge pipe 182 is bent down to a lower level and that oil is shown as trapped within the lower parts of said pipes. This is the oil which is drained from the walls of the pipe after a lubricant distributing operation.

Referring now to Figure 34 I have shown a similar form of unit in which the body 193 is substantially identical with the body 176 shown in Figure 20, the lower part of the body, however, instead of being secured by the threaded sleeve member 175 and flared out flange and gasket 188 is fitted into the pocket 194 of the bearing 170 by a drive fit. The recess which is formed in the pocket 194 is a straight cylindrical socket with a tapered bottom such as is produced by drilling.

The bottom of the body 193 is of such shape as to fit the socket 194 being cylindrical and of a diameter which will provide a snug drive fit. The bottom of the unit is formed conical to fit closely in the bottom of the recess in the socket 194. The lower end of the body may be chamfered off so as to be more readily piloted into the socket for the purpose of driving the same home. This chamfering is preferably a cylindrical annular recess of a diameter slightly smaller than the diameter of the socket 194.

In this case the plug 190 provides at its top a flat driving face by which the stem 195 may be driven into the socket 194.

It is highly desirable to get rid of the tapered pipe threads which have up to the present been used to connect the metering units to a bearing. Taper threads are expensive because of the small angle of three-fourths of an inch to a foot.

The slightest wear on tap and dies which are used to cut these taper threads will immediately show a great variation in addition of threading the male thread into the female thread. Since the length of the female thread in drop forgings, spring leaf, bushings, etc., is greatly limited, extraordinary care must be exercised in cutting the female threads. This extra care is expensive as it cuts down production.

Since there are 30 to 50 of these female types of threads in a car for a system of this kind it can easily be understood how expensive the cutting of these tapered female threads is. My structure of using either straight threads or of using a drive fit at the metering unit into the socket avoids above recited difficulty.

The trap basin unit which may take a variety of forms is adapted to be fitted to the various bearings of the car as will be explained by reference to specific construction.

Where the bearing such as 196 is so situated that the oil must be introduced from the bottom and the trap basin unit cannot be disposed above the bearings I provide the form of unit shown in Figure 22. In this case the body 197 is fastened by the threaded hollow nut 175 into the depending boss 198 in the same manner in which the body 176 was described as secured in the boss 172 in Figure 20. That is to say, the hollow nut 175 engages the lower flanged rim 189 of the body 197 and forces the same into engagement with the ring or gasket 188 in the threaded socket. The threads on the hollow threaded nut 175 are straight threads. The body 197 has a straight drilling therethrough and in the end nearest the bearing 196 the sleeve 199 is pressed into the passageway 173 in order to bring the wick 200 into engagement with the spindle in the bushing 171. This wick is formed of the usual open fibrous cotton wicking, or the like, with a coil spring 201 which may be of tapered form embracing the central portion of the body of the wick 200, as indicated at 202.

The lower end of the spring is pressed against the edge of the plug 203 which is drilled, as indicated at 204, to receive the lower end of the wick. The spring which thus grips the central part of the wick pushes the same up through the tube 199 into engagement with the spindle in the bearing. In this case the inlet pipe such as 204 extends from a higher level down into the boss 178 into which the tube 204 is soldered, and likewise the discharge pipe 205 which is soldered in the boss 179 extends from the lower level to a higher level. Sufficient space is provided between the wick and the side walls of the body 197 to permit the passage of oil and air in the regular lubricant distributing operation, to be described more specifically hereafter.

Oil is shown as trapped in the bottom parts of the pipes 204 and 205 and it is plain that the same will run into the space within the body 197 and keep the wick charged with lubricant.

I have not shown the oil filling the space within the body 197 for the sake of clearness.

Where from the nature of the construction it is desired to lead the pipe back, the form of catch basin unit shown in Figure 25 may be employed. However, the direction at which the pipes enter and leave the body of the unit, it is to be understood, may be varied and any of the forms shown may be modified to secure the desired construction.

In Figure 25 the incoming pipe 207 is soldered in an opening 208 (see Figure 27) and the outgoing pipe is soldered in an opening 209 (see Figure 27).

The body 210 has an angularly disposed outlet this being provided by the lug or boss 211 which is drilled at an angle to receive the discharge pipe 212 which leads down to the bearing 213, this pipe 212 being connected to the oil passageway 173 into the bearing by the novel compression connection 214 heretofore described in connection with Figure 13. It comprises the elastic compression member 215, the metal washer 216 and the hollow compression plug 217 embracing the pipe 212.

Interior construction of the V-shaped member shown in Figures 25 to 28 inclusive is substantially the same as shown in connection with Figure 20. That is to say a body provides two chambers 183 and 184 separated by the valve seat 185 the lower chamber receiving the spring 187 and the upper chamber containing the small check valve 186 and the pin 192.

The inverted fitting shown in Figure 22 employing the wick for raising the lubricant may be attached in place by a drive fit in the same manner that the unit is attached in Figure 34. That is to say the unit shown in Figure 38 is like the unit shown in Figure 22 except that the body 197 has its shank attached by drive fit in the boss 198' of the bearing 196 instead of by the inserted coupling.

While the trap basin unit is to be attached to a vertical stem at the end of the bolt such as 218 shown in Figure 24 the end of the bolt being formed with a conical seat 219, the lower flanged rim 189 may be clamped against said conical tapered seat by means of a threaded hollow coupling nut 220. The outlet of the unit then communicates with the oil passageway 222 in the bolt 218. The body of the unit and its other working parts are the same as described in connection with Figure 20.

The T-shaped trap basin unit may be connected to a bearing at a considerably lower level than the run of the pipe line by construction such as that shown in Figure 23. In this case the lower end of the body 223 is provided with a reduced portion 224 forming a socket for receiving the upper end of the tube 225.

At its lower end the tube 225 may be secured into the socket formed in the boss 226 in the bearings 227 by the novel coupling unit of my invention using the elastic compression body or where from the character of the construction the oil outlet 228 is of the size so large that the tube 225 would not have a proper stop against which to rest I may insert the fitting 229 which has an inner cylindrical recess of the size adapted to receive the lower end of the pipe 225. This fitting may be made of metal and it rests upon a ledge above the oil passage 228.

I have shown a hollow coupling plug 230 with a conical tapered lower end adapted to be forced between the margins of the fitting 229 and the side walls of the tube 225 the said conical end of the hollow plug 230 then being compressed inwardly tight against the side walls of the pipe 225 to make a fluid tight joint both with respect to the socket in the boss 226 and in respect to the side walls of the tube 225 against the inside of the hollow plug 230.

Where it is desired to make connection with a horizontal bolt such as 232 shown in Figure 29 an L-shaped fitting 233 may be employed. The body of the fitting may be T-shaped above the foot or lower part which is L-shaped. That is to say the lower end of the T-shaped body is provided with a side outlet 234 the extreme outer end of which is provided with the flanged rim 235 like a rim 189 described in connection with Figure 20 and this is engaged by the threaded sleeve 236 the lower end of which bears against the flanged rim 235 and forces it into tight engagement with the ring or gasket 237. The lateral outlet 234 is in communication with the lower chamber 184.

Where the drive fit mounting is to be employed the construction shown in Figure 36 may be utilized. In this case the lateral outlet 234' forms a shank which has a drive fit with the socket 238 formed in the end of the bolt 232. In this case it will be observed that the lower end of the body portion is thickened to provide a flat driving space 239 by which the fitting may be driven into the socket 238.

In each case where a drive fit is to be employed provision is made for furnishing a flat driving head or face by which the shank may be driven into the socket.

In Figure 30 I have shown a construction in which oil may be conveyed from the pipe line system to the trap basin unit for a bearing which is located above the run of the pipe line system. In some cases there are bearings which are so positioned with respect to the run of the pipe line that it is not desirable to carry the pipe line over the bearings as is the normal construction such as is shown in Figure 20. In that case I may employ the construction as shown in Figure 30 or in Figure 31. In Figure 30 the pipe line system has a pipe 240 leading from the oil measuring chamber and a pipe 241 leading forward to the discharge end. These two pipes are connected together by a T-fitting 242 by being inserted in the legs of the T and soldered thereinto. The two straight parts of the T are connected to the pipes 240 and 241 these pipes being bent down to the T as indicated in Figure 30 to form a liquid trap. The third leg of the T is disposed in a vertical position projecting preferably upwardly and a pipe 243 has its lower end soldered thereinto.

This T-fitting 242 may be secured to the frame member such as the web 244 of the channel frame forming one side frame of the car as by means of a simple hook bolt 245 having its shank pass through an opening in the web 244 and held by a nut 246 and lock washer 247.

The pipe 243 extends upwardly to a trap basin unit 248 which in this case has only the inlet pipe socket 249 into which the upper end of the pipe 243 is soldered. This inlet extends into the upper chamber 183. The body of the fitting 248 has a laterally extending leg 250 into which there is threaded a screw 252 this screw projecting into the chamber 183 above the check valve 186 to hold the check valve against rattling and to prevent accidental displacement of the check valve 186 or driving it upwardly as might be the case if it were loose. The body of the fitting 248 has a valve seat 185 with a chamber 184 below it and a spring 187 situated in the lower chamber for pushing the ball check valve 186 upwardly against the end of the screw 252. The lower end of the fitting may be provided with a flanged rim and gasket with the threaded sleeve or hollow plug to force the flanged end into engagement with the gasket as shown in Figure 30, or the unit may be provided with the shank 253 to permit the unit to be driven into the socket 254 in the bearings 255 as shown in Figure 37.

The upper end of the fitting 248 comprises an air chamber 256 which is formed of a metal trap 257 passed over and soldered to the flange 258 of a cup member which has a reduced threaded neck 259 threaded into the upper end of the body which as heretofore described has had the plug 190.

Oil tends to be trapped in the downwardly bent portions of the pipes 240 and 241 and in the T of 242 and when the pressure is admitted to the pipe line oil will be driven up through the pipe 243 into the body of the fitting 248 compressing the air into the chamber 183 and in the air chamber 256 driving the ball 186 against the slight pressure of the spring 187 to its seat 185 and depositing oil in the chamber 183. When the pressure is released here the air in the chamber 256 expands and any surplus of oil which might be contained within said air chamber 256 or in chamber 183 of the trap basin is expelled through the pipe 243.

The operation of the unit shown in Figure 37 is identical.

In the fitting shown in Figure 31 instead of having the air chamber 256 for providing sufficient displacement of air to permit a lubricant to flow up through the pipe 243 into the trap basin 183 I have provided an air vent valve member 260 which comprises a valve cage 261 having an atmospheric vent opening 262 with a weak coil compression spring 263 holding a cork body 264 downwardly against a suitable stop formed on the lower end of the valve body 261. This stop may consist of a turned-in rim or it may consist of lugs struck inwardly from the body of the valve housing 261. The top part of the valve housing 261 which has opening 262 formed therein is formed to provide a recess for seating the coil spring 263 and at the same time forming a depending valve seat about the opening 262 which may be engaged by the cork body 264.

The remainder of the unit is like that described in connection with Figure 30.

The operation of this unit is as follows: Assuming that air is trapped in the trap formed by the downwardly bent portions of the pipes 240 and 241 and the T 242 when pressure enters by way of the pipe 240 oil will be driven up through the pipe 243 and air will be be driven ahead of the same out of the pipe 243 and out of the top of the chamber 183 around the lugs forming a stop for the cork valve 264 around the edge of the cork valve 264 and out through the vent opening 262 until the liquid arrives in contact with the cork valve 264 whereupon the same will be driven upwardly to close off the vent 262 hence by that time the valve 186 will be driven to its seat and a trap basin formed in the lower part of the chamber 183 filled with oil. As soon as pressure is released any excess of oil which would tend to remain in the chamber 183 will drain back by gravity through the pipe 243 into the trap formed in the bend of the pipe.

The construction of this particular air vent valve may be modified since any form of air vent valve which will permit air to pass and liquid to be trapped may be employed in this connection. The fitting shown in Figure 39 is identical in construction and operation with that shown in Figure 31, with the exception that it is adapted to be driven into the oil hole of the bearing instead of secured therein by a threaded connection.

While I have shown the pin 192 in each case as of the fluted or grooved form it is to be understood that this is the preferred manner of forming the pin but that the specific form of the same is optional within my invention.

Figure 35 is like Figure 21 namely that it shows a body providing a trap basin of greater capacity than a standard trap basin shown in Figures 20 and 34, but differs from Fig. 21 in that the member 178 has a drive fit in bearing socket 194 similar to that shown in Fig. 34 instead of the screw connection.

For reasons to be explained more in detail later it is desired to permit the excess of oil which may remain in the form of a film or adherence to the walls of the pipe of the pipe line system to drain away from the trap basin so that accurate metering may be performed.

There are situations where the inclination of the pipe connected to a unit and the length of the inclined pipe may be so great that to prevent the drainage of oil which accumulates in the lowermost part of the pipe between the pair of units would necessitate running the pipe to an inconveniently low level. That is to say in order to make a single trap big enough to contain the drained oil the downward bend of the pipe might be undesirably long.

Where a single loop would be objectionable I may form a series of traps in a length of pipe as shown in Figure 33. Assume that between the trap basin unit 265 and another unit placed at a higher level at some distance therefrom, a pipe such as 266 is to be disposed.

In that case I provide the usual arch 267 over the trap basin unit 265 by depressing the pipe on each side thereof, but since the vertical component of the run of the pipe would drain sufficient oil into the depressed portion that the drained oil might run into the trap basin unit 265 and flood the bearing thereby spoiling the metering characteristics of the unit 265 I break the run of pipe 266 up into a series of traps such as 268, 269, 270 and 271 with a plurality of intervening loops such as 272, 273 and 274 to hold separately trapped portions between them.

The arch portion 267 over the unit 265 and the arch portions 272, 273 and 274 are filled with air between the bodies of oil.

Where continuous lubrication is desired I may dispense with the check value 186 and the open outlet passageway in the bottom of the unit and substitute therefor a resistance plug such as the plug 275 as shown in Figure 42. In this case the resistance plug 275 is formed in the shape of a hollow plug with a helical groove disposed about the same, this plug being pressed into the bore 276 formed in the lower end of the body 176. This helical groove provides a long bore of restricted cross section to limit the outflow of oil from the chamber 183 sufficiently during the pressure period that the trap basin will not be emptied of oil.

In this construction a screen 277 which is cup-shaped is seated upon a seat 278 formed by a shoulder at the lower end of the chamber 183. This screen prevents the passage of particles originating from the scale of the inside of the pipe lines which would clog the bore of a resistance passageway in the plug 275.

The pin 192 which extends downwardly from the plug 190 extends into the screen cup 277 preventing the dislodgment of the same.

The helical groove is of sufficient size to permit the discharge by gravity of the oil from the trap basin into the oil passageway 173 leading to the bearings in the bushing 171.

The fastening of the lower end of the body to a recess in the boss 279 of the bearing 170 may be carried out by the use of the threaded sleeve 175 having a polygonal conformation in its upper end and a straight thread at its lower end threaded into a socket or recess in the boss 279 and pressing the outwardly spun flange 189 against the gaskets or leather washer 188 seated in the bottom of the recess in the boss 279. Instead of mounting the trap basin unit by means of the threaded coupling shown in Figure 42 the unit may be mounted by a drive fit between the shank of the unit and the recess in the boss 279, as shown in Figure 46.

The various units heretofore shown as comprising the ball check valve for governing the closing off of the outlet during the pressure period may be duplicated in units in which the constantly open resistance plug is employed. Thus, for example, the fitting shown in Figure 42 is like the unit shown in Figure 20 except that it is a resistance plug unit, that is, a trap basin unit having a resistance plug governing the outlet instead of having a valve or other means for completely shutting off the same. The fitting shown in Figures 40 and 41 is like the fitting shown in Figures 25 to 28, inclusive, adapted, however, to the use of a resistance passageway or resistance plug governing the outlet instead of a check valve or equivalent means. As shown in Figure 40, the resistance plug 280 which is preferably formed as a hollow metal member with a helical groove on the outside is driven in from the top, instead of from the bottom as shown in Figure 42.

The plug may be driven in from either end, as may be desired.

Likewise Figure 43 shows a resistance plug in the outlet of the trap basin unit where Figure 23 shows a similar structure using the check valve.

In each case where the resistance plug unit is employed the screen is employed to prevent clogging of the resistance channel.

Figure 46 shows a unit which in all respects is like the unit shown in Figure 34 except that the resistance plug and its screen have been substituted for the check valve construction. Likewise in Figure 48 the construction shown is like that of Figure 29 except that the resistance plug and screen have been substituted for the check valve construction.

Figure 47 is in all respects like the construction shown in Figure 30 except that the resistance plug and screen have been substituted for the check valve construction. Figure 49 shows a construction which is like that of Figure 31 except that the resistance plug and screen have been substituted for the check valve construction.

As will be explained more in detail when the body of oil which is measured out by the measuring chamber of the unit shown, for example, in Figure 15 enters the pipe line the oil which is driven forward by the charge of compressed air flows through the pipe line system and in passing through the arches over the bearings deposits oil in the trap basin unit forcing the check valves down to their seat and filling the lower part of the chamber 183, which I term the trap basin, with oil and conveying the remainder of the charge of admitted oil on throughout the rest of the pipe line system and to the various trap basin units.

Where the resistance plug 275 or 280 is employed, it will be seen that the outlet of the trap basin unit is never shut off. It would appear, therefore, that the continued application of pressure while the remainder of the charge of oil is passing through the pipe line system and the excess returned to the oil supply reservoir 116 the oil might be forced out of the trap basins and out of the bearings so that a charge would not be retained in the trap basin for continuous lubrication thereafter. This is not the case. The resistance unit 275, affords a very considerable resistance to flow and during the relatively short time that pressure is applied to the system only a very small quantity of oil will be forced into the bearing but this small quantity will not prevent the trap basin from remaining filled to the very end of the filling operation, that is, the pressure period, for the simple reason that the continued passage of air following the charge of oil tends to atomize and flow along through the pipe line system oil which has tended to adhere to the walls of the pipe and such as is accumulated at the bends in the pipe line system and there atomized. Therefore, this continued flow of the air carrying oil partly in suspension and partly wiped along the walls of the pipe line system will keep the trap basins all filled during the pressure period. As a result the dropping of the pressure to atmospheric as by blowing out the discharge end into the oil reservoir, or the opening of the differential pressure release valve 103 at the compressor and air reservoir unit will find all of the trap basin units filled with lubricant.

The oil will then slowly pass through the resistance channel and be discharged into the bearings by gravity. This action is indicated in Figure 45 where the moving current of expanding air drives along liquid on the inner walls and entrained in the current of air. Such liquid impinges against the pin 192 which tends to conduct the same down into the bottom of the trap basin filling the same from below and tending to free the air which otherwise might be trapped in the oil within the trap basin.

In all forms of the trap basin it will be observed that the diameter of the trap basin is larger than the diameter of the pipe leading into it. The purpose of this is to permit the quick freeing of air normally filling the trap basin from the incoming oil so that the trap basins will be filled with solid liquid.

The main purpose of the trap basin unit is to meter by volume the exact amount needed for lubricating the corresponding bearing instead of depending upon the resistance of a fine passage which requires great exactness as to all the characteristics involved. If, for instance, my trap basin type of metering unit has a capacity of ten drops of oil and this trap basin is filled with lubricating oil during the pressure period, and all the additional oil which is situated above the rim of the trap basin of the metering unit is driven away by the air following the oil in the pipe line and the outlet is closed as by the check valve, then only these ten drops and no more and no less will run into the bearing by gravity after the pressure period has terminated.

In this way, it is possible to depend absolutely upon the true metering qualities or true oil distributing qualities of my metering unit. The use of the ball check valve gives exact metering, that is, the distribution is exactly controlled. After the distribution operation the oil is then allowed to run into the bearing by gravity by raising of the check valve through the body of oil contained in the trap basin. My check valve works in the opposite direction from the check valves of known metering units heretofore. The volume of the trap basin, that is, the displacement between the top portion of the seated ball and the lower portion of the pipe line which communicates with the chamber may be varied according to requirements.

A similar result is secured by the use of the resistance passageway, such as the resistance plug or other resistance means, placed in the outlet of the catch basin. In such case, the outflow of oil through the resistance passageway during the pressure period is not great enough to interfere with the accuracy of the system and, furthermore, the trap basin remains filled with oil so long as the air is flowing through the pipe line system and after the pressure is released the oil will run slowly into the bearing by gravity. The period between pressure intervals is relatively long, that is, it is to occur between thirty and fifty miles of road travel, and ample time is provided to permit the oil to pass through the resistance passageway. The use of the check valve obviates the necessity for employing a screen as relatively large particles may be passed without difficulty.

In all forms of the units, access may be readily had to the interior of the units without the necessity for unscrewing the same from the bearings to which they are fitted. That is to say, by unscrewing the plug 190, access may be had to the inside of a unit to remove the ball check valve and spring or to remove the screen. Thus, any particular unit may be inspected or repaired without disturbing the pipe line system or the feeding of the units in the bearing seats.

The ball check valve has a diameter of about $\frac{1}{32}$ of an inch smaller than the inside diameter of the trap basin and, hence, the incoming liquid tends to carry the same down against its seat against the relatively weak compression spring which is placed below the wall, due to the surface tension of the oil. After the trap basin is filled, and the pressure is released, the ball rises through the liquid, being pushed up by the spring, permitting the oil to drain by gravity past the ball, through the outlet and into the bearing.

The pin 92, which lies in line with the pipes leading to and from the unit serves to hold and conduct the oil by gravity and capillaric attraction to the bottom of the trap basin, thereby forcing the air upwards, which is normally filling the trap basin.

The bends in the pipe line system serve as means for causing the entrainment of oil in the current of air, and hence, even if the bore of the pipe be relatively large, the current of air will tend to convey the oil along partly by driving the charge of oil ahead of it and partly by carrying the same along in the current of air.

The operation of filling units, such as those shown at Figure 30 and Figure 31, has previously been explained. The manner in which the check valve is driven to seat during the pressure period and then is raised after pressure is released is the same in each case.

After the charge of oil and the following air have been expelled at the discharge end into the oil reservoir 116, the oil which adheres to the walls of the pipe of the pipe line system tends to drain in the traps between the trap basin units. Air will remain in the arched portions over the bearings, or over the trap basin units, so that no additional oil will drain into the trap basin units and tend to flood the bearings and also these bends serve to provide the additional function of giving a certain flexibility to the pipe line system, as will be more fully explained later.

I shall now describe the construction of the pipe line system with respect to manufacture and application of the same to an automobile chassis.

Quick attachable pipe line system

Preferably, I construct the pipe line system of preformed units which may be quickly attached to the automobile chassis or other machines to which this system is to be applied.

The main advantages of this system are as follows:

1. To reduce radically the time and expense of attaching the pipe line system to the chassis of an automobile, or to industrial machinery, or the like.
2. To enable the entire pipe line system to be shipped in several preassembled units.
3. To bend the pipe line system in such a manner that there will always be air above the metering units and around all connections between the lubricating periods with the result that draining or siphoning of the pipe line system is definitely prevented.
4. To be able to attach the preassembled pipe line system as a whole or in units including all metering units, to all chassis bearings or other bearings even if the distance between centers of the metering units of the pipe line system does not agree with the distance between centers of the connecting places to the bearings.
5. To prevent oil from higher situated points of the pipe line from draining through lower situated bearings.
6. To be able to inspect or interchange all working parts of the metering units without removing the system from the bearings on the chassis or the machine.
7. To enable my new system of soldering the pipe line to the metering units and attaching the preassembled pipe line system to an automobile to be used in connection with any existing centralized lubricating system.

Heretofore, every metering unit, every pipe connection, and every one of the very many short pieces of connecting pipe have been shipped separately to the automobile or industrial machinery manufacturers and many loose pieces had to be assembled on the automobile or industrial machine by first screwing the metering units into the female pipe thread of the bearing and then attaching the many short pieces of pipe to the metering units and to the seat connections by means of pipe coupling screws. Since there are three pipe coupling screws to each T and one T to substantially each metering unit on bearing and thirty to fifty bearings on an automobile chassis, one hundred to two hundred pipe coupling screws are heretofore required to be screwed down on each pipe line system. This is a very tedious and very expensive operation, with the additional disadvantage that oil will leak through imperfectly attached pipe coupling screws. This means also that air will enter the pipe line system. In order to reduce the large cost of assembling to a minimum and to prevent leakage at the same time, I solder all pipe lines to the T's or T metering units and preassemble the entire pipe line system in very few units, before it is shipped to the automobile or industrial machine manufacturer.

In order to prevent the oil remaining in the pipe line from draining out to the metering unit, I bend the pipe line near the metering unit in each case, to create two levels.

One pipe line level is situated above the measuring chamber or trap basin of my metering unit. The other level is below the same. Therefore, when oil is forced into the pipe line system and air pressure follows the oil column and after most of the excess oil and all of the excess air have been blown out of the pipe line system and returned to the oil reservoir, the oil which has adhered to the interior of the pipe line system by adhesion and surface tension will run down to those portions of the pipe line system situated below the trap basin of the metering unit, while the air remaining in the pipe line system will rise to the upper level which is not only over the trap basin of the metering unit, but also around the soldered places and pipe couplings.

For this reason, air and not oil will always be over the trap basin metering unit, thereby rendering it impossible for the oil in the pipe line system to drain out or siphon out through the metering units or through the bearings. The arched or inverted U-shaped portion of the pipe line around each metering unit serves another purpose. When a pipe line system is preassembled and soldered to the metering units, it is difficult to keep the centers of the metering units exactly to register with the centers of the connecting places or sockets of the bearings. The bent portions of the pipe lines around the metering units makes the air or pipe line system flexible at all places, particularly between each two adjacent bearings whether these bearings are situated on a common rigid member or are connected to a relatively moving member.

Since it is important that oil from a much higher situated pipe line portion should not run out through a considerably lower situated bearing, I bend the pipe between the bearings in the form of steps with upwardly arched or loop portions at the beginning of the steps. In these arched loop portions, air will accumulate and the oil will always be stopped at the lower horizontal portion between the arched portion, as shown in Figure 33.

When a pipe line system is assembled to a chassis in the preassembled unit, the pipe line soldered to units, it is important to design the system in such a manner that all movable or working parts can easily be inspected or exchanged at all times without removing the entire pipe line system from the chassis. My quick detachable plug construction, which enables the operator to quickly exchange the ball and spring, the only two moving parts of my metering units, and to inspect the ball seat, answers this purpose fully. That is to say, by removing the plug 190 and by unscrewing the sleeve 175, both ends of the metering units may be made available for inspection. The removal of the plug 190 will permit access to the interior of the unit for the purpose of removal or replacing the ball and spring. Likewise, in the resistance unit, the removal of the plug 190 will permit removal of the screen, if desired.

There are, of course, some places in my system where I can separate the pipe line and where I use pipe coupling screws. These are on the air pump, the oil reservoir unit, the flexible hose connection, and wherever the pipe line system extends from the side of the chassis to the rear or to the front. This is done in order to reduce the size of the preassembled pipe line system to dimensions which make it not too bulky for shipping.

The new idea of soldering the pipe line to the metering units, of connecting the metering units to the bearings without turning them, of preassembling the pipe line system in a few large units before it is fastened to the chassis, of using cylindrical threads, of using a resilient washer between metering units and bearings, or of driving the metering unit into a bearing hole, eliminating all threading, and the like, can, of course, be used to advantage with any existing centralized lubricating system, no matter whether it is of measuring valve unit type, resistance unit type, pressure reservoir unit type, or any other metering unit type, and whether these units are used in connection with any kind of hand or foot operated or automatic oil pumps or the like.

While I have explained the general character of the system thus far and the general manner in which it is fastened to an automobile chassis, as shown in connection with Figure 1, I shall now describe more specifically some of the special connections and applications of my system in the problem of lubricating the main chassis bearings of an automobile by reference to Figures 2 to 12, inclusive.

*Special fittings*

The fittings to be described are particularly applicable to a known make of automobiles. It is, of course, to be understood that these fittings, or many of them, will have general applications to standard types of other makes of automobiles and trucks, and may even have general use aside from automobile construction.

Referring, now, to Figure 2, the oil outlet pipe 7 extends down to a horizontal portion 285 in Figure 2, which is then arched over the top bearing of the shackle for the rear of the right front spring. At this point, the metering unit 10 applies oil to both of the bearings in a manner which will be apparent from Figure 12.

The pipe line runs on the inside of the large frame member 287, shown in dotted lines in Figure 2. The upper shackle bolt 288 is supported in a bearing member 289 formed on a bracket 290, secured to the lower flange and to the web of the frame member 287.

The bearing 289 has a unit of the general form such as that shown in Figure 20 mounted thereupon with its outlet connected to an oil passageway 291 leading through the bushing 292 and into communication with a groove 293 extending longitudinally on the top surface of the bolt 288. The bolt 288 is held definitely in position by the mutilated face 294 engaging the shoulder 295 on the arm 296. This groove 293 extends throughout the central part of the bearing, the ends of the bolt remaining tight in the bearing.

Near the left hand end of the groove 293 a vertical drilling 297 communicates with a longitudinal drilling 298, the outer end of which is closed by a plug. This horizontal drilling in turn communicates with a drilled passageway 299 extending through the arm 296 to a horizontal drill passageway 300 in the bolt 301. The outer end of the horizontal passageway 300 is likewise plugged and the inner end of said drilled passageway communicates with a radial drilling 302 to a groove 303 on the bottom side of the bolt 301, said bolt being likewise held in a definite position by the mutilated head, as indicated at 304, engaging the similar shoulder 305.

Now, it can be seen that when a charge of oil is trapped by the trap basin unit for each operation the oil will run down through the outlet 291 into the upper shackle bearing which is kept tight as to the ends, so that the oil will run through the groove 293, radial drilling 297, the horizontal drill passageway 298 down through the drilled passageway 299 into the horizontal drilled passageway 300 of the lower bolt and from there through the radial drilled passageway 302 into the lower groove 303 in the lower bearing.

The spring eye 306 of the rear end of the spring 307 has a suitable bushing 308 closely fitting the cylindrical parts of the bolts 301.

A companion link 308' corresponding to the link 296 connects the inner ends of the bolts 288 and 301. The nuts on these bolts are drawn up to draw the ends of the arm 296 against washers 310 and 311 for keeping the bearings closed at the left hand ends and then the ends of the link 308' are solidly gripped by the split clamp end portions of said link 308'. In this manner, the bearings are kept tight and oil is supplied to both of them from the single unit pin 10.

The pipe line system continues on from the unit 10, being bent downwardly to provide a horizontal portion as shown at 312, and then a vertical loop 313 is interposed and a low level horizontal portion 314 continues through the forward V-shaped fitting 12 (Figure 2) which is, in all essential respects, the fitting shown in Figures 25 to 28. This trap basin unit 12 has the delivery or discharge pipe 13 (Figure 2) connected to the inner end of the front spring bolt 14, as may be plainly seen in Figure 3, the bolt being drilled to deliver the oil to the bushing in the eye of the forward ends of the spring 307.

The pipe line system then continues by again dropping down to the level 315 and back to the arched portion 316 where the one leg of the arched portion then makes connection with the fitting 15. This fitting 15 is shown at the right hand end of Figure 4.

It comprises a bracket member 317 having a foot 318 bolted to the bottom flange of the side frame channel member 287 with a shoulder 319 disposed along the edge to keep the unit from turning. The cap screw 320 holds the unit in place. The lower end of the pipe from the arched portion 316 fits into a socket 321 which is vertically disposed. The body of the fitting 15 has a screw socket 322 with a passageway 323 communicating with the pipe which is soldered in the vertical socket.

The flexible tube 16 has a metallic ferrule, such as 324, at each end with a reduced tubular neck 325 embracing and soldered to the flexible metallic hose 326 which forms the inner lining of the hose member 16.

This neck 325 has an outwardly flared flange at its end against which the inner end of the threaded coupling sleeve 327 engages. The coupling sleeve 327 has an outer polygonal end, as may be seen at the left hand end of the flexible connection 16 and that may be seen in Figure 5, by which it may be threaded on the straight thread into the socket 322 to force the lower flange on the neck portion 325 of the ferrule 324 into fluid tight engagement with the leather washer or other resilient gasket 326.

The outer layer of the flexible coupling tube 16 is a good tough grade of rubber without any metal braiding or fabric upon the same.

At its opposite end the flexible tube 16 has a like coupling to connect the same into the threaded socket 329 of the trap basin unit 17. This trap basin unit 17 is of relatively large size since it is required to lubricate several relatively large bearing surfaces. It comprises the body 330 with the valve seat 185 separating the chamber 183 above it from the chamber 184 below it. The ball check valve 186 is adapted to cooperate with the seat 185 to close the outlet 331 during the pressure period. The body 330 has the threaded socket 329 for receiving the coupling sleeve or nut 327 of the flexible hose 16. This provides an inlet passageway 337 leading directly into the body 330 and having also branch outlets comprising the passage 333 communicating with the upwardly extending pipe 334 for lubricating the front wheel brake operating mechanism and a downwardly extending passage 335 which is a continuation of the pipe line system through the pipe 22 which extends down along the front axle to the opposite side of the automobile.

The upper end of the pipe 22 is connected by the compression coupling of my invention 336 into a socket 337' formed integral with the body 330.

The outlet of the body 330 communicates by way of the passageway 331 with a pipe 338, which is screwed at its lower end into a socket 339 formed in the body of the axle adjacent the king pin bearing. The front axle 340 has a socket 341 for receiving the king pin 342, this pin being securely held in said socket 342 at a slight inclination to the vertical, and is well understood by those skilled in the art. The front wheel spindle 343 has forked ends embracing the socket 341. These forked ends comprise the socket 344 at the upper end for receiving the antifriction bearing 345 shown herein as a king pin bearing and at its lower end the socket 346 for receiving the antifriction bushing 347, the lower end of which is closed by the trap 348. The king pin 342 has the lower end ground to fit the sleeve or bushing 347 and it is provided with a circumferential oil groove 349 and longitudinal oil groove 350, as well as diametrical drillings in order to distribute lubricant which is supplied thereto by the pipe 338. The pipe 338 communicates with the passageway 352. The lower end of the passageway 352, which is formed in the axle, opens into a groove 353 cut circumferentially in the central parts of king pin 342. A longitudinal groove, shown in dotted lines at 354, extends upwardly into the antifriction roller bearing sleeve 345 and at its lower end extends down to the circumferential groove 349 and the radial drilling in the lower bearing portion of the king pin 342.

The king pin 342 is held in position in the end of the axle by the taper pin 355 which is slabbed off at one side to engage a similar milled seat on the king pin to hold the same rigidly in place both rotarily and endwise.

At the upper end of the pin the inner bearing race 356 is held in place by the lock nut 357. The outer race 358 has a peripheral groove 359 formed therein and a longitudinal channel 360 communicates with the groove and with the space 367 below the bearing, this space 367 communicating with the longitudinal groove 354 formed in the king pin 342.

The upper socket 344 has a boss 368 formed thereupon, and it is drilled to provide threaded sockets for attaching the compression couplings of my invention for pipes 369 and 370. The sockets to which the pipes 369 and 370 are connected have drilled passageways extending inwardly into communication with the groove 359 in the outer bearing ring 358.

The pipes 369 and 370 are bound to the steering arm of the spindle by metal bands 372.

The pipe 369 leads downwardly to the bearing for the rod 375. The steering metal arm 376 has a boss or arm 377 in which there is formed a tapered socket 378 for receiving the tapered shank 379 of a pin, bearing at its lower end the spherical head or ball 380.

This ball cooperates with a pair of spherical bearing members 382 and 383 held by the spring 384 in the socket 385 at the end of the tie rod. The lower end of the spring 384 is housed in a cap 386 which also closes the lower end of the socket and makes the same oil tight. The upper end of the socket loosely embraces the shank of the steering ball bolt and the tight joint is made at this point by the cork or other oilproof elastic ring 387 with the end of the steering knuckle arm 377. The tapered shank 379 has a groove 388 which communicates externally with the pipe 369, this pipe being attached to a socket in the steering knuckle arm 377 by the compression coupling 389 and a drilled passageway leading into said groove 388. A longitudinal passageway 391 is drilled through the ball 390 and the shank 379 and a radial drilling 392 from the groove 388 into the longitudinal groove 391 permits the lubricant to pass down to cross drillings 393 the ends of which terminate in longitudinally extending slots 394 milled across the ends of the cross drilling 393 and providing communication between the spherical bearing members 382 and 383.

The socket 385 has a split clamp member 395 by which connection is made to the tubular tie rod 375 and a metal plug 396 cuts off the socket from the split clamp so as to provide a substantially fluid tight casing for the ball and socket joint which is formed between the steering knuckle arm and the tie rod 375. The steering arm 376 is connected to the drag link 397 by a ball and socket joint.

The ball and socket joints between the drag link 397 and the steering arm 376 is substantially like the one described between the steering knuckle arm and the tie rod. The pipe 370 is secured to the steering arm by metal bands 373 and 374 and the end of the pipe 370 is connected by a coupling member 398 to a boss in the tapered socket 399 at the end of the steering arm 376 which receives the shank 400 of the steering ball 401. As in the case of the shank 379, a groove shown in dotted lines at 402 in Figure 8 communicates with the pipe 370 and in turn a radial drilling and a longitudinal drilling 403 and 404, respectively, convey the lubricant from the pipe 370. A diametrical drilling 405 provides a passageway to convey the lubricant from the central longitudinal passageway 404 to the bearing between the ball and the spherical stationary bearings 406 and 407. The surface of the ball is provided with longitudinal slots at the ends of the cross drilling 405 to provide an ample port for the introduction of lubricant into the bearings. The spherical bearings 406 and 407 are held in a socket 408 formed in the end of the drag link 397. This socket is closed off at the ends to prevent escape of oil and a cover member 409 fitting about the shank 400 of the ball covers the slot in the tubular socket. A gasket such as 410 may be interposed between the cover 409 and the cylindrical sides of the socket 408 and a spring 412 between the end of the arm 399 and the cover member 409 presses the gasket in place.

A sheet metal plate 413 may be interposed between the gasket 410 and the surface of the socket 408 in order to prevent cutting of the gasket by the edges of the opening in the socket 408.

A trap basin 17 therefore lubricates first the king bolt bearings 347 and 358 filling the roller bearing cavity 367 and will rise to the two outlets 371 and 381 from where it will run down through pipe 369 to the tie rod bearing 382 and through pipe 370 to steering knuckle bearing 400.

It must be observed that in this construction the trap basin unit 17 is situated at a higher level than all of the bearings it lubricates and that the outlets 371 and 381 are situated at the upper end of the king bolt bearing. If the outlets 371 and 381 would be situated at the lower end say 346 of the king bolt bearings the oil may not rise high enough to lubricate the upper end of the king bolt bearing at 358.

The trap basin unit 17 also is provided with a connection, namely the pipe 334, heretofore mentioned, to pipe 19 which is provided with a coil or flexible portion 415 leading up to the trap basin units 20 and 21, the trap basin units being of the usual type, such as shown, for example, in Figure 20, and it being connected in turn by pipe 416 (see Figure 3) to the trap basin unit 21. The trap basin units 20 and 21 lubricate the front wheel brake mechanism. The unit 21 may be of the type shown in Figure 30 or in Figure 33 for a dead-ended unit.

The pipe line system continues from the trap basin unit 23 which lubricates the steering knuckle spindle on the left side of the vehicle by way of the flexible hose 26 to the unit 27.

At the rear of the chassis a special construction is employed for lubricating the shackles for the ends of the rear springs.

Figure 71:
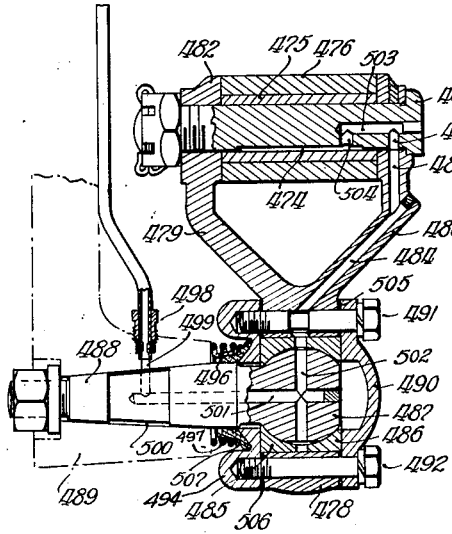
Figure 71 is a view similar to Figure 11 of another manner of introducing the lubricant into the spring shackle bearings for the rear end of the rear spring.

In Figures 11 and 71 I have shown structures by which this may be accomplished. Referring now to Figures 10 and 11, the pipe 40 which is connected to the outlet of the trap basin unit 39 extends downwardly along the rear horn of the frame and is connected by a coupling 465 to the flexible tube 466 which is like the flexible couplings 16 and 26, heretofore described. The opposite end of the flexible hose 466 is connected to a socket 467 formed in the head 468 of the upper shackle bolt 469. The bolt 469 has a central drilled passageway 470 communicating through a radial drilling through the seat or socket 467 with the flexible hose 466.

Radial drillings 472 and 473 communicate with a groove 474 formed along the lower central part of the bolts 469 to lubricate the bearing between said bolts and the bushing 475 in the spring eye 476 of the rear spring 477.

The shackle has eyes at the upper end through which the bolt 469 passes, and these eyes are connected to a single eye or frame 478 at the lower end through two downwardly converging arms 479 and 480. The eye 482 and arm 479 are drilled to provide passageways 483 and 484 leading down to the inside of the eye or frame 478 which embraces the two spherical bearing seats 485 and 486 forming seats for the ball 487 extending from the shank 488 which is seated in a conical socket in the end of the frame, as shown at 489. One end of the open frame or ring 478 is closed by a cap or cover 490 by means of two bolts 491 and 492.

The drilled passageway 484 intersects the opening through which the bolt 491 extends and this bolt is reduced at its central portion by peripheral groove 493 to allow the passage of oil therearound and into the split between the two bearing halves 485 and 486 into communication with the ball 487.

The opposite side of the ring 478 has a plate similar to the cover or cap 490, this plate 494, however, having a central opening through which the shank of the ball 487 extends. An annular spring pressed ring or cover member 496 covers the opening between the apertured plate 494 and the shank of the bolt.

A compression spring 497 is located between the cover ring 496 and the ends of the frame in which the shank 488 is seated and holds a gasket 507 against the end of the socket. The lower bearing for the ball and socket joint is thereby rendered substantially oil tight.

The operation of this construction is as follows: When a charge of lubricant is deposited in the unit 39 and the ball check valve therein opens, or as the lubricant runs through the resistance passageway the lubricant is conducted by the pipe 40 downwardly to the coupling 465 and then upwardly by the flexible hose 466 to the shackle bolt 469. From here the oil being forced upwardly by the inverted siphon effect of the pipes 40 and 466 passes through the passageway 470 and radial openings 472 and 473 into the bearing for the shackle bolt 469. Some of the oil continues on through the passageways 483, 484 and into the ball and socket bearing in the lower end of the shackle.

It is to be observed that wherever oil is passed through one bearing to another the longitudinal oil groove should not extend completely to the ends of the bearing of the bolt and its bushing so as to keep the ends fairly tight to prevent loss of oil at these points. It is desirable at all times to have the bearings sufficiently enclosed that oil will not escape therefrom to an appreciable degree.

In the construction shown in Figure 71, the flexible hose 466 is not necessary, as I lead the lubricant through the lower ball and socket bearing to the upper cylindrical bearing.

In this case the pipe 40 is connected by coupling 498 into a socket formed in the boss at the end of the frame 489, a passageway 499 leading into the tapered seat of the shank 488, said shank having an annular groove 500 at its intermediate portion. The shank of the ball and the ball 487 have a central passageway 501 which communicates with a transverse passageway 502 which communicates with the space between the bearing parts 485 and 486 and this in turn communicates with the passageway 484 drilled in this case in the arm 480 at a vertical passageway 483 communicating with corresponding drilled passageway 484' in the bolt 469. The bolt 469 has a central passageway 503 and a radial passageway 504 communicating with a longitudinal groove 474 for distributing lubricant to the bearing between the bolt 469 and its bushing 475.

The cap 490 is held in place on a ring or frame 478 and a tight joint is made by means of the gasket 505, and similarly on the opposite side the apertured plate 494 has a gasket 506 for making a tight joint with said frame or ring 478. The threaded sockets for the bolts 491 and 492 are not drilled through the cover member 494 so as to prevent the leakage of lubricant along the threads of these bolts.

I have shown also a gasket 507 between the follower ring and the apertured plate 494.

It will be observed that the spring pressed follower ring 496 has two tapered portions. The portion of greater taper presses the gasket 507 against the cooperating face of the cover member 494 to form a tight joint at that point, and the portion of less taper of the ring 496 tends to force the gasket 507 against the shank 488 to maintain a tight joint at that point. Through the aforesaid gasket 507 and the gaskets 506 and 505 care is taken to prevent escape of the oil by leakage along either the threads or the shanks of the bolts 491 and 492 or at the joining surfaces between the ring or frame 478 at its cooperating cover members 490 and 494. This is desirable to insure that oil will pass up to the upper bearing in all cases.

In Figures 65 to 67 I have shown a special fitting 509 comprising a triple trap basin unit. The frame of the triple trap basin unit forms three connected bodies each of which is substantially like the unit shown in Figure 23. In this case the pipes 510, 512 and 513 do not rest against shoulders endwise but are merely soldered in place with their ends slightly below the shoulder upon which the spring 187 rests.

The two communicating pipes or tubes 514 and 515 of the pipe line system are soldered in sockets formed by a complete transverse drilling through the entire body of the unit 509 which drilling provides communication between all of the units.

Ribs such as 516 are formed on the body of the units back of each body portion and holes are drilled and tapped in the web between the body portions, as indicated at 517 and 518 for attaching screws such as 519. Thus two, three or more trap basin units leading to different bearings may be formed in the same unitary structure.

I wish to call attention to the advantage of construction of my flexible hose connection, such as 16 and 26, 45 and 53, which connect points on the frame to the points on the axles. The hose connection is bent generally in elbow form with a relatively large rounded knee of a comparatively large radius. In the case of the metering units 17 and 23 care is taken to have the metering unit in each case situated at one end of the flexible hose higher than the other end of the flexible hose in order that air will remain on top of the metering unit after pressure has ceased.

In these connections I prefer a short flexible hose of about fifteen inches length made of a flexible metal coil covered with rubber and without any additional metal wire braiding. The metal wire braiding is left off because it would prevent the hose from being twisted and the action of my flexible hose depends upon a slight twist due to the vertical movement of the chassis relative to the axle, or vice versa. These movements twist the flexible hose at an angle of not much more than about 30° over its entire length of fifteen inches, which does not harm the hose. I place this flexible hose in substantially a horizontal plane because it has the advantage of adapting itself to the large vertical movements of a chassis with the least strain on the flexible hose. Another advantage of using a flexible hose in connection with my system of air propelled oil lubrication is that such a short hose offers much less resistance to the flow of the oil in the pipe line and is less unsightly than the flexible connections heretofore employed consisting of a large number of plain tube coils. Another important advantage of using my type of flexible hose is that it will not be sharply bent due to the action of accumulated hardened mud or ice. Hardened mud or ice as well as stones or pieces of gravel thrown against plain tube coils will invariably destroy such coils which are made of thin walls and, therefore, weak tubing if used in coil form.

Due to the fact that my system permits of accurate metering of the oil and a thin oil may be employed I may lubricate numerous other bearings not herein shown as, for example, the fan bearing, the water pump bearing and even the electric distributor bearing. It is a known fact that not a single existing system of centralized chassis lubrication is connected to the electric distributor for the reason that the distributor when over-lubricated becomes short circuited. Since my system truly measures out the exact amount of oil needed for the specific bearings I can connect my system to a distributor assembly and meter an extremely small quantity of oil at each operation. The oil line may go to the clutch and brake pedals, and in fact to any desired part of the chassis or motor parts, if so desired.

In the system of my invention there must always be a complete circuit. In brief, air goes from the air pump and compressed air reservoir unit to the oil reservoir and displacement pump unit. From here it travels progressively through the pipe line system through all connected metering units in series and after the last metering unit has received its charge of lubricant the surplus oil is driven back into the oil reservoir and the air escapes. The escaping charge of compressed air gives a hissing sound which constitutes a signal apprising the operator of the fact that oil has been distributed to the last bearings in the group of bearings which are to be lubricated by my system.

I shall now describe more in detail in connection with the diagrams of Figures 50 to 55 what takes place in the pipe line and in the metering unit during and after the pressure period when the bearings are lubricated.

*Operation*

Assume that the inertia air compressor has charged the compressed air reservoir to the predetermined pressure of, for example, thirty pounds per square inch, and the differential pressure valve thereupon opens admitting a charge of compressed air to the air pipe 9 leading to the air inlet pipe to the oil reservoir unit 2.

The distribution of lubricant to the various metering units is progressive in character, that is to say, the various trap basins receive their charges of lubricant one after the other and not simultaneously. One of the advantages of this progressive distribution of the lubricant is that the oil or air column, or both, after they leave the last bearing and discharge back into the oil reservoir create a peculiar hissing sound which is one of the means I employ to remind the operator that the last bearing, and each one preceding it, is then lubricated. In my invention it does not make any difference what means are employed to notify the operator that the last bearing has received a charge of lubricant—and when the last bearing has received its charge of lubricant, all bearings have received their charges of lubricant—so long as his attention is attracted by one of these signaling means.

Referring to Figure 50, the charge of air from the compressed air reservoir has been admitted to the displacement chamber of the oil reservoir unit 2 and a charge of oil has been driven into the oil delivery pipe 7 with the charge of compressed air following the same. The charge of oil is indicated by the black filled portion of the pipe line system. As the charge of oil moves forward and the air follows, some of the oil will adhere to the inner surface of the pipe 7 as is plainly indicated in Figure 50. As the charge proceeds, as shown in Figure 51, oil will enter the first trap basin unit of the first of the three bearings shown and will force the check valve to its seat closing off the outlet to the corresponding bearing. The body of oil in excess of the requirements of the first trap basin unit is driven on through the pipe line system towards the next unit leaving the first trap basin units full to the level of the pipe, as shown in Figure 52, and filling the second unit, closing off its check valve and proceeding on toward the third unit. It will be observed that the check valve in the first unit and in the second unit is now closed and the escape of oil into the bearings is prevented. This is because these units are under sufficient pressure to hold the check valves closed against the relatively weak springs. The body of oil then follows on to the third unit, as shown in Figure 53, leaving the proper charge in the second trap basin unit.

The third trap basin unit is then filled and its check valve is closed by the pressure of the oil and the air back of it and the excess of oil is then driven on in the pipe line system into the return line 8 from which it is discharged back into the top of the oil reservoir unit 2. As soon as the remainder of the charge of oil has been discharged into the oil reservoir, the compressed air back of the same escapes giving the signal heretofore referred to. At the same time the pressure in the pipe line system drops to atmospheric or substantially atmospheric pressure the differential valve between the compressed air reservoir and the oil reservoir 2 closes the opening of the opposite end of the pipe line system to atmosphere.

Upon this release of fluid pressure in the pipe line system the check valves in the metering units will rise under the influence of the springs, and the oil will run by gravity into the bearings, as indicated by the thick black lines defining the bearings in Figure 55. During the interval between lubricating operations as determined by the accumulation of air by the unit 5, the draining of the trap basin full of oil into the bearing will keep the corresponding bearings suitably lubricated. It will be observed, for instance, that the central trap basin of the three units shown is larger than the two end bearings for the purpose of supplying a greater quantity of oil to this bearing.

After the distribution operation has occurred the oil adhering to the inside walls of the pipe line system will tend to gravitate to the lower points in the system and, as shown in Figure 55, it will be observed that the depressed portions of the pipe line system on each side of the metering unit serve to receive and retain such oil as collects from the walls of the pipe line system. Since these parts are bends or portions of the pipe itself and not fittings there will be no tendency to leak oil at the fittings nor will there be a tendency to drain the accumulated oil out of the bearing or accidental leak at a fitting.

The charge of oil flowing in the pipe line system ahead of the charge of compressed air affords a high degree of resistance to rapid flow and travels more slowly than would the charge of compressed air if unobstructed by the charge of oil. Hence, the air which is expelled from the pipe line system ahead of the charge of oil is not sufficiently compressed to have any effect upon the system.

I have not shown in Figures 50 to 55 the operation of the pins 192 but the same are of material assistance in filling of the trap basin unit and evacuation of the air therefrom.

The above described operation of driving the charge of oil through the pipe line system shows the operation of filling the trap basin unit for the first time. The system will remain in the condition shown in Figure 55 until succeeding operations occur.

These succeeding operations are not materially different in function from the initial operation above described. Upon the driving of a subsequent charge of lubricant through the system to perform a lubricant distributing operation the plugs or bodies of oil trapped in the lower parts of the pipe line system are merely driven ahead of the main charge, the air between such plugs or bodies of oil as remain in the pipe line system being expelled either through the bearings or through the remainder of the pipe line system into the oil reservoir 116.

Depending upon the diameter of the tubing employed in the pipe line system a greater or less percentage of the system will be filled by the oil draining from the walls thereof. The following current of air which propels the charge of lubricant ahead of it will, to a certain extent, atomize and carry along particles of oil and drive the film of oil on the walls along with its flow.

In case of resistance passages in the outlets of the bearings instead of the check valves the distribution of lubricant to the respective trap basin units is substantially the same except that during the pressure period some oil may be forced through the resistance passageways of the units nearest the oil reservoir to greater degree than the unit remote from the oil reservoir. This, however, is inconsequential in view of the relatively short period of application of pressure in distributing lubricant.

Furthermore, the lubricant will not be driven out of any trap basin unit but substantially a full charge will remain in each unit because of the oil conveying action of the air following the charge of oil.

The same signaling action is given in the case of the units employed in the resistance passageway as units employing the ball check valve, that is to say, the escaping charge of compressed air after the last bearing has received its charge of lubricant will notify the operator that all of the bearings have received their quota of lubricant.

Type "B"

This type comprehends the combination of the automatic air pump, air pressure reservoir, oil reservoir and its displacement pump all in a unitary construction which will now be described.

*The combined automatic air pump, air pressure reservoir, oil reservoir and air displacement pump*

In the system shown in Figures 56 to 60, inclusive, I have indicated the essential working parts of an automatic lubricating of the same general character as the one heretofore described, with this modification, however, that the inertia operated air compressor, its compressed air reservoir, oil supply reservoir and its pneumatic liquid displacement pump are all combined in a common structure indicated at 520 in Figure 56.

The combination unit 520 is preferably placed at the front part of the vehicle frame where it will receive sufficient oscillatory motion to operate the inertia actuated compressor. The unit 520 comprises a main frame 522 with a rearwardly extending bracket portion 523 by which the unit is mounted. In this case the unit is mounted upon a pressed metal support 524 comprising a generally channel shaped member having the two side flanges 525, one of which is shown in Figure 56 and having a lug 526 struck out of the bottom of the channel to form a limiting stop for limiting the downward motion of the support 524 with respect to the supporting fan bracket 527. The fan bracket has substantially parallel sides or edges and the flanges 525 of the channel fit the same. The base of the channel is perforated to receive the screw 528 by which the position of the cooling fan 529 of the automobile is adjusted.

In this manner the combination unit is suitably supported upon the fan bracket, being moved up and down with the fan in accordance with the adjustment of the latter.

Due to the fact that the compressor and the compressed air reservoir are combined with the oil reservoir and displacement pump this unit has only the two pipes extending therefrom, one of which pipes is the oil discharge pipe 7 and the other is the oil return pipe 8.

The pipe line system and the trap basin unit used in connection with the combination unit shown in Figures 56 to 60, inclusive, is in all material respects the same as that heretofore described.

The main frame 522 has a glass reservoir 528 which, if desired, may be the same as the glass reservoir 116 shown in the separate reservoir unit, this being optional. The glass reservoir 528 rests upon a gasket 529, resting upon a shelf 530 formed on the frame 522. At the upper end of the glass reservoir 528 the cup 122 has an outwardly extending flange, as explained in connection with Figures 15 to 17 resting upon the gasket 532 to equalize the pressure of the flange 534 upon the top of the glass reservoir 528. The cup is provided with perforations 142 or openings to which the reservoir may be filled with oil, and there are openings 535 along the upper margin to permit air to escape from the reservoir 528.

The return pipe 8 is connected through a pipe coupling with the socket 118 on the main frame 522 and the pipe 120 is pressed in a seat in line with the return pipe 8 so that oil is discharged from the pipe 120 and into the top of the reservoir 528.

The cap or cover 137 is of the same construction as described in connection with Figure 17 being of a size suitable to fit the outer end of the flange 534 and to have its marginal portion substantially flush with the outer cylindrical surface of the glass reservoir 528.

The central connecting bolt 131 which is threaded at its upper end and provided with the nut 135 for drawing the same tight is connected to a hollow boss 130 drawn in the top of the air chamber 570. The compressed air reservoir 570 is formed of three main parts, namely, the top portion 536 which is a drawn sheet metal cup, a lower sheet metal cylinder 537 which is joined to the top part 536 by the spun and soldered joint 538. In the central part of the cylinder 537 the cross wall member 539 is secured by soldering the same in place. The member 539 rests upon a ridge 540 which is rolled or otherwise formed in the side walls of the member 537. This dividing wall member 539 has an annular flange portion 542 which fits the inner wall of the cylinder member 537 closely and permits of a tight joint being made by a soldered seam. The central part of the wall member 539 has an opening 543 through which projects a nipple 544, this nipple being threaded into a stem 545 formed as a part of the main frame member 522. The nipple 544 has a conical shoulder 546 forming a joint like a tapered valve between the nipple 544 and the socket or stem 545. The connection between the nipple 544 and the wall member 539 is made tight by a flexible gasket of leather, or the like, 547, this gasket being like a cup leather seating in a recess 548 and held at its outer margin by the annular ring 549, which annular ring is preferably formed of sheet metal and is L-shaped in cross section, as plainly shown in Figure 57 and in Figure 60.

The ring 547 is pressed down upon the margins of the packing member 547 and the pressure of the air in the reservoir keeps the joint tight.

The boss 545 and the lower end of the nipple 544 provide a cage for the discharge ball check valve 560, this ball seating upon a resilient seat 562 under the influence of the spring 563. The boss 545 forms a continuation of the cylinder member 65 which is the same as that disclosed in connection with Figure 13. The cylinder member has a bore in which lies the plunger piston 66, this plunger piston being lubricated by the graphite body 67 held in place by the plug and guide 68.

The inertia weight 74 is connected to the lower end of the plunger piston 66 and it is supported upon the spring 77, the upper end of the spring bearing against the bottom of the flange 76 and the lower end of the spring resting upon the edges of the buffer member 78 formed of elastic material, such as rubber to increase the rebound of the weight 74. In the present case the cup member 72' is made like the cup 72 shown in Figure 13, but there is an auxiliary bottom member 563 mounted upon the end of the adjusting screw 564 which is threaded through a boss 565 formed in the bottom part of the cup member 72' and the stem is locked in position by the nut 566. By means of this auxiliary adjustable support 563 the pressure of the spring 77 may be adjusted. The inlet to the cylinder 65 is through an over-run port 69, the outer end of the opening 69 communicating with the interior of the cup 72'.

An opening 79 through the walls of the flange in which the upper end of the threaded cup 72' is screwed admits air to a triangular ring shaped passageway between the flange 567 and the threaded wall and the flanged portion 567 has an opening therethrough like the opening 80 shown in Figure 13 to admit air from the outside through the opening 79 into the ring shaped passageway and from the ring shaped passageway through an opening 80 into the interior of the cup 72' and from the cup 72' through the passageway 69 into the cylinder.

By the oscillations of the weight 74 the plunger 66 is oscillated and air is compressed being driven past the discharge check valve 560 and through the nipple 544 into the compressed air reservoir 570. The discharge valve 569 is located between the compressed air reservoir chamber 570 and the pumping chamber 572 which latter is formed in the lower end of the cylinder 537 between the wall member 539 and the transverse wall 573 formed by the main frame 522. The lower end of the cylinder 537 is flanged inwardly to engage the gasket 574 which is made of suitable material impervious to oil and which, at the same time, will provide a tight joint. The lower end of the cylinder 537 having the flanged portion 575 is threaded into a threaded socket 576 forming a part of the main frame 522. An inlet opening 577 is formed in the side wall of the chamber 572 and through this the oil from the reservoir 528 is permitted to enter past the check valve 156 which is in all respects like the check valve shown in Figure 17. It has the leather body fastened by tubular rivets 158 to the side walls of the chamber 572 and it has the spring wire insert 157 to insure opening of the valve 156.

The discharge connection to the discharge pipe 7 is substantially as indicated in connection with Figure 17. I have inserted a short standpipe tube 578 above the bottom of the discharge chamber 572 in order to control the amount of lubricant which is discharged at each discharge operation. This tube connects to the horizontal passageway 163 and in turn the passageway 163 communicates to the inside of the outer pipe 166 the upper end of which is closed by cap 167. The inner pipe 168 extends from a point adjacent the cap 167 downwardly and is seated in a seat 169 formed in the boss 119. The coupling between the pipe 7 and the boss 119 includes the hollow compression screw such as 109 the rubber ring 110 and the washer 111 all as shown in Figure 13.

The displacement or discharge chamber 572 has an air outlet which is shown in Figures 59 and 60 as comprising a passageway 579 formed through the side walls of the cylinder member 537 and extending into a solid boss 580, this boss being hollowed out to receive the threaded plug 582 which plug forms a valve seat for the valve 583 which has a stem 584 provided with arms such as 585 by which the valve hangs on the upper edge of the threaded plug 582 to permit air to pass out of the displacement chamber 572 during the liquid filling operation. That is to say the valve 583 which is provided with a flexible or resilient face in order to form an air tight joint normally hangs down as shown in Figure 60 opening the port in the member 586 and permitting air to be driven out by the incoming oil which enters by way of the inlet opening 577 past the check valve 156.

As soon as the oil reaches the top of the displacement chamber 572 and fills the chamber and the connected pipes 578 and 166 the chamber is in condition to be discharged by the admission of compressed air.

The differential valve 569 in the present case is not required to admit atmospheric pressure to the top of the chamber 572 to allow filling of the same with liquid after a discharge stroke. The valve 569 is in other respects the same as the corresponding valve shown in Figure 13. It comprises a valve member 103 formed of pressed sheet metal or the like seating against the valve seat 102 under the influence of the spring 99.

In this case the back seat 104 is not required to close off any atmospheric passageways, but such an atmospheric passageway may be provided into the chamber formed in the plug 586 by a hole drilled in radially through the side wall of the chamber 537. The air discharge passageway which is controlled by the valve 103 is formed as a groove in the side of the socket of the hollow boss or cage 588. When the pressure in the chamber 570 is great enough to overcome the spring 99 by pressure upon the relatively small area which is exposed by the seat 102, air will be discharged into the chamber 572 and will suddenly snap the air vent valve 583 and the inlet check valve 156 shut and cause the discharge of liquid down to the top of the short standpipe 578 from the chamber 572. The height of the standpipe 578 controls the volume of liquid which is discharged at each operation and this may be controlled by varying the height of such standpipe 578.

In the normal operation of the device as shown in Figures 56 to 60, the entire unit being mounted at the front end of the frame of the vehicle receives sufficient oscillatory motion to cause the inertia operated air pump to compress a suitable charge of air in the compressed air reservoir 570 to permit a discharge of compressed air into the displacement chamber 572 for driving a body of oil therefrom to the pipe line system, the air following the oil as described in connection with the pipe line system, heretofore described in detail and expelling the remainder of the body of oil and the compressed air at the remote end back into the reservoir 528 through the pipe 120.

It will be observed that the combination unit 520 as shown in Figure 56 is placed substantially centrally of the chassis of the car and at the forward end of the same where the cover member 137 may be reached from either side after raising the hood.

It will be observed that I have omitted the screen around the outside of the displacement chamber 572 for the inlet passageway 577. As a substitute for the screen, I have provided a settling chamber below the level of the standpipe 578.

The quickly attachable pipe line system is identically the same as used in type A with the exception that the air pipe 9 heretofore required between the air pressure reservoir and the oil measuring chamber of the oil reservoir is now eliminated.

The catch basin type of metering unit is identically the same as that used in Type A. The function of the entire system is also identical with that of Type A.

TYPE B

Figure 61:
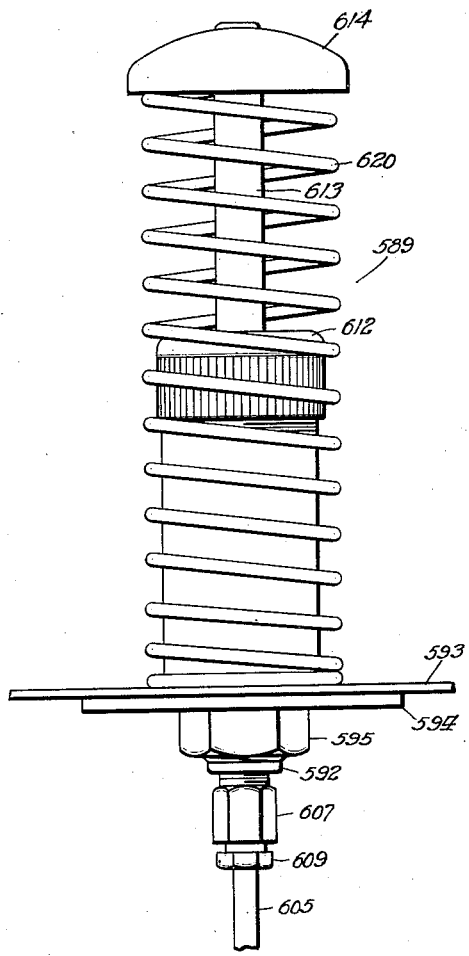
Figure 61 is a side elevational view of the manually operated compressor or air pump.
Figure 63:
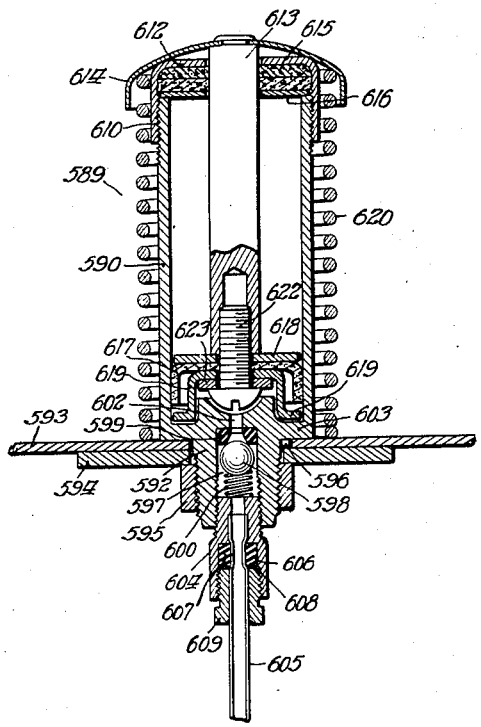
Figure 63 is a vertical section through the pump showing the plunger pressed down to the bottom of the stroke.
Figure 62:
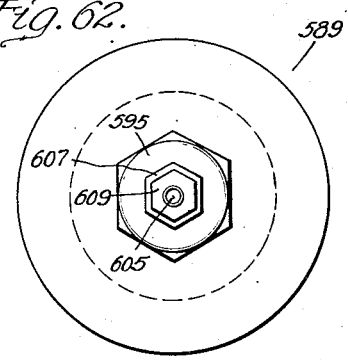
Figure 62 is a bottom plan view of the same.

1. The manually operated pump.

Where it is desired to employ the lubricating system of my invention in its most inexpensive form, I provide a foot operated air pump instead of an automatic air compressor. In this case the foot pump such as that shown in Figures 61 to 63 is mounted upon the dashboard of the automobile but it may equally well be situated on the footboard for manual operation if desired, or any other suitable place.

The level at which the foot pump is placed is immaterial as it is an air compressing pump, not a liquid pump. While any suitable form of manually operated air compressor may be employed, preferably I provide a cylinder member 590 formed of a die casting having a shank or stem 592 adapted to pass through an opening in the mounting plate 593, a suitable reenforcing plate 594 being provided to stiffen the connection between the cylinder of the pump and the relatively thin mounting plate 593.

The shank 592 is threaded to receive a nut 595. The shank 592 has a projection or key member 596 adapted to lie in a notch in the plate 593 so as to prevent the cylinder from turning in the plate 593.

The shank 592 is provided with a cylindrical recess or chamber 597 in which the discharge check valve 598 is mounted. A resilient seat 599 for the ball check valve 598 is located at the bottom of the recess or chamber 597 and the ball check valve 598 has a discharge valve spring 600 for holding it normally on its seat. The seat 599 has an opening therethrough which registers with the discharge passageway 602 extending through the bottom or head of the cylinder 590. The hollow shank or stem 592 is provided with a female thread at the outer end of the recess 597 and into this a connecting plug 604 is threaded, this plug being a special coupling plug for making connection with the air discharge pipe 605.

The plug 604 has a recess 606 in which there is disposed the rubber compression ring 607, metal washer 608 and the hollow compression screw 609 which embraces the pipe 605 and which serves to put the rubber ring 607 under sufficient pressure to form a fluid-tight joint. The plug 604 may be screwed down to provide a tight seat but since the period of retention of pressure in the pipe 605 is not great, that is to say since the connection does not stand continuously under pressure or under pressure for any great length of time, an absolutely tight joint is not so essential.

The upper end of the cylinder 590 has a male thread which cooperates with the female thread formed on the flange 610 of the upper cylinder head 612. The cylinder head 612 is apertured to pass the stem or piston rod 613 which rod has a cap or button 614 secured to its upper end. The cylinder head 612 is a sheet metal cup fitting relatively loosely around the piston rod 613 and retaining one or more cork washers 615 between it and the apertured plate 616 which fits within the cup forming the cylinder head and rests against the end wall of the cylinder 590. The cork washers 615 are suitably compressed between the head member 612 and the washer or plate 616.

The piston rod 613 carries at its lower end a cup leather 617 which is clamped between the follower plate 618 and the guard or stop plate 619.

This guard or stop plate has a flange extension 619 adapted to prevent engagement of the end of the cup leather with the cylinder head and thereby limit the stroke of the plunger.

A coil spring 620 is confined between the cap or button member 614 and the plate 593 extending completely outside of the cylinder member and serving to move the plunger upon its return stroke.

The cap or button 614 is preferably riveted to the end of the stem 613 and the cup leather and its cooperating plates are secured to the lower end of the stem 613 by means of the machine screw 622 and washer 623. The clearance between the plunger and the cylinder head is made in minimum, so as to keep the volumetric efficiency high.

Obviously instead of the cup leather piston, another form of piston might be employed but the construction above shown and described is effective and inexpensive. Since the pump is adapted to be operated by the foot and the pressure of the foot may not be directly axial of the rod 613, the flange extension 619 in advance of the cup leather tends to guide the plunger and prevent binding. This is particularly desirable for the first part of the stroke where the relatively great length of projection of the rod 613 gives sidewise pressure of the foot too great a leverage.

The pump has no inlet check valve as sufficient air will enter past the stem 613 and the cork washers 615 and flow past the cup leather 617 on the upward stroke of the pump. Preferably the cup leather is impregnated with a lubricant and likewise the washers such as the cork washers 615 at the upper end should be impregnated with a lubricant. These washers perform the further function of preventing the pump from rattling and also tend to prevent squeaky operation of the pump.

2. Oil reservoir unit with built-in air pressure reservoir.

The oil pressure reservoir and displacement pump units for use in connection with the manually operated air compressor or with a source of compressed air under manual control as will be described later may be of either the bottom supported type shown in Figure 64 or the bottom supported type shown in Figure 75 or it may comprise the top supported type shown in Figures 72 to 74.

Figure 64:
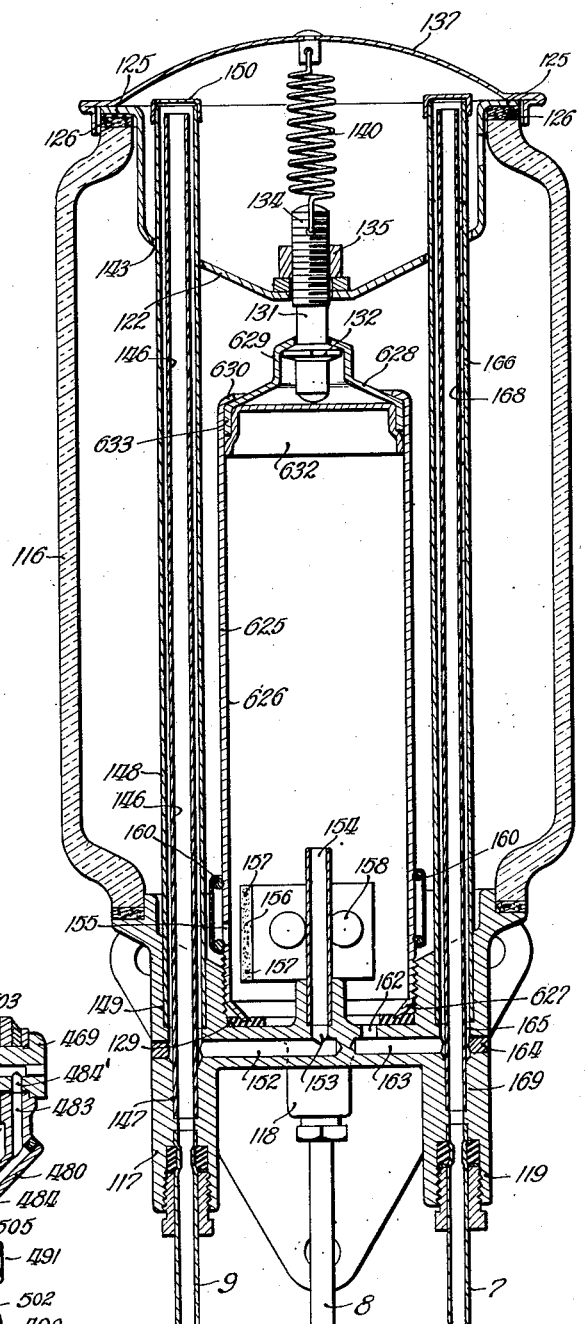
Figure 64 is a vertical longitudinal section through the oil reservoir and pneumatic displacement pump for use with the manually operated pump shown in Figures 61, 62 and 63 or to be used with the manually controlled source of air supply.

The only noticeable difference between the unit shown in Figure 64 and that shown in Figure 17 is that in Figure 64 the chamber 625 is of a larger volume than the corresponding chamber 128 shown in Figure 17 for the purpose of providing a receiving space for compressed air. This receiving space is to be charged with compressed air during the successive strokes of the pump 589 in the Type B system or during the time that the inlet valve for compressed air is held open by the hand for systems of Types C and D.

The chamber 625 is formed of a length of tubing 626 flanged in as indicated at 627 at its lower end to engage the gasket ring 129. At its upper end, it is provided with a cap member 628 provided with a hollow boss 629 of polygonal configuration receiving on its inside the head 132 of polygonal configuration of the bolt 131 which connects the cylinder 626 with the cup 122.

The upper end of the cylinder 626 is flanged over as indicated at 630 and the sheet metal cap 632 is fitted inside the rim 633 of the cover member 628, these parts being soldered together to form a fluid-tight joint for the top of the cylinder 626 and a braced construction for the bolt 131 which is put under tension by the nuts 135 to hold the cup 122 and the oil reservoir 116 firmly in place.

Except for the above noted difference, the construction of the device shown in Figure 64 is the same as that shown in Figures 15 to 19.

In this construction the upper end of the chamber 625 takes the place of a separate air reservoir, since the upper part of the chamber 625 will always be filled with air.

When the oil reservoir 116 is filled with liquid lubricant, the lubricant will run into the bottom of the chamber 625 through the inlet passageway 155, the valve 156 being opened and held in such position by the spring wires 157 heretofore described.

When the chamber 625 has been filled with liquid through the level of the top of the standpipe 154, the standpipe 154, passageways 153, 152 and the space between the pipes 146 and 148 will be filled with oil to the level of oil in the reservoir 116. Further inflow will then stop and the top of the chamber above the upper end of the standpipe 154 will be full of air. Upon operation of the foot pump or other manually operated pump, air will be forced in through the pipe 146, thence through pipe 148 displacing the oil therein into the chamber 625 and causing the valve 156 to be closed. Oil will begin to flow out through the discharge passageway 162, passageway 163, pipe 166 over the top of pipe 168 and out through the oil delivery pipe 7.

The resistance to oil outflow is much greater than the resistance to the inflow of compressed air and as the pump is operated and this is preferably done relatively rapidly, an air pressure will be built up in the chamber 625 considerably faster than the oil can be driven through the pipe line system with the result that a considerable pressure may be built up in the chamber 625 before the oil has been expelled at the remote end of the pipe line system through the return pipe 8 back into the oil reservoir 116. The operator is instructed to continue the operation of the foot pump until he hears the hissing sound peculiar to the escape of the compressed air after the last unit has been charged with lubricant.

A modified form of unit for use in connection with the foot operated pump or with a manually controlled air supply is shown in Figure 75. While this construction is of the type which provides a bottom support for the oil reservoir, its main features of construction are similar to the device shown in Figures 72 to 74 inclusive.

It has the main frame member 634 which comprises a cover with a depending flange 635 for the upper end of a glass bowl which forms an oil supply reservoir 636. This reservoir 636 has a boss 637 at the bottom with an opening 638 therethrough and the outer end of the opening is flared out to provide a conical seat 639 adapted to be closed by a cork or the like gasket or plug 640 through which passes a stem 641 of the bolt 642, the upper end of which is connected to the tube 643 forming the wall of chamber 644. This chamber is a combination air reservoir and pneumatic displacement chamber like the chamber 625 as shown in Figure 64.

The main frame member 634 has the same general structure as the main frame member 421 of Figure 74. This comprises the attaching foot 422, the reinforcing web 459 and the three connection sockets 425, 426 and 427 for receiving the hollow compression coupling screws 428, 429 and 430, for compressing the rubber rings 432 or other suitable compression rings to make a fluid-tight joint. The top wall of the frame member 635 has on its lower side a depending annular flange 643 with an internal thread on its inner peripheral surface for receiving the threaded upper end of the cylinder 643. The cylinder 643 is screwed into the threaded socket 645 to form a substantially fluid-tight joint. No gasket is shown, the end of the cylinder abutting against the bottom wall of the threaded recess. The lower end of the cylinder 643 is flanged in as indicated at 447 like the construction shown in the displacement chamber in Figure 74. This flange engages a gasket and retaining ring 448 which assists in making a fluid tight joint at the bottom of the cylinder and also serves as a retainer for the leather disc check valve 450 having notches 451 in its periphery as disclosed in Figures 74 and 75.

A drawn sheet metal cap member 646 similar to the member 453 in Figure 74 closes the lower end of the cylinder 643 and has a depressed portion 647 forming a housing for the inlet check valve 450. The central part of the cap 646 is pressed into conical form and apertured as indicated at 648 to pass the shank 641 of the bolt 642, the conical portion forming a socket in which the conical head 649 of the bolt 642 is seated.

The bolt 642 has a longitudinal passage 650 formed by an axial drilling and has a lateral part 652 formed by a radial drilling. The passageway 652 is covered by the screen 653, the upper margin of which is gripped between the sheet metal ring 458 and the outer surface of the cylindrical flange 452 by which the cap 646 is threaded upon the lower end of the cylinder 643. The central part of the screen 653 has an opening through which the shank 641 of the bolt 642 is passed, there being a flange 654 on the body of the screen which preferably is loose upon the shank 641 of the bolt 642.

This flange presses upon the sides of the bolt 642 but can be removed for cleaning or the like, if desired.

The air supply pipe 9 has an inlet passageway 444 communicating with the recess 443. The recess in turn communicates with the interior of the pipe 655 which corresponds to the pipe 439 in Figure 74. The pipe 655 is seated in the socket 440 below the recess 443 and the central pipe 446 is seated in the socket 445 above said recess 443.

The oil and air return pipe 8 communicates with the diagonal passageway 656 communicating with the oil supply reservoir 636 outside of the chamber 644.

The last reservoir 636 is reduced at its upper end at 657 to pass inside the depending annular flange 635 and engage the gaskets 658. The bolt 642 which is connected to the lower end of the cylinder 643 passes through the cork plug 640 and metal washer 659 and has a nut 660 threaded upon the lower end thereof. The nut 660 is drawn up tight forcing the conical plug 640 into engagement both with the conical socket 639 in the boss 637 and against the side walls of the shank 641 of the bolt 642 to provide a fluid-tight joint at this point. This upward pressure upon the reservoir 636 compresses the gasket 658 at the top and forms a tight joint at the top of the reservoir 636. Filling openings on each side of the centrally disposed pipes and pipe sockets are provided in the same manner as explained in connection with the unit shown in Figures 72 to 74.

That is to say there is a filling opening and a covering cap therefor upon each side of the line of the web 459 as shown in Figure 73.

The operation of this unit is substantially like the operation of the unit shown in Figure 64. When oil is poured into the reservoir 635 from either filling opening, the other being open to permit the escape of air, the oil will flow in through the screen 653, passageway 652, passageway 650 and will lift the inlet check valve 450, oil then flowing through the notches 451 and through the opening 449 in the ring 448. The oil will fill the pipe 446 as it rises in the chamber 644 and when the level reaches the lower end of the pipe 655, oil will pass up on the inside of the pipe 655 until the level in the pipes 446 and 655 are equal to the level in the reservoir 636. The oil will not rise appreciably above the lower end of the pipe 655 except to compress the body of air retained in the chamber 644 above the lower end of pipe 655. The air herein is trapped. As soon as the filling has automatically taken place, the check valve 450 will tend to drop to its seat over the passageway 650. Thereafter as soon as the manually operated pump is actuated, air will be transmitted through the pipe 9, passageway 444 and into pipe 655 driving the oil ahead of it into the chamber 644. The operator will continue to operate the pump thereby charging the chamber 644 with compressed air which begins to drive the oil out through the pipe 446 through the pipe line system.

The operator is required to give about ten strokes of the pump plunger to complete the operation of the device although this is a matter of the design of the parts. The pipe line system to be employed with this form of oil reservoir and pneumatic displacement pump is the same as that described in connection with Type A.

The trap basin types of metering units are the same as those described in connection with the system of Type A.

Type B

*Combination of air brake system or other air supplying system with my centralized lubricating system*

In Figure 68 I have shown a vehicle such as a bus which is equipped with an air brake system. To this vehicle I have applied my centralized lubricating system employing the quick attachable pipe line system of the type heretofore described in connection with the system of Type A. I also employ in this construction, the trap basin type of metering units heretofore described in the system of Type A. In Figure 68, the solid black lines indicate the pipe line system of my invention, the heavy pipe line system indicates the connection between the compressed air system of the vehicle braking system and my combined oil reservoir unit with built-in air pressure reservoir.

In the vehicle shown in Figure 68, the air compressor 662 is operated to charge one or more of the tanks 663, 664 with compressed air at a suitable pressure which pressure is indicated by the gauge 665 on the instrument board 666 of the vehicle.

A controlling valve 667 under the control of the foot brake pedal 668 serves to admit compressed air at a graduated pressure to the pipe 669 which leads to the brake cylinders 670, 672. These brake cylinders apply the brakes to the rear wheels in a manner known to those skilled in the art.

The reservoirs 663 and 664 are connected as shown at 673. The compressor 662 is connected to the reservoir 663 through the delivery pipe 674. A pipe 675 connected to the reservoir 663 at one end leads to a T connection 676, one branch of which is connected to the pressure gauge 665 on the instrument board and the other of which is connected to the pop valve 677 for preventing an undue pressure accumulating in the tanks 663 and 664. In the connection 678 between the T 676 and the pop valve 677, I provide a T connection 679 leading to the manual control valve 680 of my invention which control valve is mounted on the instrument board 666 with a control button 682 extending from the front of the instrument board 666. An air delivery pipe 683 leads to the unit 684 which is of the combination oil supply reservoir and pneumatic displacement pump type of unit, preferably of the type shown in Figure 64, or the type shown in Figure 75 having a combination air supply reservoir and displacement pump in the oil supply reservoir.

The oil delivery pipe 7 leads to the various metering units which are of the trap basin type heretofore described, these units in the present instance being known for example as unit 685 for the rear end of the right front spring, unit 686 for the front end of the right front spring, unit 687 for the front end of the left front spring and unit 688 for the rear end of the left front spring, unit 689 for the front end of the left rear spring, unit 690 for the rear end of the left rear spring, unit 692 for the rear end of the right rear spring and unit 693 for the front end of the rear right spring.

Obviously as many other units may be provided as are deemed desirable to lubricate the various bearings of the chassis or any other working part.

The control valve 680 is shown in one form as the pull button type in Figure 69. In this case the air supply pipe connection 694 is connected to the plug 695 through a coupling 696 of my invention, the plug 695 being screwed into the adjacent end of the body portion 697 which has a side outlet pipe 683 leading to the combination oil reservoir and displacement pump 684. The body 697 has a threaded stem 698 extending through an opening in the instrument board 666. The stem 698 is provided with a projection 699 fitting into a recess in the opening to prevent turning of the body 697. A nut 700 threaded on the stem 698 holds the body 697 upon the instrument board 666.

The plug member 695 which closes the body 697 has a mouthpiece 702 formed preferably of a rubber composition or the like and this cooperates with the conical valve plug 703 fastened upon the stem 704 which stem passes through a hole in the body 697 and stem 698. A compression spring 704' bears against a sheet metal washer 705 held upon the stem 704 back of the conical head 703. The rear end of the spring 704' bears against a washer 705 which holds a leather packing washer 706 against the head of the body 697. The packing ring 706 is preferably of leather and it tends to be self-packing under the pressure within the chamber 707 formed in said body 697.

Now it can be seen that while the spring 704' is strong enough to hold the valve seated in its yielding seat 702, when the operator pulls out the button 682 and thereby pulls the conical valve member 703 away from the seat 702 compressed air from the reservoir 663 of the air brake system flows into the pipe 683 and from pipe 683 into the displacement chamber, the bottom of which contains oil and the top of which contains air at a slight pressure due to the hydrostatic head of oil in the oil supply chamber.

For example in Figure 64, the chamber 625 above the level of the standpipe 154 will thereby instantly be charged with compressed air by a momentary opening of the valve 703.

The pressure in the air brake system of the vehicle shown in Figure 68 is of the order of seventy five pounds per square inch. Obviously, it may be more or less. All that the operator is required to do to provide lubrication for all of the bearings is to pull out the button 682 and hold the same open momentarily and thereupon let go. The chamber 625 is quickly charged with compressed air and at the same time discharge of liquid to the pipe line system is begun. It is not necessary to do more than charge the chamber 625 with compressed air and immediately let the valve 702 close. The charge of compressed air in the chamber 625 then completes the operation, all as heretofore described in connection with Type "A".

If a push button instead of a pull button is desired, the construction shown in Figure 70 may be employed. The body 710 in this case has the delivery pipe 683 for air secured in place in the boss 696 by a compression coupling, as previously described, and the air supply pipe soldered at one side of the body. It is to be noted that the valve is preferably secured to one of the pipes by soldering and to the other pipe by the compression joint 696 which is made when the pipe line units are assembled on the chassis.

The body 710 has a similar neck 698 fastened to the instrument board 666 in the same manner as previously described.

The air supply pipe 694 admits air into the pockets 713 which is formed below the conical head 714 on the stem 704. The pocket 713 is closed by means of the recess cap 715 which contains the spring 716 which need be strong enough only to seat the valve 714 upon the yielding seat 717. The valve seat 717 rests against the washer 718 which is seated in an annular shoulder in the body 710. The stem 704 passes loosely through the washer 718 but the taper of the valve 714 forces the yielding seat member 717 into engagement not only with the valve member but also with the side walls of the housing 710. A stem 704 is packed by self-packing washer 719 seated in the recess 720 below the washer 718.

The threaded stem 698 is in each case covered by a sheet metal cover 712 to improve the appearance of the device. The stem 704 is connected to its button 682 or 722, as the case may be, by a threaded connection into the base of the button, the stem being provided with a pair of flattened faces 708 on opposite sides to permit a wrench being applied to the stem.

In the present construction the valve body 714 seats with the pressure in the pipe 694 and is held normally closed by such air pressure. When pressure is applied to the button 722 it is necessary to overcome the pressure of the air on the base of the valve 714 and the small pressure of the spring 716 so that the valve will immediately snap open permitting compressed air to pass from the pipe 694 past the valve seat 717 through the washer 718 into the recess 720 and from there to the pipe 683 and to the chamber of the displacement pump such as the chamber 625 in Figure 64 or the chamber 644 in Figure 75.

In the construction shown in Figure 69 the pipe 683 may be connected to the air supply line in which event the valve 703 will be held to its seat by the pressure of the air. In that case the spring 704' need be strong enough only to apply the valve to its seat.

In each case the snap action of the valve is secured and the operator may release the operating buttons 682 or 722 almost immediately after opening the corresponding valve, since the flow of air from the supply tank 663 in this case to the air space in the displacement chamber occurs with great rapidity. In other words, the air space in the displacement pump unit is charged with a charge of compressed air and this charge of compressed air then proceeds to perform the lubricating operation.

The pipe line system may be identical with that heretofore described in connection with Type "A" or it may be of any other preferred type.

Likewise the metering units may be of the trap basin type heretofore described or may be of any other preferred type within my invention.

While I have shown the latter system of the manual control of an air supply to the displacement pump for performing the lubricating operation as embodied in a truck having a system of pressure brakes, it is to be understood that the invention might be applied to any other form of machine in which a supply of compressed air is available.

It is also to be understood that while I have in the various systems herein shown employed compressed air as the driving medium, that is air compressed to a pressure above atmospheric, it is to be understood that I may operate on suction on the remote end, that is on the return end of the pipe line system for drawing the oil through the pipe line system to charge the various metering units and particularly the trap basin of the metering units with a suitable lubricant. In that event the check valves instead of opening downwardly, that is to prevent the escape of oil out of the trap basins, would close upwardly, that is to prevent the entry of air or oil from the bearings into the trap basin units.

It is also to be understood that while I have shown the various features of my invention as applied to automotive work, particularly for centralized chassis lubrication, it is to be understood that I do not intend to limit the application of the system or the various features thereof to automotive work but may employ the same in connection with industrial lubrication or lubrication for any preferred type of machine.

I do not intend to be limited to the details shown and described as I consider a large part of the features and combinations herein disclosed and described to be broadly new and intend the claims herein to be construed as broadly as is permitted by the prior art.

I claim:

1. In a lubricating system a plurality of bearings, said bearings having trap basins open at their tops and having valve means for preventing the outflow of lubricant while the traps are being filled, a continuous conduit having a plurality of lateral openings registering with the openings in trap basins, pneumatic means for propelling a charge of lubricant through the conduit, and means for relieving the pneumatic pressure in said conduit thereby permitting said valve means to open and allow lubricant located in said traps to flow therefrom to their associated bearings.

2. In a lubricating system a continuous conduit open at both ends, said conduit having intermediate its ends a plurality of lateral openings, trap basins communicating with said openings, a pneumatic displacement chamber communicating with the adjacent end of the conduit, an oil reservoir communicating with the remote end of the conduit, and a check valved communication between the oil reservoir and the pneumatic displacement chamber.

3. In a lubricating system a bearing, a trap basin having an outlet leading to the bearing, a conduit extending past said trap basin and having an opening laterally to the top of the trap basin, means for supplying a charge of lubricant to one end of the conduit, means for creating a pressure difference upon the ends of the conduit for propelling said charge of lubricant from said supplying means out through the opposite end of the conduit, and a check valve for the outlet of the trap basin closed by the application of said pressure difference upon the ends of the conduit.

4. In combination with an automobile chassis of an inertia operated air compressor carried by the chassis said chassis having a plurality of bearings, a compressed air reservoir adapted to be charged with compressed air by said inertia operated pump, a supply reservoir for lubricant carried by said chassis, an air operated liquid displacement pump having a displacement chamber with an automatic inlet check valve for liquid between the chamber and the reservoir, a lubricant discharge connection extending from the bottom of the chamber, a distributing pipe leading successively to the bearings and back to and opening into said reservoir and an air supply connection extending from said compressed air reservoir to said pump.

5. In combination with an automobile chassis of an inertia operated air compressor carried by the chassis, said chassis having a plurality of bearings, a compressed air reservoir adapted to be charged with compressed air by said inertia operated pump, a supply reservoir for lubricant carried by said chassis, a pneumatic displacement pump having a displacement chamber with an automatic inlet check valve between the chamber and the reservoir, a lubricant discharge connection extending from the bottom of the chamber, a distributing pipe leading successively to the bearings and back to and opening into said reservoir and an air supply connection extending from said compressed air reservoir to said pump, and means in said air supply connection operable on a predetermined pressure in the compressed air reservoir for admitting a charge of compressed air to the displacement pump.

6. In combination, an air compressor, a supply reservoir for lubricant, a lubricating pump having a pump chamber provided with an inlet check valve leading from the supply reservoir, said lubricating pump being adapted to be operated by compressed air, said pump chamber having a discharge connection, a plurality of bearings, a distributing pipe leading from a discharge connection to the bearing, an air supply connection extending from the air compressor to the lubricating pump, and an automatic valve for periodically passing a charge of air from the air compressor to the lubricating pump.

7. In combination with an automobile chassis having a plurality of bearings, an inertia operated air compressor carried by the chassis, a supply reservoir for lubricant, a lubricating pump having a pumping chamber, said chamber having an inlet check valve for admitting lubricant from the supply reservoir, said pump having a discharge connection, a distributing pipe for lubricant extending from the discharge connection to said bearings, an air supply connection from said compressor to said pump.

8. In combination with an automobile chassis having a plurality of bearings, an inertia operated air compressor carried by the chassis, a supply reservoir for lubricant, a lubricating pump having a pumping chamber, said chamber having an inlet check valve for admitting lubricant from the supply reservoir, said pump having a discharge connection, a distributing pipe for lubricant extending from the discharge connection to said bearings, an air supply connection from said compressor to said pump, and an automatic valve for periodically passing a charge of compressed air from the compressor to said pump.

9. In combination with a machine having a moving part of an air compressor actuated in proportion to the movement of said part, said moving part having a bearing, an air chamber adapted to be charged with compressed air by said compressor, and a lubricating pump having a discharge connector leading to said bearing, said lubricating pump being operated upon the accumulation of a predetermined charge of compressed air in said reservoir.

10. In combination with a machine having a moving part, of an air compressor actuated in proportion to the movement of said part, said machine having a bearing, an air chamber adapted to be charged with compressed air by said compressor, a lubricating pump having a discharge connection leading to said bearing, and means operable by the accumulation of a predetermined charge of compressed air in said reservoir for causing the operation of said pump.

11. In combination with a machine having a moving part, of means for compressing air in proportion to the movement of said part, said machine having a bearing, and a lubricating pump operated by air under pressure supplied by said air compressing means at periodic intervals depending upon the movement of said part, said pump having a discharge connection leading to said bearing.

12. In combination with a machine having a moving part, of means for compressing air in proportion to the movement of said part, said machine having a bearing, a compressed air operated lubricating pump having a discharge connection leading to said bearing, and means operated upon the accumulation of a predetermined charge of compressed air from said compressing means to admit the same to said lubricating pump.

13. In a system of the class described, the combination of an air compressor, an air receiving chamber, a liquid pump adapted to be operated by a charge of compressed air to make a discharge stroke, a passageway connecting the chamber and the pump and a differential pressure operated valve subject to the pressure in the chamber for controlling said passageway.

14. In a system for reducing a large number of operations of a member to a single discharge stroke of a lubricating pump, the combination of an air compressor actuated by the operations of the first member, an air chamber for receiving the discharge of compressed air from the air chamber, a liquid pump adapted to be operated by the admission of a charge of compressed air to make a discharge stroke, a passageway between said chamber and said pump, and means in said passageway operable on a predetermined pressure in the chamber for permitting the passage of a charge of compressed air from the chamber to said pump.

15. In a system of the class described, the combination of an air compressor, an air receiving chamber, an air displacement pump having a displacement chamber, a passageway connecting the air receiving chamber with the displacement chamber, and means in said passageway operable on a predetermined pressure in the air receiving chamber for permitting the passage of a charge of compressed air from the air receiving chamber to the displacement chamber.

16. In a system of the class described, the combination of an air compressor, an air receiving chamber, a lubricating pump adapted to be operated by a charge of compressed air, a passageway connecting the chamber in the lubricating pump, and an automatic valve for controlling the periodic admission of compressed air from the chamber to said lubricating pump.

17. In a system of the class described, a source of compressed air, an air displacement lubricating pump intermittently supplied with air from said source and having a check valve inlet and having a discharge for lubricant and air, a distributing system for lubricant connected to said discharge, said system comprising an open ended pipe normally containing a large proportion of air and having trap basin branch outlets, and bearings to be lubricated connected to said branch outlets, said pump operating to force lubricant into said distributing system to fill said trap basin outlets and thereafter to force a large proportion of the lubricant contained in said pipe through the open end thereof.

18. In combination a movable member having a bearing, an inertia operated air compressor mounted on said member, a supply reservoir for lubricant, an air displacement pump having a displacement chamber, an inlet check valve between the chamber and the reservoir, a discharge connection from the bottom of the chamber, a distributing pipe connected to the discharge connection and extending to said bearing and leading back to and opening into said reservoir, said pipe having a branch connection to said bearing, and an air supply connection between said air compressor and said pump.

19. In combination with an automobile chassis of an inertia operated air compressor carried by said chassis, said chassis having a plurality of bearings, a supply reservoir for lubricant carried by the chassis, an air displacement pump having a displacement chamber, an inlet check valve between the chamber and the reservoir, a discharge connection leading from the bottom of the chamber, a distributing pipe connected to the discharge connection and extending past each of the bearings and leading back to and opening into said reservoir, said pipe having branch connections leading to the bearings, a connection between said air compressor and said pump.

20. In combination with an automobile chassis of an inertia operated air compressor carried by said chassis, said chassis having a plurality of bearings, a supply reservoir for lubricant carried by the chassis, an air displacement pump having a displacement chamber, an inlet check valve between the chamber and the reservoir, a discharge connection leading from the bottom of the chamber, a distributing pipe connected to the discharge connection and extending past each of the bearings and leading back to and opening into said reservoir, said pipe having branch connections leading to the bearings, a connection between said air compressor and said pump, and an automatic valve between said compressor and said pump for periodically admitting compressed air to the pump.

21. In combination, a plurality of bearings having sockets, there being oil passageways leading from the sockets into the bearings, a lubricating system comprising a pipe line having trap basin units permanently secured thereto, said pipe line systems comprising downwardly bent offset portions between trap basin units, each trap basin unit comprising a closed chamber having a stem and provided with an outlet through the stem, the stem of each unit being adapted to enter its corresponding socket and means for securing the stem into the socket by axial motion only of the stem.

22. In combination with a chassis having bearings to be lubricated of a pipe line system making a loop which extends adjacent said bearings, trap basin unit in said pipe line system for receiving predetermined volumes of oil and delivering the same to the bearings, an oil supply reservoir into the top of which one end of the pipe line system discharges, and a pneumatic displacement pump receiving liquid by gravity from the oil supply reservoir and having a discharge passageway communicating with the other end of the pipe line system.

23. In combination with a chassis having bearings to be lubricated of a pipe line system making a loop which extends adjacent said bearings, trap basin units in said pipe line system for receiving predetermined volumes of oil and delivering the same to the bearings, an oil supply reservoir into the top of which one end of the pipe line system discharges, and a pneumatic displacement pump receiving liquid by gravity from the oil supply reservoir and having a discharge passageway communicating with the other end of the pipe line system, and an air compressor operated by the vertical motion of a part of a chassis for supplying compressed air to said pneumatic displacement pump.

24. In combination with a chassis having bearings to be lubricated, a pipe line system making a loop which extends adjacent said bearings, trap basin units in said pipe line system for receiving predetermined volumes of oil and delivering the same to the bearings, a lubricating unit comprising a frame member mounted upon the chassis near one end of the same, an oil supply reservoir mounted on said frame member, a pneumatic displacement chamber having an inlet check valve communicating with the bottom of the reservoir and having a discharge communicating with one end of the pipe line system, a compressed air reservoir, a pressure controlled admission valve between the compressed air reservoir and the displacement chamber, and an inertia operated compressor mounted on the frame member and having a discharge passageway leading to said compressed air reservoir, the other end of said pipe line system leading back to the oil supply reservoir.

25. In a vehicle having a pneumatic brake system and having a chassis provided with bearings to be lubricated, a pipe line system making a loop which extends adjacent said bearings, trap basin units in said pipe line system for receiving predetermined volumes of oil and delivering the same to the bearings, an oil supply reservoir into the top of which one end of the pipe line system discharges and a pneumatic displacement pump and air supply reservoir receiving liquid by gravity from the oil supply reservoir and having a discharge passageway communicating with the other end of the pipe line system, a compressed air connection extending between said pneumatic brake system and said pneumatic displacement pump and a valve in said compressed air supply connection.

26. In a vehicle having a pneumatic brake system and having a chassis provided with bearings to be lubricated, a pipe line system making a loop which extends adjacent said bearings, metering units in said pipe line system for receiving predetermined amounts of oil and delivering the same to the bearings, an oil supply reservoir into the top of which one end of the pipe line system discharges, a pneumatic displacement pump receiving liquid by gravity from the oil supply reservoir and having a discharge passageway communicating with the other end of the pipe line system, said pneumatic displacement pump having a chamber with means for limiting the level to which liquid will rise in the same and having an air chamber above said liquid level, an air supply connection between said pneumatic brake system and said chamber and a manually controlled valve for admitting compressed air to the space above the liquid level in the chamber.

27. In a vehicle having a frame, a dashboard on the frame, bearings in the frame, a pipe line system for lubricating said bearings, said pipe line system comprising a closed loop, an oil supply reservoir mounted on the axle and having a pump operated by compressed air for delivering lubricant through said pipe line system to said bearings and an inertia operated air compressor for operating said pump, said compressor being disposed adjacent one end of the frame to receive a high degree of oscillatory motion of the frame.

28. A pipe line system comprising a pipe having trap basin units connected thereto, a portion of said pipe between adjacent units extending at an inclination, the pipe adjacent the unit being offset downwardly to drain oil away from said unit and a plurality of levels of said offset pipes being separated by an upwardly looped portion for defining oil traps disposed at said different levels.

29. In a lubricating system, a plurality of bearings, a continuous conduit extending seriatim to said bearings, said conduit having a plurality of lateral openings, trap basins communicating with said openings and being adapted to supply lubricant to the associated bearings, check valve means for preventing the flow of lubricant from the trap basins while said trap basins are subjected to pressure when being filled with lubricant through the conduit, pneumatic means for propelling a charge of lubricant through said conduit, and means for relieving the pneumatic pressure thereby permitting said check valve means to open and permitting the lubricant trapped in said basins to flow therefrom to their associated bearings.

30. In a lubricating system, a plurality of bearings, a trap basin for each bearing, a continuous conduit extending seriatim over said trap basins and having openings communicating with the tops of said trap basins, inwardly opening check valves in the outlets of said trap basins, and pneumatic means for alternately forcing a segregated charge of lubricant under pressure into said conduit and relieving the pressure in the conduit, thereby to fill said trap basins with lubricant and after the pressure has been relieved permitting said check valves to open and allow the lubricant contained in said trap basins to flow to their associated bearings.

31. In a system of the class described, the combination of an air compressor, an air receiving chamber, a lubricating pump having an inlet and a discharge for lubricant, a lubricant distributing system connected to the discharge of said pump, a passageway connecting said chamber and said pump for transmitting air under pressure from said chamber to said pump, a valve in said passageway operated upon a predetermined air pressure in said receiving chamber and operable to control the flow of air from said chamber to said pump, and a vent passageway from the pump to the atmosphere to permit exhaust of air after it has operated said pump.

OSCAR U. ZERK.